(12) United States Patent
Nishi et al.

(10) Patent No.: US 11,477,485 B2
(45) Date of Patent: Oct. 18, 2022

(54) ENCODER, DECODER, ENCODING METHOD, AND DECODING METHOD

(71) Applicant: Panasonic Intellectual Property Corporation of America, Torrance, CA (US)

(72) Inventors: Takahiro Nishi, Nara (JP); Tadamasa Toma, Osaka (JP); Kiyofumi Abe, Osaka (JP); Ryuichi Kanoh, Osaka (JP); Luca Rigazio, Campbell, CA (US); Alec Hodgkinson, Pescadero, CA (US)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 0 days.

(21) Appl. No.: 17/510,519

(22) Filed: Oct. 26, 2021

(65) Prior Publication Data

US 2022/0046284 A1 Feb. 10, 2022

Related U.S. Application Data

(63) Continuation of application No. 16/664,084, filed on Oct. 25, 2019, now Pat. No. 11,190,804, which is a (Continued)

(51) Int. Cl.
*H04N 19/61* (2014.01)
*H04N 19/503* (2014.01)

(52) U.S. Cl.
CPC ........... *H04N 19/61* (2014.11); *H04N 19/503* (2014.11)

(58) Field of Classification Search
CPC .... H04N 19/61; H04N 19/503; H04N 19/107; H04N 19/154; H04N 19/176; H04N 19/192; H04N 19/196; H04N 19/593
See application file for complete search history.

(56) References Cited

U.S. PATENT DOCUMENTS

| 2008/0050026 A1* | 2/2008 | Bashyam | ............... H04N 19/91 |
| | | | 382/238 |
| 2009/0110070 A1* | 4/2009 | Takahashi | ............... H04N 19/60 |
| | | | 375/E7.243 |

(Continued)

FOREIGN PATENT DOCUMENTS

| JP | 2009-111691 | 5/2009 |
| WO | 2016/199330 | 12/2016 |

OTHER PUBLICATIONS

International Search Report (ISR) dated Jun. 26, 2018 in International (PCT) Application No. PCT/P2018/016516.
(Continued)

*Primary Examiner* — Dramos Kalapodas
(74) *Attorney, Agent, or Firm* — Wenderoth, Lind & Ponack, L.L.P.

(57) ABSTRACT

The encoder includes processing circuitry, and memory. Using the memory, the processing circuitry: generates a predicted image of an input image that is a current image to be encoded, based on generated data output from a generator network in response to a reference image being input to the generator network, the generator network being a neural network; calculates a prediction error by subtracting the predicted image from the input image; and generates an encoded image by at least transforming the prediction error.

4 Claims, 48 Drawing Sheets

Related U.S. Application Data continuation of application No. PCT/JP2018/016516, filed on Apr. 24, 2018.

(60) Provisional application No. 62/489,644, filed on Apr. 25, 2017.

(56) References Cited

U.S. PATENT DOCUMENTS

| | | | |
|---|---|---|---|
| 2018/0137389 A1* | 5/2018 | Mathieu | G06N 3/0445 |
| 2018/0173994 A1 | 6/2018 | Rippel | |
| 2018/0174052 A1* | 6/2018 | Rippel | G06V 30/19147 |
| 2018/0184123 A1* | 6/2018 | Terada | H04N 19/11 |

OTHER PUBLICATIONS

H.265 (ISO/IEC 23008-2 High efficiency video coding (HEVC)), Dec. 1, 2013.

Sumina Yamashita, et al., "A method to create illustrate images using DCGAN", IPSJ SIG Technical Report, vol. 2017-MPS-112, No. 16, Feb. 2017, pp. 1-6, with English translation.

* cited by examiner

FIG. 3

| TRANSFORM TYPE | BASIS FUNCTION $T_i(j)$, $i, j = 0, 1, ..., N-1$ |
|---|---|
| DCT-II | $T_i(j) = \omega_0 \cdot \sqrt{\dfrac{2}{N}} \cdot \cos\left(\dfrac{\pi \cdot i \cdot (2j+1)}{2N}\right)$<br>WHERE $\omega_0 = \begin{cases} \sqrt{\dfrac{2}{N}} & i = 0 \\ 1 & i \neq 0 \end{cases}$ |
| DCT-V | $T_i(j) = \omega_0 \cdot \omega_1 \cdot \sqrt{\dfrac{2}{2N-1}} \cdot \cos\left(\dfrac{2\pi \cdot i \cdot j}{2N-1}\right)$<br>WHERE $\omega_0 = \begin{cases} \sqrt{\dfrac{2}{N}} & i = 0 \\ 1 & i \neq 0 \end{cases}$, $\omega_1 = \begin{cases} \sqrt{\dfrac{2}{N}} & j = 0 \\ 1 & j \neq 0 \end{cases}$ |
| DCT-VIII | $T_i(j) = \sqrt{\dfrac{4}{2N+1}} \cdot \cos\left(\dfrac{\pi \cdot (2i+1) \cdot (2j+1)}{4N+2}\right)$ |
| DST-I | $T_i(j) = \sqrt{\dfrac{2}{N+1}} \cdot \sin\left(\dfrac{\pi \cdot (i+1) \cdot (j+1)}{N+1}\right)$ |
| DST-VII | $T_i(j) = \sqrt{\dfrac{4}{2N+1}} \cdot \sin\left(\dfrac{\pi \cdot (2i+1) \cdot (j+1)}{2N+1}\right)$ |

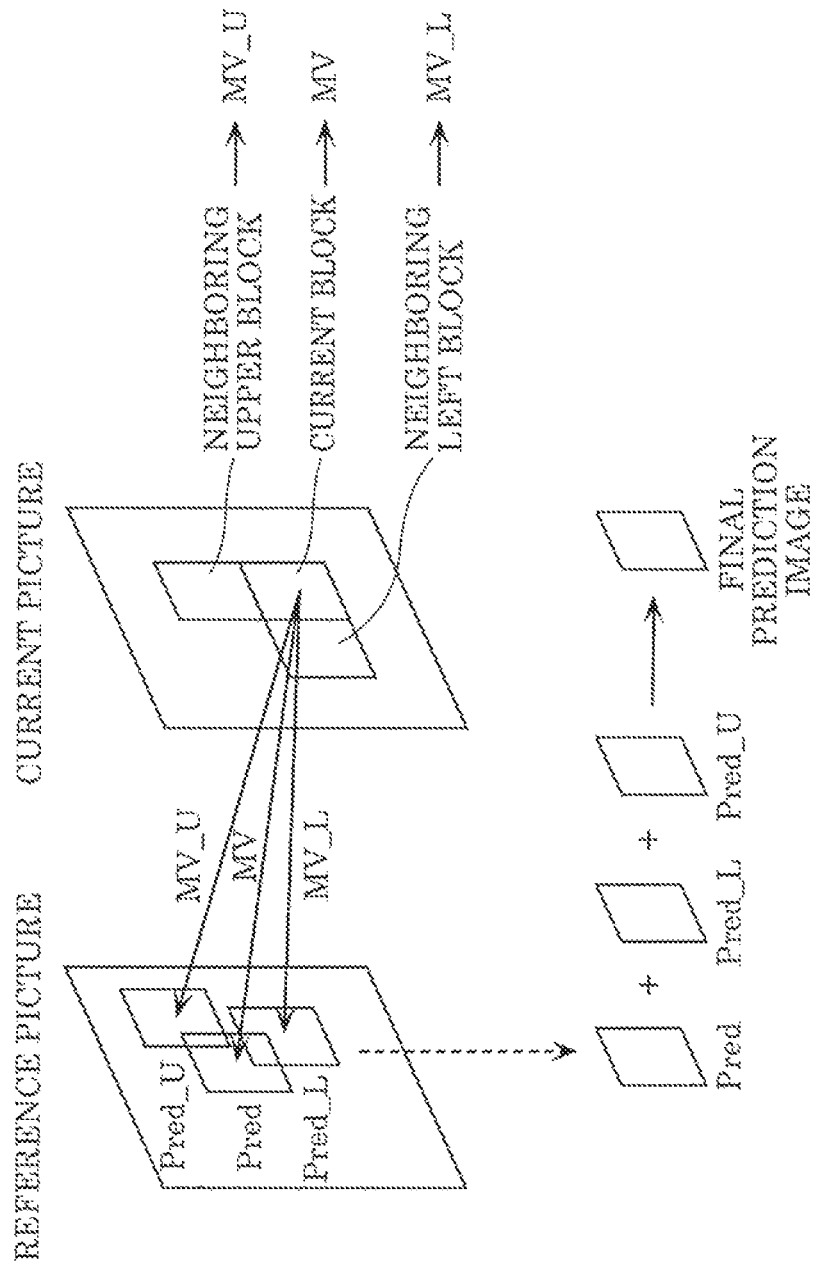

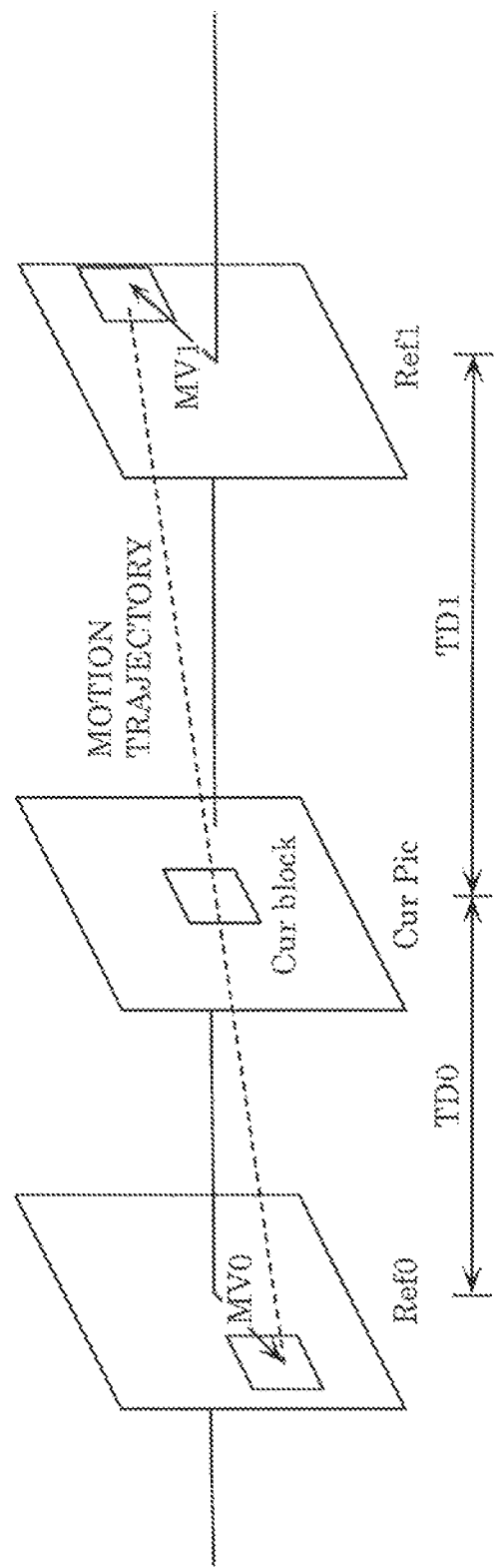

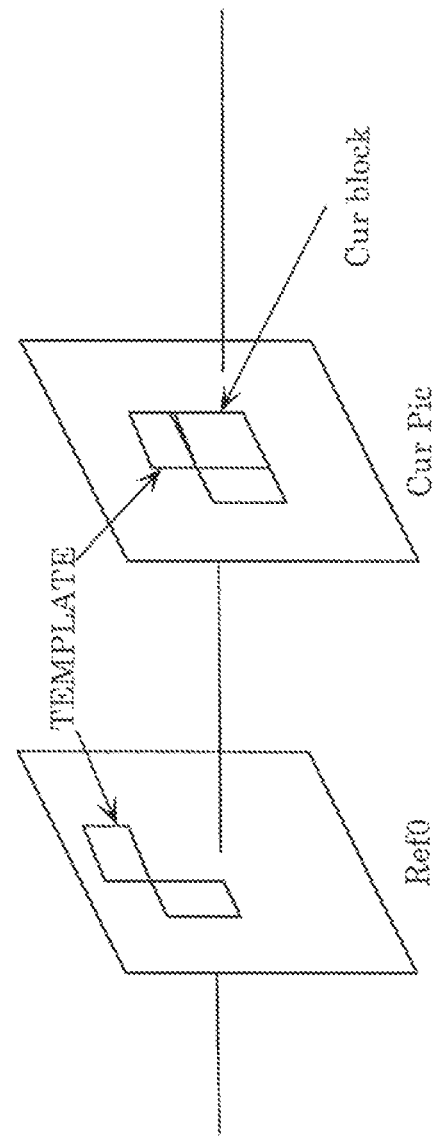

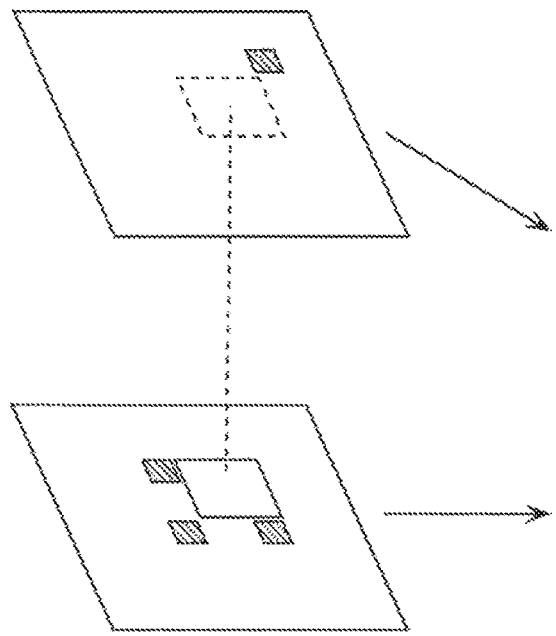

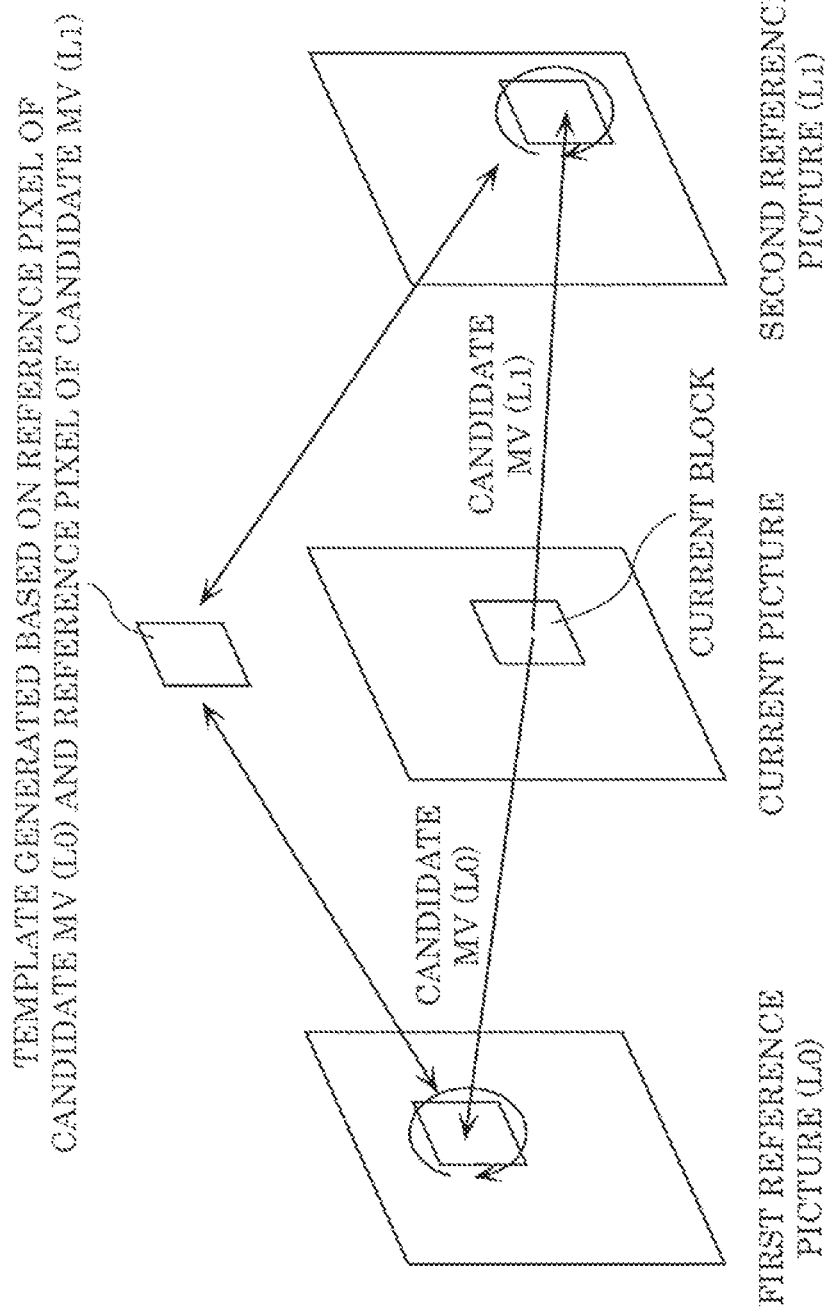

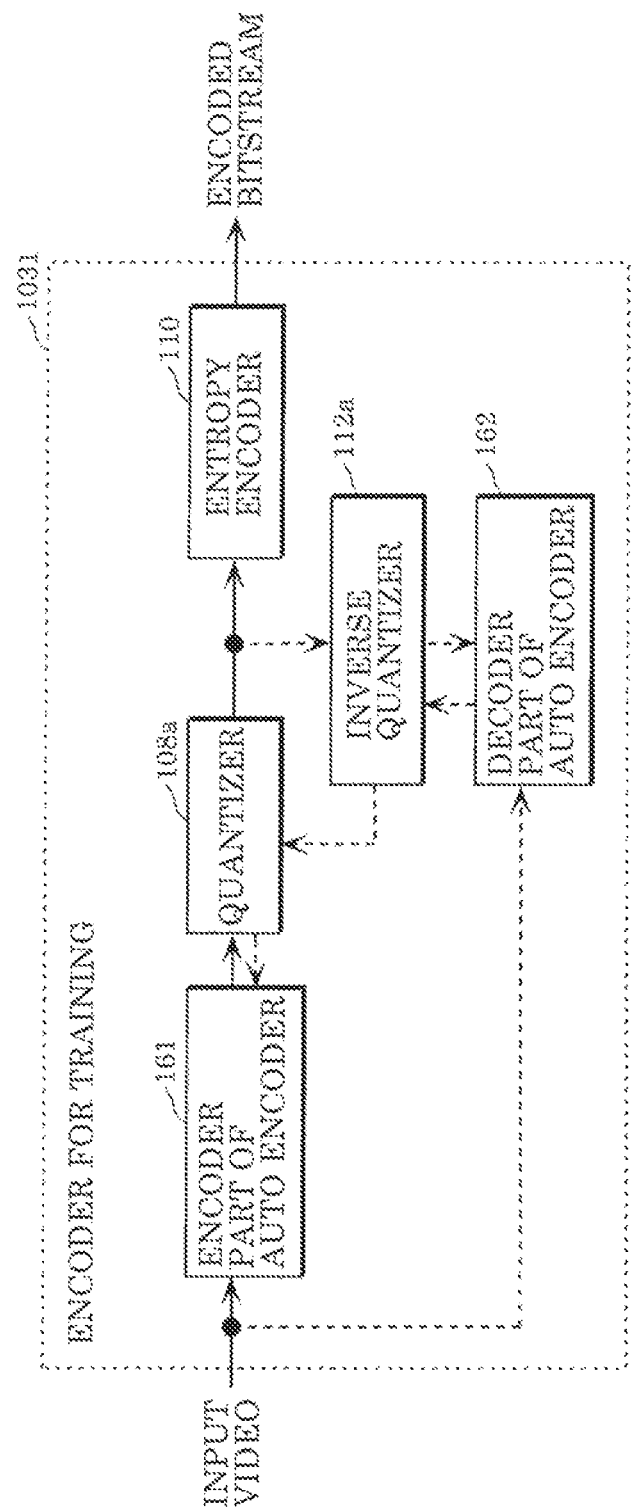

FIG. 35
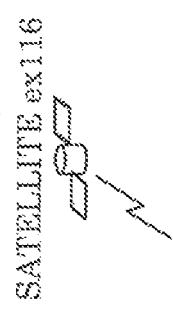
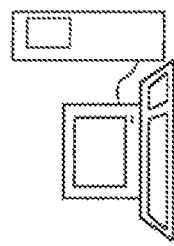
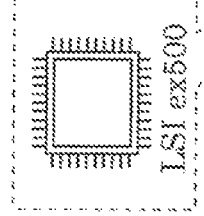
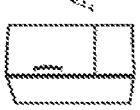
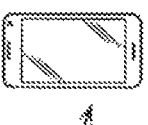

ENCODER, DECODER, ENCODING METHOD, AND DECODING METHOD

BACKGROUND

1. Technical Field

The present disclosure relates to an encoder, a decoder, an encoding method, and a decoding method.

2. Description of the Related Art

A video coding standard called High-Efficiency Video Coding (HEVC) is standardized by the Joint Collaborative Team on Video Coding (JCT-VC).

SUMMARY

An encoder according to an aspect of the present disclosure includes: processing circuitry; and memory. Using the memory, the processing circuitry: generates a predicted image of an input image that is a current image to be encoded, based on generated data output from a generator network in response to a reference image being input to the generator network, the generator network being a neural network; calculates a prediction error by subtracting the predicted image from the input image; and generates an encoded image by at least transforming the prediction error.

A decoder according to an aspect of the present disclosure includes: processing circuitry; and memory. Using the memory, the processing circuitry: generates a decoding prediction error by performing at least inverse transform on an encoded image that is a current image to be decoded; generates a predicted image of the encoded image, based on generated data output from a generator network in response to a reference image being input to the generator network, the generator network being a neural network; and generates a decoded image by adding the decoding prediction error to the predicted image.

Note that these general and specific aspects may be implemented using a system, a method, an integrated circuit, a computer program, a computer-readable recording medium such as a compact disc read only memory (CD-ROM), or any combination of systems, methods, integrated circuits, computer programs or recording media.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 3 is a chart indicating transform basis functions for each transform type;

FIG. 5C is a conceptual diagram for illustrating an outline of a prediction image correction process performed via OBMC processing;

FIG. 6 is for illustrating pattern matching (bilateral matching) between two blocks along a motion trajectory;

FIG. 7 is for illustrating pattern matching (template matching) between a template in the current picture and a block in a reference picture;

FIG. 9B is for illustrating an outline of a process for deriving a motion vector via merge mode;

FIG. 9C is a conceptual diagram for illustrating an outline of DMVR processing;

FIG. 28A is a block diagram illustrating a configuration of an encoder for training according to Embodiment 5;

FIG. 35 illustrates an overall configuration of a content providing system for implementing a content distribution service;

DETAILED DESCRIPTION OF THE EMBODIMENTS

Figure 1:
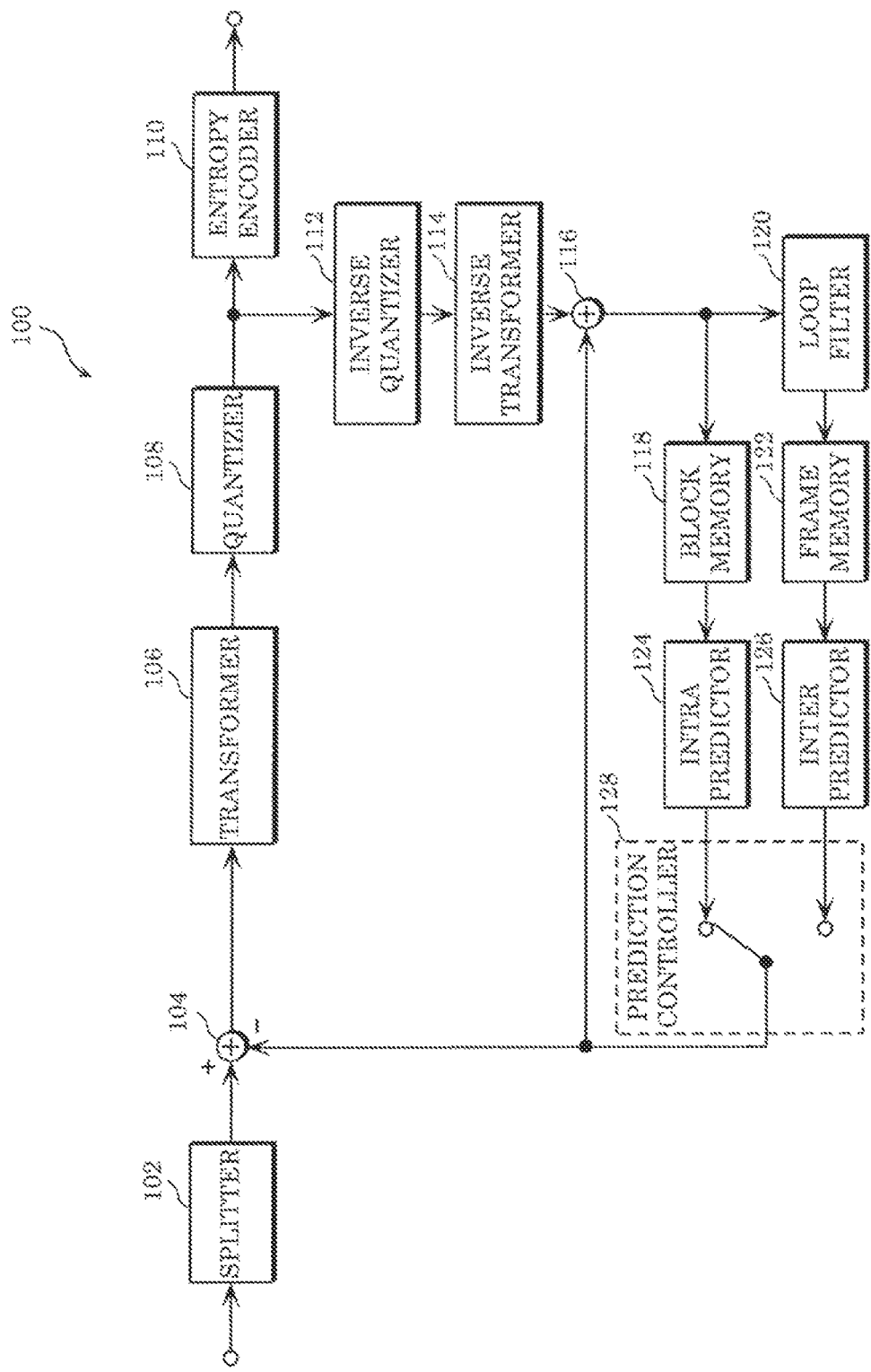
FIG. 1 is a block diagram illustrating a functional configuration of an encoder according to Embodiment 1.

An encoder according to an aspect of the present disclosure includes: processing circuitry; and memory. Using the memory, the processing circuitry: generates a predicted image of an input image that is a current image to be encoded, based on generated data output from a generator network in response to a reference image being input to the generator network, the generator network being a neural network; calculates a prediction error by subtracting the predicted image from the input image; and generates an encoded image by at least transforming the prediction error. For example, the generator network may be a hierarchical network that includes an input layer, a hidden layer, and an output layer. The input image may be an image of a current block of an input video, for example, and the reference image may be an image already encoded and reconstructed (namely, reconstructed image), for example. The encoded image may be an image of an encoded block included in an encoded bitstream. Furthermore, the generator network that is a neural network may be stored in the memory.

Accordingly, a predicted image is generated based on generated data output from the generator network, and thus a predicted image similar to an input image according to the configuration of the generator network, that is, a neural network, can be generated, and as a result, encoding efficiency can be improved. It is not necessary to perform complicated intra prediction or inter prediction to generate a predicted image, and thus a processing burden can be reduced and/or the configuration can be simplified, for instance.

The processing circuitry may further: feed back, to the generator network, a probability that the predicted image matches the input image by inputting the input image and the predicted image to a discriminator network, the discriminator network being a neural network and constituting a generative adversarial network (GAN) with the generator network; and update the generator network and the discriminator network to reduce difference between the input image and the predicted image and increase accuracy of discriminating between the input image and the predicted image.

Accordingly, generated data for generating a predicted image more similar to an input image can be obtained from the generator network by being trained by the GAN through machine learning.

The reference image may be a processed image included in a picture, the picture including the input image, and in generating the predicted image, the processing circuitry may generate a first intra-predicted image as the predicted image, based on the generated data.

Accordingly, an intra-predicted image similar to the input image can be generated.

The processing circuitry may further: generate a second intra-predicted image of the input image by intra prediction based on the reference image; select an image from among the first intra-predicted image and the second intra-predicted image; and when the processing circuitry selects the second intra-predicted image in selecting the image, calculate the prediction error by subtracting the second intra-predicted image from the input image in calculating the prediction error.

Accordingly, the first intra-predicted image based on the output of the generator network or the second intra-predicted image based on intra prediction is selected, and the selected image is used to calculate a prediction error. Thus, if an image with which a smaller prediction error is calculated is selected from among the first intra-predicted image and the second intra-predicted image, a possibility that encoding efficiency increases can be further enhanced.

In generating the predicted image, the processing circuitry may generate, as the first intra-predicted image, the generated data output from the generator network in response to the reference image being input to the generator network. Alternatively, in generating the predicted image, the processing circuitry may: obtain, as an intra prediction parameter, the generated data output from the generator network in response to the reference image being input to the generator network; and generate the first intra-predicted image by intra prediction based on the reference image and the intra prediction parameter.

Accordingly, an intra-predicted image similar to the input image can be generated directly or indirectly from the output of the generator network.

The reference image may be included in a processed picture different from a picture that includes the input image, and in generating the predicted image, the processing circuitry may generate a first inter-predicted image as the predicted image, based on the generated data.

Accordingly, an inter-predicted image similar to the input image can be generated.

The processing circuitry may further: generate a second inter-predicted image of the input image by inter prediction based on the reference image; select an image from among the first inter-predicted image and the second inter-predicted image; and when the processing circuitry selects the second inter-predicted image in selecting the image, calculate the prediction error by subtracting the second inter-predicted image from the input image in calculating the prediction error.

Accordingly, the first inter-predicted image based on the output of the generator network or the second inter-predicted image based on inter prediction is selected, and the selected image is used to calculate a prediction error. Thus, if an image with which a smaller prediction error is calculated is selected from among the first inter-predicted image and the second inter-predicted image, a possibility that encoding efficiency increases can be further enhanced.

In generating the predicted image, the processing circuitry may generate, as the first inter-predicted image, the generated data output from the generator network in response to the reference image being input to the generator network. Alternatively, in generating the predicted image, the processing circuitry may: obtain, as an inter prediction parameter, the generated data output from the generator network in response to the reference image being input to the generator network; and generate the first inter-predicted image by inter prediction based on the reference image and the inter prediction parameter.

Accordingly, an inter-predicted image similar to the input image can be generated directly or indirectly from the output of the generator network.

A decoder according to an aspect of the present disclosure includes: processing circuitry; and memory. Using the memory, the processing circuitry: generates a decoding prediction error by performing at least inverse transform on an encoded image that is a current image to be decoded; generates a predicted image of the encoded image, based on generated data output from a generator network in response to a reference image being input to the generator network, the generator network being a neural network; and generates a decoded image by adding the decoding prediction error to the predicted image. For example, the generator network may be a hierarchical network that includes an input layer, a hidden layer, and an output layer. The encoded image may be, for example, an image of an encoded block included in an encoded bitstream, and the reference image may be, for example, an already reconstructed image (that is, a reconstructed image or a decoded image). Furthermore, the generator network that is a neural network may be stored in memory.

Accordingly, a predicted image is generated based on generated data output from the generator network, and thus a predicted image similar to an original image can be generated according to a configuration of the generator network, that is, a neural network, and as a result, encoding efficiency can be improved. Specifically, the amount of data of the decoding prediction error can be decreased. Note that the original image is an input image used by the encoder to generate an encoded image, for example. Further, it is not necessary to perform complicated intra prediction or inter prediction to generate a predicted image, and thus a processing burden can be reduced and/or the configuration can be simplified, for instance.

The generator network may be trained by a generative adversarial network (GAN).

Accordingly, training through machine learning by the GAN allows generated data for generating a predicted image more similar to an original image to be obtained from the generator network.

The reference image may be a processed image included in a picture, the picture including the encoded image, and in generating the predicted image, the processing circuitry may generate a first intra-predicted image as the predicted image, based on the generated data.

Accordingly, an intra-predicted image similar to an original image can be generated.

The processing circuitry may further: generate a second intra-predicted image of the encoded image by intra prediction based on the reference image; select an image from among the first intra-predicted image and the second intra-predicted image; and when the processing circuitry selects the second intra-predicted image in selecting the image, generate the decoded image by adding the decoding prediction error to the second intra-predicted image in generating the decoded image.

Accordingly, the first intra-predicted image based on the output of the generator network or the second intra-predicted image based on intra prediction is selected, and the selected image is used to generate a decoded image. Thus, if an image used to generate an encoded image is selected from among the first intra-predicted image and the second intra-predicted image, the encoded image can be appropriately decoded.

In generating the predicted image, the processing circuitry may generate, as the first intra-predicted image, the generated data output from the generator network in response to the reference image being input to the generator network. Alternatively, in generating the predicted image, the processing circuitry may: obtain, as an intra prediction parameter, the generated data output from the generator network in response to the reference image being input to the generator network; and generate the first intra-predicted image by intra prediction based on the reference image and the intra prediction parameter.

Accordingly, an intra-predicted image similar to an original image can be generated directly or indirectly from the output of the generator network.

The reference image may be included in a processed picture different from a picture that includes the encoded image, and in generating the predicted image, the processing circuitry may generate a first inter-predicted image as the predicted image, based on the generated data.

Accordingly, an inter-predicted image similar to an original image can be generated.

The processing circuitry may further: generate a second inter-predicted image of the encoded image by inter prediction based on the reference image; select an image from among the first inter-predicted image and the second inter-predicted image; and when the processing circuitry selects the second inter-predicted image in selecting the image, generate the decoded image by adding the decoding prediction error to the second inter-predicted image in generating the decoded image.

Accordingly, the first inter-predicted image based on the output of the generator network or the second inter-predicted image based on inter prediction is selected, and the selected image is used to generate a decoded image. Accordingly, if an image used to generate an encoded image is selected from among the first inter-predicted image and the second inter-predicted image, the encoded image can be decoded appropriately.

In generating the predicted image, the processing circuitry may generate, as the first inter-predicted image, the generated data output from the generator network in response to the reference image being input to the generator network. Alternatively, in generating the predicted image, the processing circuitry may: obtain, as an inter prediction parameter, the generated data output from the generator network in response to the reference image being input to the generator network; and generate the first inter-predicted image by inter prediction based on the reference image and the inter prediction parameter.

Accordingly, an inter-predicted image similar to an original image can be generated directly or indirectly from the output of the generator network.

Hereinafter, embodiments will be described with reference to the drawings.

Note that the embodiments described below each show a general or specific example. The numerical values, shapes, materials, components, the arrangement and connection of the components, steps, order of the steps, etc., indicated in the following embodiments are mere examples, and therefore are not intended to limit the scope of the claims. Therefore, among the components in the following embodiments, those not recited in any of the independent claims defining the broadest inventive concepts are described as optional components.

Embodiment 1

First, an outline of Embodiment 1 will be presented. Embodiment 1 is one example of an encoder and a decoder to which the processes and/or configurations presented in subsequent description of aspects of the present disclosure are applicable. Note that Embodiment 1 is merely one example of an encoder and a decoder to which the processes and/or configurations presented in the description of aspects of the present disclosure are applicable. The processes and/or configurations presented in the description of aspects of the present disclosure can also be implemented in an encoder and a decoder different from those according to Embodiment 1.

When the processes and/or configurations presented in the description of aspects of the present disclosure are applied to Embodiment 1, for example, any of the following may be performed.

(1) regarding the encoder or the decoder according to Embodiment 1, among components included in the encoder or the decoder according to Embodiment 1, substituting a component corresponding to a component presented in the description of aspects of the present disclosure with a component presented in the description of aspects of the present disclosure;

(2) regarding the encoder or the decoder according to Embodiment 1, implementing discretionary changes to functions or implemented processes performed by one or more components included in the encoder or the decoder according to Embodiment 1, such as addition, substitution, or removal, etc., of such functions or implemented processes, then substituting a component corresponding to a component presented in the description of aspects of the present disclosure with a component presented in the description of aspects of the present disclosure;

(3) regarding the method implemented by the encoder or the decoder according to Embodiment 1, implementing discretionary changes such as addition of processes and/or substitution, removal of one or more of the processes included in the method, and then substituting a processes corresponding to a process presented in the description of aspects of the present disclosure with a process presented in the description of aspects of the present disclosure;

(4) combining one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(5) combining a component including one or more functions included in one or more components included in the encoder or the decoder according to Embodiment 1, or a component that implements one or more processes implemented by one or more components included in the encoder or the decoder according to Embodiment 1 with a component presented in the description of aspects of the present disclosure, a component including one or more functions included in a component presented in the description of aspects of the present disclosure, or a component that implements one or more processes implemented by a component presented in the description of aspects of the present disclosure;

(6) regarding the method implemented by the encoder or the decoder according to Embodiment 1, among processes included in the method, substituting a process corresponding to a process presented in the description of aspects of the present disclosure with a process presented in the description of aspects of the present disclosure; and (7) combining one or more processes included in the method implemented by the encoder or the decoder according to Embodiment 1 with a process presented in the description of aspects of the present disclosure.

Note that the implementation of the processes and/or configurations presented in the description of aspects of the present disclosure is not limited to the above examples. For example, the processes and/or configurations presented in the description of aspects of the present disclosure may be implemented in a device used for a purpose different from the moving picture/picture encoder or the moving picture/picture decoder disclosed in Embodiment 1. Moreover, the processes and/or configurations presented in the description of aspects of the present disclosure may be independently implemented. Moreover, processes and/or configurations described in different aspects may be combined.

[Encoder Outline]

First, the encoder according to Embodiment 1 will be outlined. FIG. 1 is a block diagram illustrating a functional configuration of encoder 100 according to Embodiment 1. Encoder 100 is a moving picture/picture encoder that encodes a moving picture/picture block by block.

As illustrated in FIG. 1, encoder 100 is a device that encodes a picture block by block, and includes splitter 102, subtractor 104, transformer 106, quantizer 108, entropy encoder 110, inverse quantizer 112, inverse transformer 114, adder 116, block memory 118, loop filter 120, frame memory 122, intra predictor 124, inter predictor 126, and prediction controller 128.

Encoder 100 is realized as, for example, a generic processor and memory. In this case, when a software program stored in the memory is executed by the processor, the processor functions as splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128. Alternatively, encoder 100 may be realized as one or more dedicated electronic circuits corresponding to splitter 102, subtractor 104, transformer 106, quantizer 108, entropy encoder 110, inverse quantizer 112, inverse transformer 114, adder 116, loop filter 120, intra predictor 124, inter predictor 126, and prediction controller 128.

Hereinafter, each component included in encoder 100 will be described.

[Splitter]

Splitter 102 splits each picture included in an input moving picture into blocks, and outputs each block to subtractor 104. For example, splitter 102 first splits a picture into blocks of a fixed size (for example, 128×128). The fixed size block is also referred to as coding tree unit (CTU). Splitter 102 then splits each fixed size block into blocks of variable sizes (for example, 64×64 or smaller), based on recursive quadtree and/or binary tree block splitting. The variable size block is also referred to as a coding unit (CU), a prediction unit (PU), or a transform unit (TU). Note that in this embodiment, there is no need to differentiate between CU, PU, and TU; all or some of the blocks in a picture may be processed per CU, PU, or TU.

Figure 2:
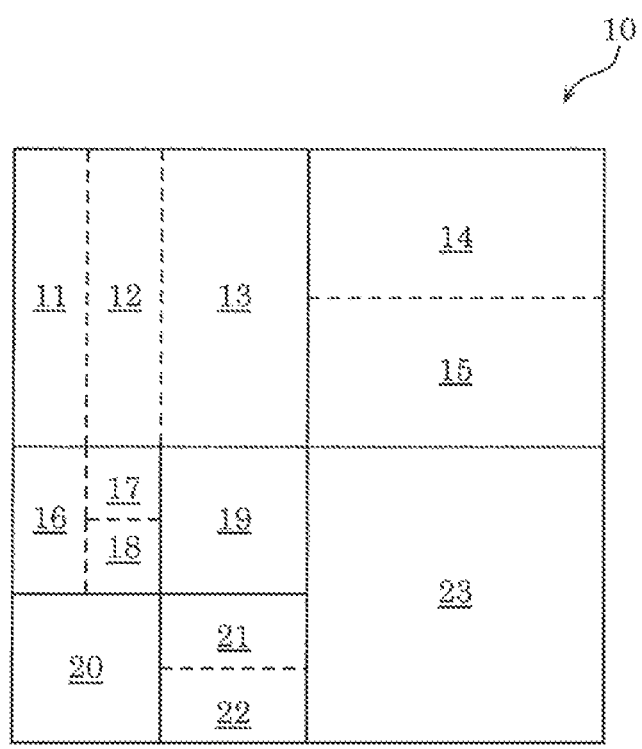
FIG. 2 illustrates one example of block splitting according to Embodiment 1.

FIG. 2 illustrates one example of block splitting according to Embodiment 1. In FIG. 2, the solid lines represent block boundaries of blocks split by quadtree block splitting, and the dashed lines represent block boundaries of blocks split by binary tree block splitting.

Here, block 10 is a square 128×128 pixel block (128×128 block). This 128×128 block 10 is first split into four square 64×64 blocks (quadtree block splitting).

The top left 64×64 block is further vertically split into two rectangle 32×64 blocks, and the left 32×64 block is further vertically split into two rectangle 16×64 blocks (binary tree block splitting). As a result, the top left 64×64 block is split into two 16×64 blocks 11 and 12 and one 32×64 block 13.

The top right 64×64 block is horizontally split into two rectangle 64×32 blocks 14 and 15 (binary tree block splitting).

The bottom left 64×64 block is first split into four square 32×32 blocks (quadtree block splitting). The top left block and the bottom right block among the four 32×32 blocks are further split. The top left 32×32 block is vertically split into two rectangle 16×32 blocks, and the right 16×32 block is further horizontally split into two 16×16 blocks (binary tree block splitting). The bottom right 32×32 block is horizontally split into two 32×16 blocks (binary tree block splitting). As a result, the bottom left 64×64 block is split into 16×32 block 16, two 16×16 blocks 17 and 18, two 32×32 blocks 19 and 20, and two 32×16 blocks 21 and 22.

The bottom right 64×64 block 23 is not split.

As described above, in FIG. 2, block 10 is split into 13 variable size blocks 11 through 23 based on recursive quadtree and binary tree block splitting. This type of splitting is also referred to as quadtree plus binary tree (QTBT) splitting.

Note that in FIG. 2, one block is split into four or two blocks (quadtree or binary tree block splitting), but splitting is not limited to this example. For example, one block may be split into three blocks (ternary block splitting). Splitting including such ternary block splitting is also referred to as multi-type tree (MBT) splitting.

[Subtractor]

Subtractor 104 subtracts a prediction signal (prediction sample) from an original signal (original sample) per block split by splitter 102. In other words, subtractor 104 calculates prediction errors (also referred to as residuals) of a block to be encoded (hereinafter referred to as a current block). Subtractor 104 then outputs the calculated prediction errors to transformer 106.

The original signal is a signal input into encoder 100, and is a signal representing an image for each picture included in a moving picture (for example, a luma signal and two chroma signals). Hereinafter, a signal representing an image is also referred to as a sample.

[Transformer]

Transformer 106 transforms spatial domain prediction errors into frequency domain transform coefficients, and outputs the transform coefficients to quantizer 108. More specifically, transformer 106 applies, for example, a predefined discrete cosine transform (DCT) or discrete sine transform (DST) to spatial domain prediction errors.

Note that transformer 106 may adaptively select a transform type from among a plurality of transform types, and transform prediction errors into transform coefficients by using a transform basis function corresponding to the selected transform type. This sort of transform is also referred to as explicit multiple core transform (EMT) or adaptive multiple transform (AMT).

The transform types include, for example, DCT-II, DCT-V, DCT-VIII, DST-I, and DST-VII. FIG. 3 is a chart indicating transform basis functions for each transform type. In FIG. 3, N indicates the number of input pixels. For example, selection of a transform type from among the plurality of transform types may depend on the prediction type (intra prediction and inter prediction), and may depend on intra prediction mode.

Information indicating whether to apply such EMT or AMT (referred to as, for example, an AMT flag) and information indicating the selected transform type is signalled at the CU level. Note that the signaling of such information need not be performed at the CU level, and may be performed at another level (for example, at the sequence level, picture level, slice level, tile level, or CTU level).

Moreover, transformer 106 may apply a secondary transform to the transform coefficients (transform result). Such a secondary transform is also referred to as adaptive secondary transform (AST) or non-separable secondary transform (NSST). For example, transformer 106 applies a secondary transform to each sub-block (for example, each 4×4 sub-block) included in the block of the transform coefficients corresponding to the intra prediction errors. Information indicating whether to apply NSST and information related to the transform matrix used in NSST are signalled at the CU level. Note that the signaling of such information need not be performed at the CU level, and may be performed at another level (for example, at the sequence level, picture level, slice level, tile level, or CTU level).

Here, a separable transform is a method in which a transform is performed a plurality of times by separately performing a transform for each direction according to the number of dimensions input. A non-separable transform is a method of performing a collective transform in which two or more dimensions in a multidimensional input are collectively regarded as a single dimension.

In one example of a non-separable transform, when the input is a 4×4 block, the 4×4 block is regarded as a single array including 16 components, and the transform applies a 16×16 transform matrix to the array.

Moreover, similar to above, after an input 4×4 block is regarded as a single array including 16 components, a transform that performs a plurality of Givens rotations on the array (i.e., a Hypercube-Givens Transform) is also one example of a non-separable transform.

[Quantizer]

Quantizer 108 quantizes the transform coefficients output from transformer 106. More specifically, quantizer 108 scans, in a predetermined scanning order, the transform coefficients of the current block, and quantizes the scanned transform coefficients based on quantization parameters (QP) corresponding to the transform coefficients. Quantizer 108 then outputs the quantized transform coefficients (hereinafter referred to as quantized coefficients) of the current block to entropy encoder 110 and inverse quantizer 112.

A predetermined order is an order for quantizing/inverse quantizing transform coefficients. For example, a predetermined scanning order is defined as ascending order of frequency (from low to high frequency) or descending order of frequency (from high to low frequency).

A quantization parameter is a parameter defining a quantization step size (quantization width). For example, if the value of the quantization parameter increases, the quantization step size also increases. In other words, if the value of the quantization parameter increases, the quantization error increases.

[Entropy Encoder]

Entropy encoder 110 generates an encoded signal (encoded bitstream) by variable length encoding quantized coefficients, which are inputs from quantizer 108. More specifically, entropy encoder 110, for example, binarizes quantized coefficients and arithmetic encodes the binary signal.

[Inverse Quantizer]

Inverse quantizer 112 inverse quantizes quantized coefficients, which are inputs from quantizer 108. More specifically, inverse quantizer 112 inverse quantizes, in a predetermined scanning order, quantized coefficients of the current block. Inverse quantizer 112 then outputs the inverse quantized transform coefficients of the current block to inverse transformer 114.

[Inverse Transformer]

Inverse transformer 114 restores prediction errors by inverse transforming transform coefficients, which are inputs from inverse quantizer 112. More specifically, inverse transformer 114 restores the prediction errors of the current block by applying an inverse transform corresponding to the transform applied by transformer 106 on the transform coefficients. Inverse transformer 114 then outputs the restored prediction errors to adder 116. Note that since information is lost in quantization, the restored prediction errors do not match the prediction errors calculated by subtractor 104. In other words, the restored prediction errors include quantization errors.

[Adder]

Adder 116 reconstructs the current block by summing prediction errors, which are inputs from inverse transformer 114, and prediction samples, which are inputs from prediction controller 128. Adder 116 then outputs the reconstructed block to block memory 118 and loop filter 120. A reconstructed block is also referred to as a local decoded block.

[Block Memory]

Block memory 118 is storage for storing blocks in a picture to be encoded (hereinafter referred to as a current picture) for reference in intra prediction. More specifically, block memory 118 stores reconstructed blocks output from adder 116.

[Loop Filter]

Loop filter 120 applies a loop filter to blocks reconstructed by adder 116, and outputs the filtered reconstructed blocks to frame memory 122. A loop filter is a filter used in an encoding loop (in-loop filter), and includes, for example, a deblocking filter (DF), a sample adaptive offset (SAO), and an adaptive loop filter (ALF).

In ALF, a least square error filter for removing compression artifacts is applied. For example, one filter from among a plurality of filters is selected for each 2×2 sub-block in the current block based on direction and activity of local gradients, and is applied.

More specifically, first, each sub-block (for example, each 2×2 sub-block) is categorized into one out of a plurality of classes (for example, 15 or 25 classes). The classification of the sub-block is based on gradient directionality and activity. For example, classification index C is derived based on gradient directionality D (for example, 0 to 2 or 0 to 4) and gradient activity A (for example, 0 to 4) (for example, $C=5D+A$). Then, based on classification index C, each sub-block is categorized into one out of a plurality of classes (for example, 15 or 25 classes).

For example, gradient directionality D is calculated by comparing gradients of a plurality of directions (for example, the horizontal, vertical, and two diagonal directions). Moreover, for example, gradient activity A is calculated by summing gradients of a plurality of directions and quantizing the sum.

The filter to be used for each sub-block is determined from among the plurality of filters based on the result of such categorization.

Figure 4A:
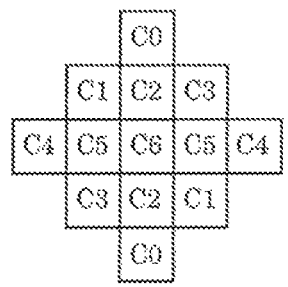
FIG. 4A illustrates one example of a filter shape used in ALF.
Figure 4B:
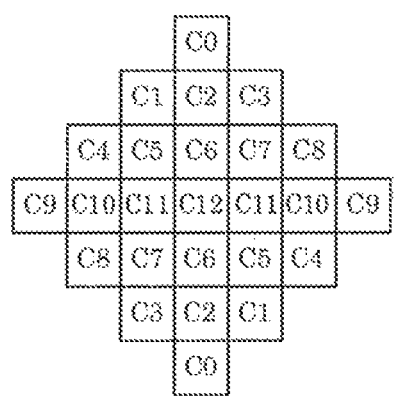
FIG. 4B illustrates another example of a filter shape used in ALF.
Figure 4C:
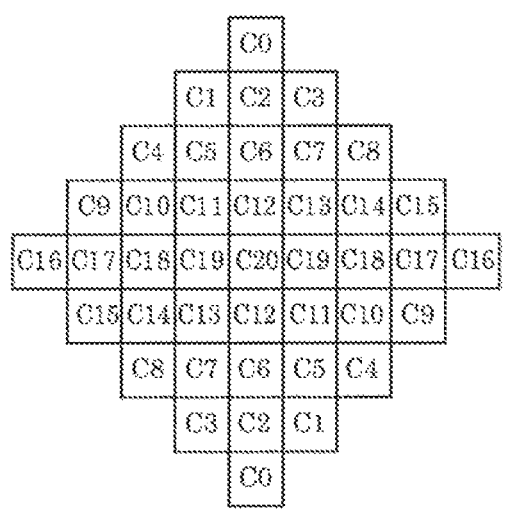
FIG. 4C illustrates another example of a filter shape used in ALF.

The filter shape to be used in ALF is, for example, a circular symmetric filter shape. FIG. 4A through FIG. 4C illustrate examples of filter shapes used in ALF. FIG. 4A illustrates a 5×5 diamond shape filter, FIG. 4B illustrates a 7×7 diamond shape filter, and FIG. 4C illustrates a 9×9 diamond shape filter. Information indicating the filter shape is signalled at the picture level. Note that the signaling of information indicating the filter shape need not be performed at the picture level, and may be performed at another level (for example, at the sequence level, slice level, tile level, CTU level, or CU level).

The enabling or disabling of ALF is determined at the picture level or CU level. For example, for luma, the decision to apply ALF or not is done at the CU level, and for chroma, the decision to apply ALF or not is done at the picture level. Information indicating whether ALF is enabled or disabled is signalled at the picture level or CU level. Note that the signaling of information indicating whether ALF is enabled or disabled need not be performed at the picture level or CU level, and may be performed at another level (for example, at the sequence level, slice level, tile level, or CTU level).

The coefficients set for the plurality of selectable filters (for example, 15 or 25 filters) is signalled at the picture level. Note that the signaling of the coefficients set need not be performed at the picture level, and may be performed at another level (for example, at the sequence level, slice level, tile level, CTU level, CU level, or sub-block level).

[Frame Memory]

Frame memory 122 is storage for storing reference pictures used in inter prediction, and is also referred to as a frame buffer. More specifically, frame memory 122 stores reconstructed blocks filtered by loop filter 120.

[Intra Predictor]

Intra predictor 124 generates a prediction signal (intra prediction signal) by intra predicting the current block with reference to a block or blocks in the current picture and stored in block memory 118 (also referred to as intra frame prediction). More specifically, intra predictor 124 generates an intra prediction signal by intra prediction with reference to samples (for example, luma and/or chroma values) of a block or blocks neighboring the current block, and then outputs the intra prediction signal to prediction controller 128.

For example, intra predictor 124 performs intra prediction by using one mode from among a plurality of predefined intra prediction modes. The intra prediction modes include one or more non-directional prediction modes and a plurality of directional prediction modes.

The one or more non-directional prediction modes include, for example, planar prediction mode and DC prediction mode defined in the H.265/high-efficiency video coding (HEVC) standard (see H.265 (ISO/IEC 23008-2 HEVC (High Efficiency Video Coding))).

Figure 5A:
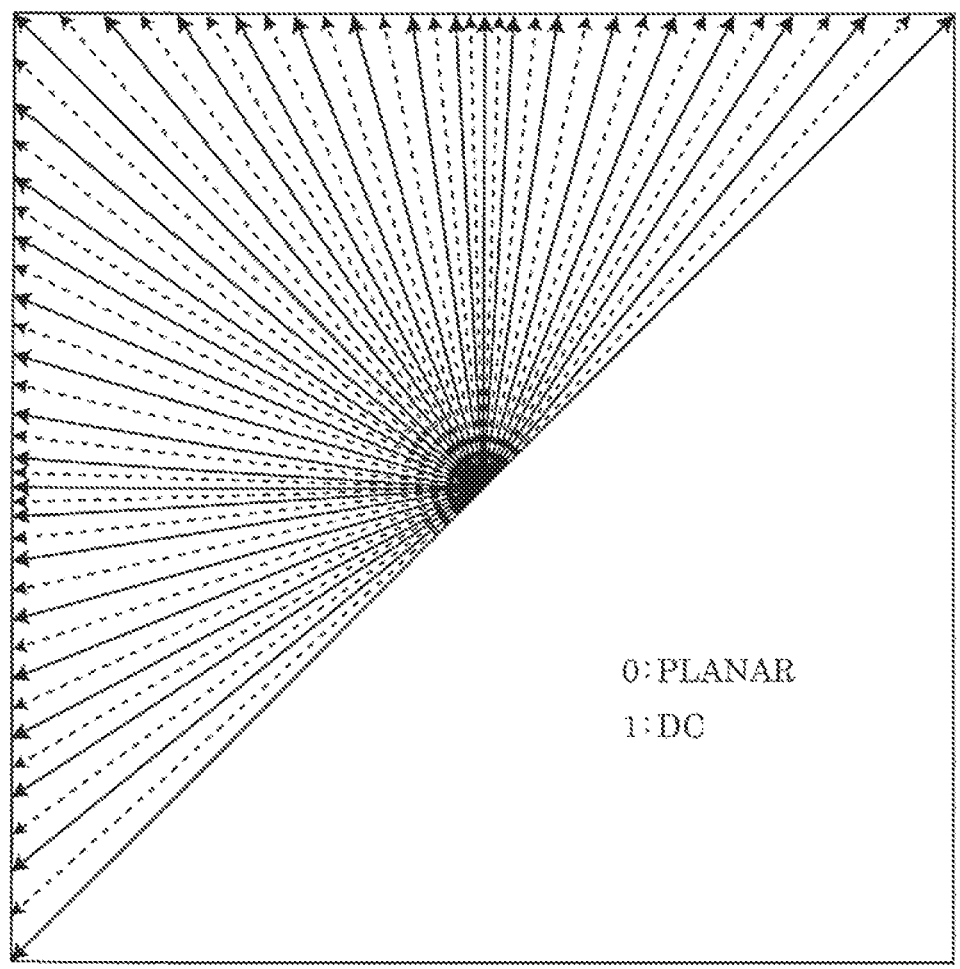
FIG. 5A illustrates 67 intra prediction modes used in intra prediction.

The plurality of directional prediction modes include, for example, the 33 directional prediction modes defined in the H.265/HEVC standard. Note that the plurality of directional prediction modes may further include 32 directional prediction modes in addition to the 33 directional prediction modes (for a total of 65 directional prediction modes). FIG. 5A illustrates 67 intra prediction modes used in intra prediction (two non-directional prediction modes and 65 directional prediction modes). The solid arrows represent the 33 directions defined in the H.265/HEVC standard, and the dashed arrows represent the additional 32 directions.

Note that a luma block may be referenced in chroma block intra prediction. In other words, a chroma component of the current block may be predicted based on a luma component of the current block. Such intra prediction is also referred to as cross-component linear model (CCLM) prediction. Such a chroma block intra prediction mode that references a luma block (referred to as, for example, CCLM mode) may be added as one of the chroma block intra prediction modes.

Intra predictor 124 may correct post-intra-prediction pixel values based on horizontal/vertical reference pixel gradients. Intra prediction accompanied by this sort of correcting is also referred to as position dependent intra prediction combination (PDPC). Information indicating whether to apply PDPC or not (referred to as, for example, a PDPC flag) is, for example, signalled at the CU level. Note that the signaling of this information need not be performed at the CU level, and may be performed at another level (for example, on the sequence level, picture level, slice level, tile level, or CTU level).

[Inter Predictor]

Inter predictor 126 generates a prediction signal (inter prediction signal) by inter predicting the current block with reference to a block or blocks in a reference picture, which is different from the current picture and is stored in frame memory 122 (also referred to as inter frame prediction). Inter prediction is performed per current block or per sub-block (for example, per 4x4 block) in the current block. For example, inter predictor 126 performs motion estimation in a reference picture for the current block or sub-block. Inter predictor 126 then generates an inter prediction signal of the current block or sub-block by motion compensation by using motion information (for example, a motion vector) obtained from motion estimation. Inter predictor 126 then outputs the generated inter prediction signal to prediction controller 128.

The motion information used in motion compensation is signalled. A motion vector predictor may be used for the signaling of the motion vector. In other words, the difference between the motion vector and the motion vector predictor may be signalled.

Note that the inter prediction signal may be generated using motion information for a neighboring block in addition to motion information for the current block obtained from motion estimation. More specifically, the inter prediction signal may be generated per sub-block in the current block by calculating a weighted sum of a prediction signal based on motion information obtained from motion estimation and a prediction signal based on motion information for a neighboring block. Such inter prediction (motion compensation) is also referred to as overlapped block motion compensation (OBMC).

In such an OBMC mode, information indicating sub-block size for OBMC (referred to as, for example, OBMC block size) is signalled at the sequence level. Moreover, information indicating whether to apply the OBMC mode or not (referred to as, for example, an OBMC flag) is signalled at the CU level. Note that the signaling of such information need not be performed at the sequence level and CU level, and may be performed at another level (for example, at the picture level, slice level, tile level, CTU level, or sub-block level).

Figure 5B:
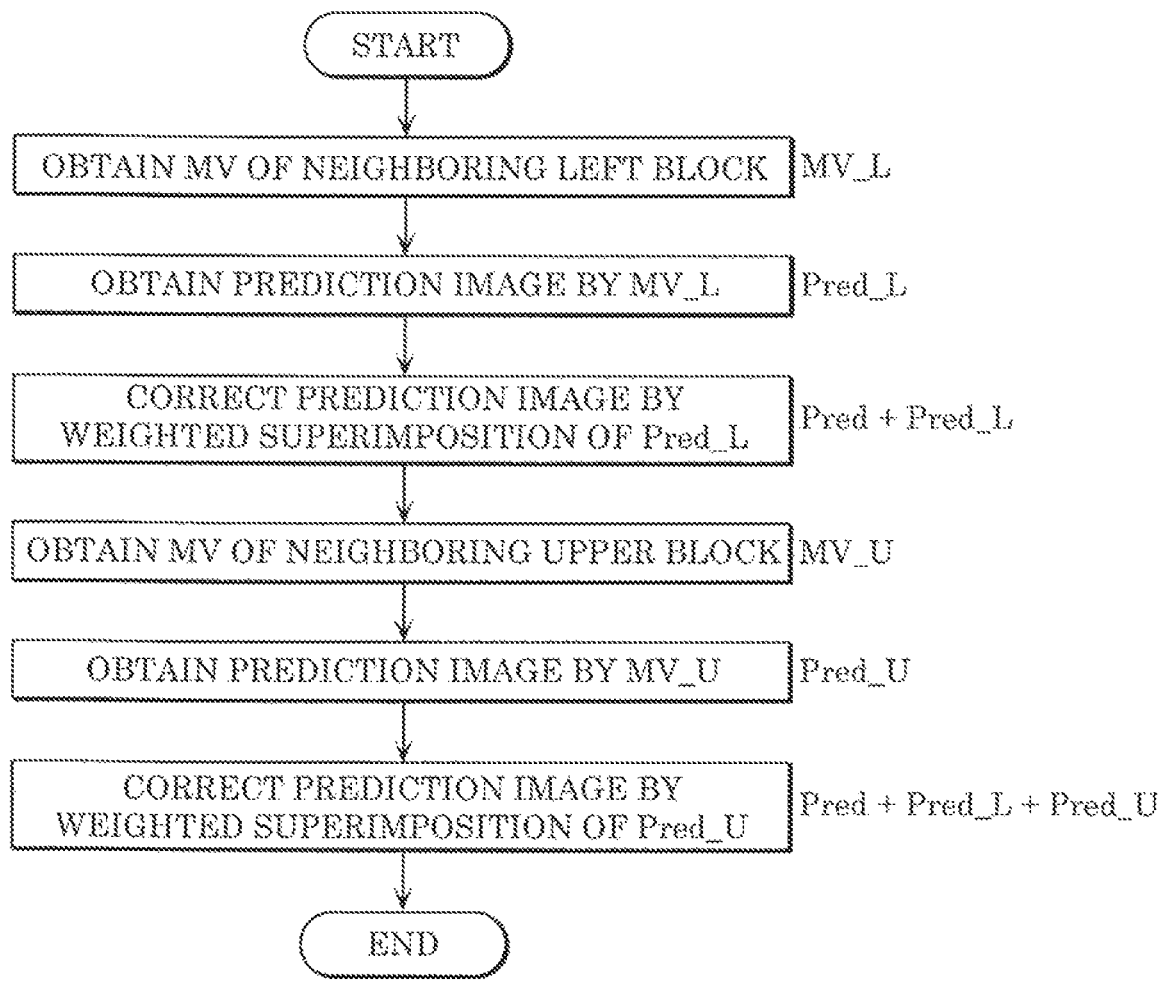
FIG. 5B is a flow chart for illustrating an outline of a prediction image correction process performed via OBMC processing.

Hereinafter, the OBMC mode will be described in further detail. FIG. 5B is a flowchart and FIG. 5C is a conceptual diagram for illustrating an outline of a prediction image correction process performed via OBMC processing.

First, a prediction image (Pred) is obtained through typical motion compensation using a motion vector (MV) assigned to the current block.

Next, a prediction image (Pred_L) is obtained by applying a motion vector (MV_L) of the encoded neighboring left block to the current block, and a first pass of the correction of the prediction image is made by superimposing the prediction image and Pred_L.

Similarly, a prediction image (Pred_U) is obtained by applying a motion vector (MV_U) of the encoded neighboring upper block to the current block, and a second pass of the correction of the prediction image is made by superimposing the prediction image resulting from the first pass and Pred_U. The result of the second pass is the final prediction image.

Note that the above example is of a two-pass correction method using the neighboring left and upper blocks, but the method may be a three-pass or higher correction method that also uses the neighboring right and/or lower block.

Note that the region subject to superimposition may be the entire pixel region of the block, and, alternatively, may be a partial block boundary region.

Note that here, the prediction image correction process is described as being based on a single reference picture, but the same applies when a prediction image is corrected based on a plurality of reference pictures. In such a case, after corrected prediction images resulting from performing correction based on each of the reference pictures are obtained, the obtained corrected prediction images are further superimposed to obtain the final prediction image.

Note that the unit of the current block may be a prediction block and, alternatively, may be a sub-block obtained by further dividing the prediction block.

One example of a method for determining whether to implement OBMC processing is by using an obmc_flag, which is a signal that indicates whether to implement OBMC processing. As one specific example, the encoder determines whether the current block belongs to a region including complicated motion. The encoder sets the obmc_flag to a value of "1" when the block belongs to a region including complicated motion and implements OBMC processing when encoding, and sets the obmc_flag to a value of "0" when the block does not belong to a region including complication motion and encodes without implementing OBMC processing. The decoder switches between implementing OBMC processing or not by decoding the obmc_flag written in the stream and performing the decoding in accordance with the flag value.

Note that the motion information may be derived on the decoder side without being signalled. For example, a merge mode defined in the H.265/HEVC standard may be used. Moreover, for example, the motion information may be derived by performing motion estimation on the decoder side. In this case, motion estimation is performed without using the pixel values of the current block.

Here, a mode for performing motion estimation on the decoder side will be described. A mode for performing motion estimation on the decoder side is also referred to as pattern matched motion vector derivation (PMMVD) mode or frame rate up-conversion (FRUC) mode.

Figure 5D:
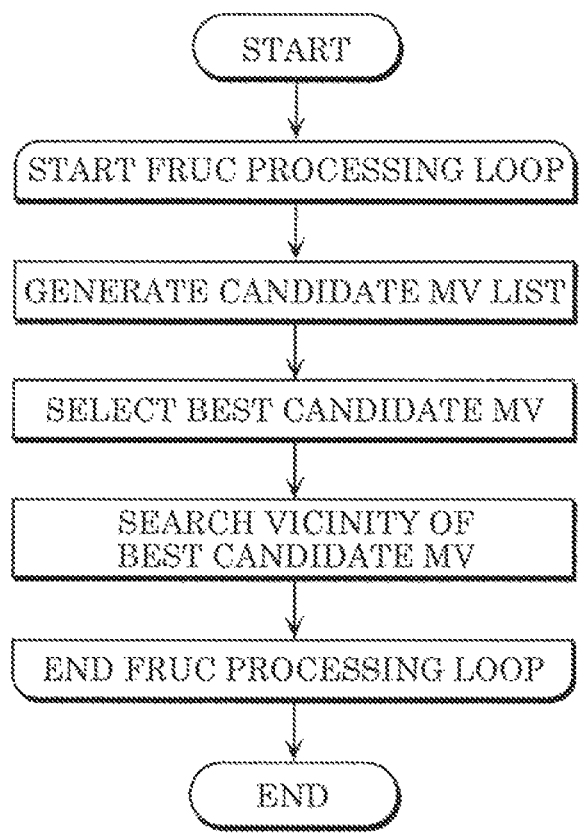
FIG. 5D illustrates one example of FRUC.

One example of FRUC processing is illustrated in FIG. 5D. First, a candidate list (a candidate list may be a merge list) of candidates each including a motion vector predictor is generated with reference to motion vectors of encoded blocks that spatially or temporally neighbor the current block. Next, the best candidate MV is selected from among a plurality of candidate MVs registered in the candidate list. For example, evaluation values for the candidates included in the candidate list are calculated and one candidate is selected based on the calculated evaluation values.

Next, a motion vector for the current block is derived from the motion vector of the selected candidate. More specifically, for example, the motion vector for the current block is calculated as the motion vector of the selected candidate (best candidate MV), as-is. Alternatively, the motion vector for the current block may be derived by pattern matching performed in the vicinity of a position in a reference picture corresponding to the motion vector of the selected candidate. In other words, when the vicinity of the best candidate MV is searched via the same method and an MV having a better evaluation value is found, the best candidate MV may be updated to the MV having the better evaluation value, and the MV having the better evaluation value may be used as the final MV for the current block. Note that a configuration in which this processing is not implemented is also acceptable.

The same processes may be performed in cases in which the processing is performed in units of sub-blocks.

Note that an evaluation value is calculated by calculating the difference in the reconstructed image by pattern matching performed between a region in a reference picture corresponding to a motion vector and a predetermined region. Note that the evaluation value may be calculated by using some other information in addition to the difference.

The pattern matching used is either first pattern matching or second pattern matching. First pattern matching and second pattern matching are also referred to as bilateral matching and template matching, respectively.

In the first pattern matching, pattern matching is performed between two blocks along the motion trajectory of the current block in two different reference pictures. Therefore, in the first pattern matching, a region in another reference picture conforming to the motion trajectory of the current block is used as the predetermined region for the above-described calculation of the candidate evaluation value.

FIG. 6 is for illustrating one example of pattern matching (bilateral matching) between two blocks along a motion trajectory. As illustrated in FIG. 6, in the first pattern matching, two motion vectors (MV0, MV1) are derived by finding the best match between two blocks along the motion trajectory of the current block (Cur block) in two different reference pictures (Ref0, Ref1). More specifically, a difference between (i) a reconstructed image in a specified position in a first encoded reference picture (Ref0) specified by a candidate MV and (ii) a reconstructed picture in a specified position in a second encoded reference picture (Ref1) specified by a symmetrical MV scaled at a display time interval of the candidate MV may be derived, and the evaluation value for the current block may be calculated by using the derived difference. The candidate MV having the best evaluation value among the plurality of candidate MVs may be selected as the final MV.

Under the assumption of continuous motion trajectory, the motion vectors (MV0, MV1) pointing to the two reference blocks shall be proportional to the temporal distances (TD0, TD1) between the current picture (Cur Pic) and the two reference pictures (Ref0, Ref1). For example, when the current picture is temporally between the two reference pictures and the temporal distance from the current picture to the two reference pictures is the same, the first pattern matching derives a mirror based bi-directional motion vector.

In the second pattern matching, pattern matching is performed between a template in the current picture (blocks neighboring the current block in the current picture (for example, the top and/or left neighboring blocks)) and a block in a reference picture. Therefore, in the second pattern matching, a block neighboring the current block in the current picture is used as the predetermined region for the above-described calculation of the candidate evaluation value.

FIG. 7 is for illustrating one example of pattern matching (template matching) between a template in the current picture and a block in a reference picture. As illustrated in FIG. 7, in the second pattern matching, a motion vector of the current block is derived by searching a reference picture (Ref0) to find the block that best matches neighboring blocks of the current block (Cur block) in the current picture (Cur Pic). More specifically, a difference between (i) a reconstructed image of an encoded region that is both or one of the neighboring left and neighboring upper region and (ii) a reconstructed picture in the same position in an encoded reference picture (Ref0) specified by a candidate MV may be derived, and the evaluation value for the current block may be calculated by using the derived difference. The candidate MV having the best evaluation value among the plurality of candidate MVs may be selected as the best candidate MV.

Information indicating whether to apply the FRUC mode or not (referred to as, for example, a FRUC flag) is signalled at the CU level. Moreover, when the FRUC mode is applied (for example, when the FRUC flag is set to true), information indicating the pattern matching method (first pattern matching or second pattern matching) is signalled at the CU level. Note that the signaling of such information need not be performed at the CU level, and may be performed at another level (for example, at the sequence level, picture level, slice level, tile level, CTU level, or sub-block level).

Here, a mode for deriving a motion vector based on a model assuming uniform linear motion will be described. This mode is also referred to as a bi-directional optical flow (BIO) mode.

Figure 8:
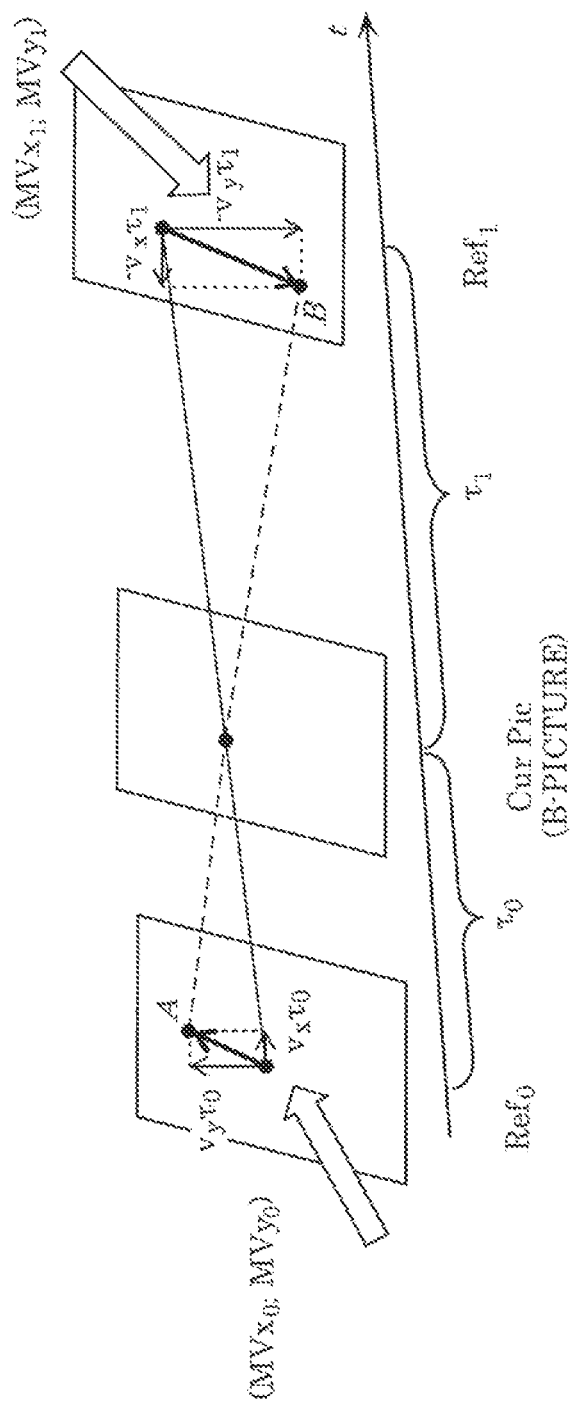
FIG. 8 is for illustrating a model assuming uniform linear motion.

FIG. 8 is for illustrating a model assuming uniform linear motion. In FIG. 8, $(v_x, v_y)$ denotes a velocity vector, and $\tau_0$ and $\tau_1$ denote temporal distances between the current picture (Cur Pic) and two reference pictures (Ref$_0$, Ref$_1$). (MVx$_0$, MVy$_0$) denotes a motion vector corresponding to reference picture Ref$_0$, and (MVx$_1$, MVy$_1$) denotes a motion vector corresponding to reference picture Ref$_1$.

Here, under the assumption of uniform linear motion exhibited by velocity vector $(v_x, v_y)$, (MVx$_0$, MVy$_0$) and (MVx$_1$, MVy$_1$) are represented as $(v_x\tau_0, v_y\tau_0)$ and $(-v_x\tau_1, -v_y\tau_1)$, respectively, and the following optical flow equation is given.

MATH. 1

$$\partial I^{(k)}/\partial t + v_x \partial I^{(k)}/\partial x + v_y \partial I^{(k)}/\partial y = 0. \quad (1)$$

Here, $I^{(k)}$ denotes a luma value from reference picture k (k=0, 1) after motion compensation. This optical flow equation shows that the sum of (i) the time derivative of the luma value, (ii) the product of the horizontal velocity and the horizontal component of the spatial gradient of a reference picture, and (iii) the product of the vertical velocity and the vertical component of the spatial gradient of a reference picture is equal to zero. A motion vector of each block obtained from, for example, a merge list is corrected pixel by pixel based on a combination of the optical flow equation and Hermite interpolation.

Note that a motion vector may be derived on the decoder side using a method other than deriving a motion vector based on a model assuming uniform linear motion. For example, a motion vector may be derived for each sub-block based on motion vectors of neighboring blocks.

Here, a mode in which a motion vector is derived for each sub-block based on motion vectors of neighboring blocks will be described. This mode is also referred to as affine motion compensation prediction mode.

Figure 9A:
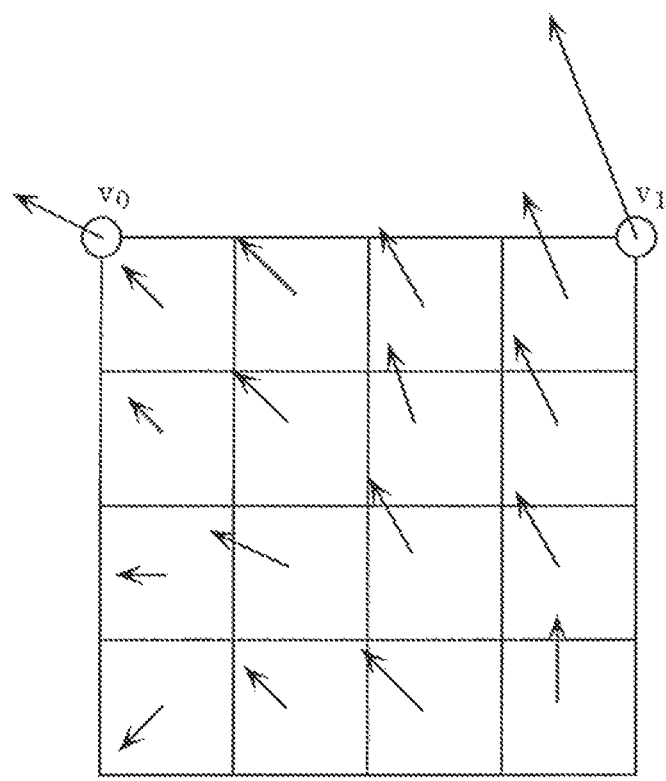
FIG. 9A is for illustrating deriving a motion vector of each sub-block based on motion vectors of neighboring blocks.

FIG. 9A is for illustrating deriving a motion vector of each sub-block based on motion vectors of neighboring blocks. In FIG. 9A, the current block includes 16 4×4 sub-blocks. Here, motion vector $v_0$ of the top left corner control point in the current block is derived based on motion vectors of neighboring sub-blocks, and motion vector $v_1$ of the top right corner control point in the current block is derived based on motion vectors of neighboring blocks. Then, using the two motion vectors $v_0$ and $v_1$, the motion vector $(v_x, v_y)$ of each sub-block in the current block is derived using Equation 2 below.

MATH. 2

$$\begin{cases} v_x = \frac{(v_{1x} - v_{0x})}{w} x - \frac{(v_{1y} - v_{0y})}{w} y + v_{0x} \\ v_y = \frac{(v_{1y} - v_{0y})}{w} x + \frac{(v_{1x} - v_{0x})}{w} y + v_{0y} \end{cases} \quad (2)$$

Here, x and y are the horizontal and vertical positions of the sub-block, respectively, and w is a predetermined weighted coefficient.

Such an affine motion compensation prediction mode may include a number of modes of different methods of deriving the motion vectors of the top left and top right corner control points. Information indicating such an affine motion compensation prediction mode (referred to as, for example, an affine flag) is signalled at the CU level. Note that the signaling of information indicating the affine motion compensation prediction mode need not be performed at the CU level, and may be performed at another level (for example, at the sequence level, picture level, slice level, tile level, CTU level, or sub-block level).

[Prediction Controller]

Prediction controller 128 selects either the intra prediction signal or the inter prediction signal, and outputs the selected prediction signal to subtractor 104 and adder 116.

Here, an example of deriving a motion vector via merge mode in a current picture will be given. FIG. 9B is for illustrating an outline of a process for deriving a motion vector via merge mode.

First, an MV predictor list in which candidate MV predictors are registered is generated. Examples of candidate MV predictors include: spatially neighboring MV predictors, which are MVs of encoded blocks positioned in the spatial vicinity of the current block; a temporally neighboring MV predictor, which is an MV of a block in an encoded reference picture that neighbors a block in the same location as the current block; a combined MV predictor, which is an MV generated by combining the MV values of the spatially neighboring MV predictor and the temporally neighboring MV predictor; and a zero MV predictor, which is an MV whose value is zero.

Next, the MV of the current block is determined by selecting one MV predictor from among the plurality of MV predictors registered in the MV predictor list.

Furthermore, in the variable-length encoder, a merge_idx, which is a signal indicating which MV predictor is selected, is written and encoded into the stream.

Note that the MV predictors registered in the MV predictor list illustrated in FIG. 9B constitute one example. The number of MV predictors registered in the MV predictor list may be different from the number illustrated in FIG. 9B, the MV predictors registered in the MV predictor list may omit one or more of the types of MV predictors given in the example in FIG. 9B, and the MV predictors registered in the MV predictor list may include one or more types of MV predictors in addition to and different from the types given in the example in FIG. 9B.

Note that the final MV may be determined by performing DMVR processing (to be described later) by using the MV of the current block derived via merge mode.

Here, an example of determining an MV by using DMVR processing will be given.

FIG. 9C is a conceptual diagram for illustrating an outline of DMVR processing.

First, the most appropriate MVP set for the current block is considered to be the candidate MV, reference pixels are obtained from a first reference picture, which is a picture processed in the L0 direction in accordance with the candidate MV, and a second reference picture, which is a picture processed in the L1 direction in accordance with the candidate MV, and a template is generated by calculating the average of the reference pixels.

Next, using the template, the surrounding regions of the candidate MVs of the first and second reference pictures are searched, and the MV with the lowest cost is determined to be the final MV. Note that the cost value is calculated using, for example, the difference between each pixel value in the template and each pixel value in the regions searched, as well as the MV value.

Note that the outlines of the processes described here are fundamentally the same in both the encoder and the decoder.

Note that processing other than the processing exactly as described above may be used, so long as the processing is capable of deriving the final MV by searching the surroundings of the candidate MV.

Here, an example of a mode that generates a prediction image by using LIC processing will be given.

Figure 9D:
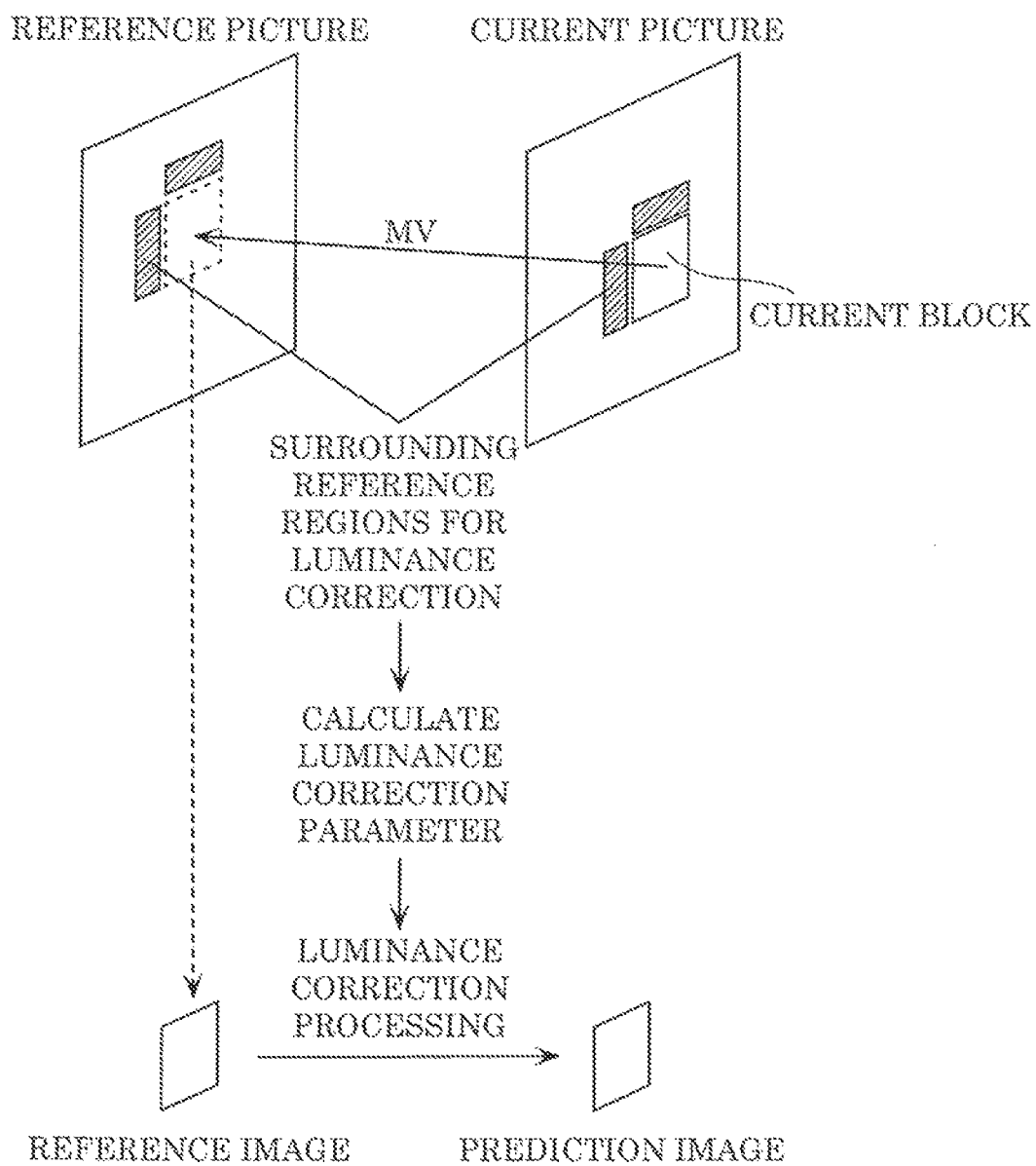
FIG. 9D is for illustrating an outline of a prediction image generation method using a luminance correction process performed via LIC processing.

FIG. 9D is for illustrating an outline of a prediction image generation method using a luminance correction process performed via LIC processing.

First, an MV is extracted for obtaining, from an encoded reference picture, a reference image corresponding to the current block.

Next, information indicating how the luminance value changed between the reference picture and the current picture is extracted and a luminance correction parameter is calculated by using the luminance pixel values for the encoded left neighboring reference region and the encoded upper neighboring reference region, and the luminance pixel value in the same location in the reference picture specified by the MV.

The prediction image for the current block is generated by performing a luminance correction process by using the luminance correction parameter on the reference image in the reference picture specified by the MV.

Note that the shape of the surrounding reference region illustrated in FIG. 9D is just one example; the surrounding reference region may have a different shape.

Moreover, although a prediction image is generated from a single reference picture in this example, in cases in which a prediction image is generated from a plurality of reference pictures as well, the prediction image is generated after performing a luminance correction process, via the same method, on the reference images obtained from the reference pictures.

One example of a method for determining whether to implement LIC processing is by using an lic_flag, which is a signal that indicates whether to implement LIC processing. As one specific example, the encoder determines whether the current block belongs to a region of luminance change. The encoder sets the lic_flag to a value of "1" when the block belongs to a region of luminance change and implements LIC processing when encoding, and sets the lic_flag to a value of "0" when the block does not belong to a region of luminance change and encodes without implementing LIC processing. The decoder switches between implementing LIC processing or not by decoding the lic_flag written in the stream and performing the decoding in accordance with the flag value.

One example of a different method of determining whether to implement LIC processing is determining so in accordance with whether LIC processing was determined to be implemented for a surrounding block. In one specific example, when merge mode is used on the current block, whether LIC processing was applied in the encoding of the surrounding encoded block selected upon deriving the MV in the merge mode processing may be determined, and whether to implement LIC processing or not can be switched based on the result of the determination. Note that in this example, the same applies to the processing performed on the decoder side.

[Decoder Outline]

Figure 10:
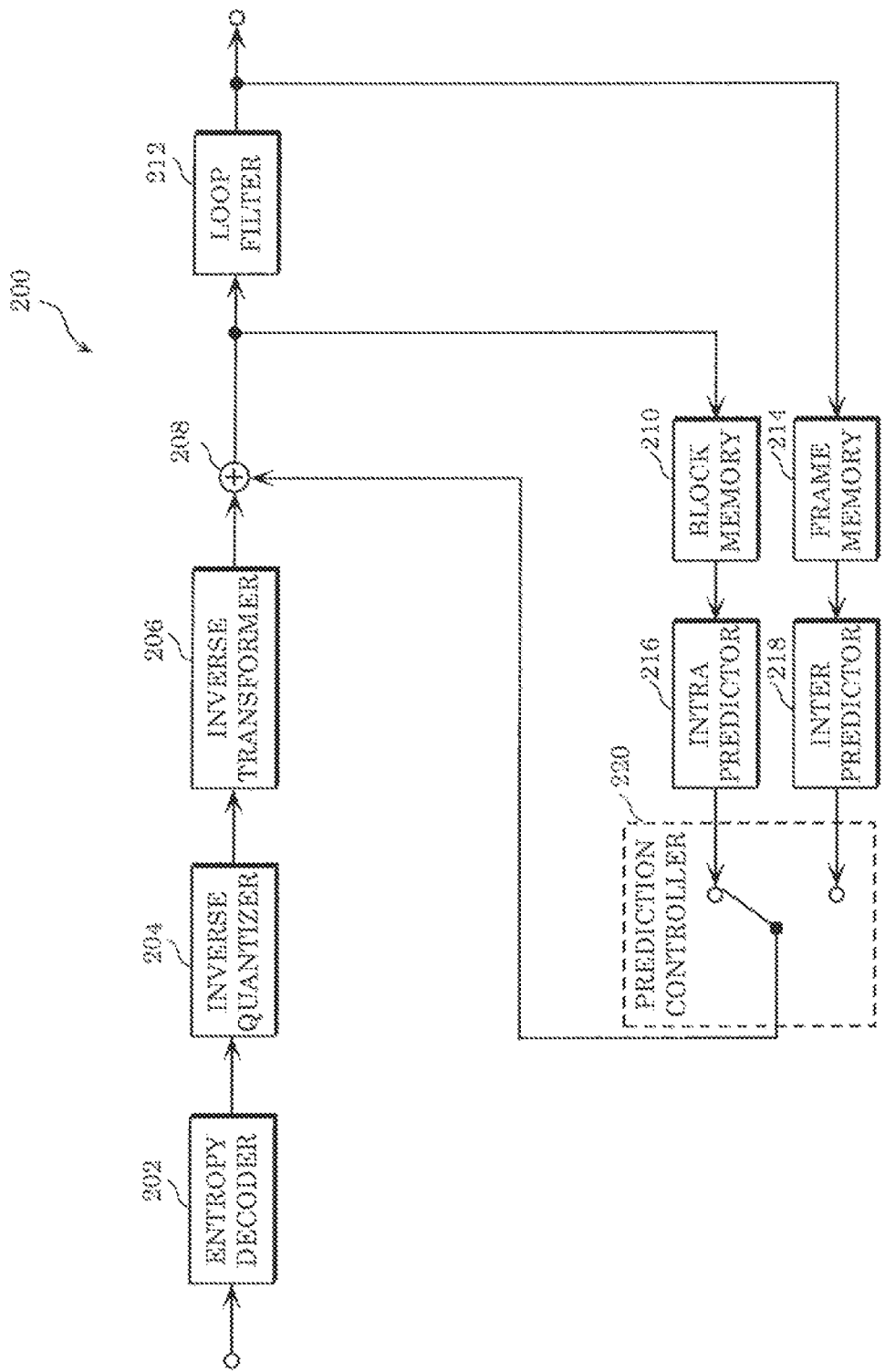
FIG. 10 is a block diagram illustrating a functional configuration of a decoder according to Embodiment 1.

Next, a decoder capable of decoding an encoded signal (encoded bitstream) output from encoder 100 will be described. FIG. 10 is a block diagram illustrating a functional configuration of decoder 200 according to Embodiment 1. Decoder 200 is a moving picture/picture decoder that decodes a moving picture/picture block by block.

As illustrated in FIG. 10, decoder 200 includes entropy decoder 202, inverse quantizer 204, inverse transformer 206, adder 208, block memory 210, loop filter 212, frame memory 214, intra predictor 216, inter predictor 218, and prediction controller 220.

Decoder 200 is realized as, for example, a generic processor and memory. In this case, when a software program stored in the memory is executed by the processor, the processor functions as entropy decoder 202, inverse quantizer 204, inverse transformer 206, adder 208, loop filter 212, intra predictor 216, inter predictor 218, and prediction controller 220. Alternatively, decoder 200 may be realized as one or more dedicated electronic circuits corresponding to entropy decoder 202, inverse quantizer 204, inverse transformer 206, adder 208, loop filter 212, intra predictor 216, inter predictor 218, and prediction controller 220.

Hereinafter, each component included in decoder 200 will be described.

[Entropy Decoder]

Entropy decoder 202 entropy decodes an encoded bitstream. More specifically, for example, entropy decoder 202 arithmetic decodes an encoded bitstream into a binary signal. Entropy decoder 202 then debinarizes the binary signal. With this, entropy decoder 202 outputs quantized coefficients of each block to inverse quantizer 204.

[Inverse Quantizer]

Inverse quantizer 204 inverse quantizes quantized coefficients of a block to be decoded (hereinafter referred to as a current block), which are inputs from entropy decoder 202. More specifically, inverse quantizer 204 inverse quantizes quantized coefficients of the current block based on quantization parameters corresponding to the quantized coefficients. Inverse quantizer 204 then outputs the inverse quantized coefficients (i.e., transform coefficients) of the current block to inverse transformer 206.

[Inverse Transformer]

Inverse transformer 206 restores prediction errors by inverse transforming transform coefficients, which are inputs from inverse quantizer 204.

For example, when information parsed from an encoded bitstream indicates application of EMT or AMT (for example, when the AMT flag is set to true), inverse transformer 206 inverse transforms the transform coefficients of the current block based on information indicating the parsed transform type.

Moreover, for example, when information parsed from an encoded bitstream indicates application of NSST, inverse transformer 206 applies a secondary inverse transform to the transform coefficients.

[Adder]

Adder 208 reconstructs the current block by summing prediction errors, which are inputs from inverse transformer 206, and prediction samples, which is an input from prediction controller 220. Adder 208 then outputs the reconstructed block to block memory 210 and loop filter 212.

[Block Memory]

Block memory 210 is storage for storing blocks in a picture to be decoded (hereinafter referred to as a current picture) for reference in intra prediction. More specifically, block memory 210 stores reconstructed blocks output from adder 208.

[Loop Filter]

Loop filter 212 applies a loop filter to blocks reconstructed by adder 208, and outputs the filtered reconstructed blocks to frame memory 214 and, for example, a display device.

When information indicating the enabling or disabling of ALF parsed from an encoded bitstream indicates enabled, one filter from among a plurality of filters is selected based on direction and activity of local gradients, and the selected filter is applied to the reconstructed block.

[Frame Memory]

Frame memory 214 is storage for storing reference pictures used in inter prediction, and is also referred to as a frame buffer. More specifically, frame memory 214 stores reconstructed blocks filtered by loop filter 212.

[Intra Predictor]

Intra predictor 216 generates a prediction signal (intra prediction signal) by intra prediction with reference to a block or blocks in the current picture and stored in block memory 210. More specifically, intra predictor 216 generates an intra prediction signal by intra prediction with reference to samples (for example, luma and/or chroma values) of a block or blocks neighboring the current block, and then outputs the intra prediction signal to prediction controller 220.

Note that when an intra prediction mode in which a chroma block is intra predicted from a luma block is selected, intra predictor 216 may predict the chroma component of the current block based on the luma component of the current block.

Moreover, when information indicating the application of PDPC is parsed from an encoded bitstream, intra predictor 216 corrects post-intra-prediction pixel values based on horizontal/vertical reference pixel gradients.

[Inter Predictor]

Inter predictor 218 predicts the current block with reference to a reference picture stored in frame memory 214. Inter prediction is performed per current block or per sub-block (for example, per 4×4 block) in the current block. For example, inter predictor 218 generates an inter prediction signal of the current block or sub-block by motion compensation by using motion information (for example, a motion vector) parsed from an encoded bitstream, and outputs the inter prediction signal to prediction controller 220.

Note that when the information parsed from the encoded bitstream indicates application of OBMC mode, inter predictor 218 generates the inter prediction signal using motion information for a neighboring block in addition to motion information for the current block obtained from motion estimation.

Moreover, when the information parsed from the encoded bitstream indicates application of FRUC mode, inter predictor 218 derives motion information by performing motion estimation in accordance with the pattern matching method (bilateral matching or template matching) parsed from the encoded bitstream. Inter predictor 218 then performs motion compensation using the derived motion information.

Moreover, when BIO mode is to be applied, inter predictor 218 derives a motion vector based on a model assuming uniform linear motion. Moreover, when the information parsed from the encoded bitstream indicates that affine motion compensation prediction mode is to be applied, inter predictor 218 derives a motion vector of each sub-block based on motion vectors of neighboring blocks.

[Prediction Controller]

Prediction controller 220 selects either the intra prediction signal or the inter prediction signal, and outputs the selected prediction signal to adder 208.

Embodiment 2

An encoder and a decoder according to the present embodiment each include the entirety or a part of the configuration and/or all or some of the functions of a generative adversarial network (GAN).

Figure 11:
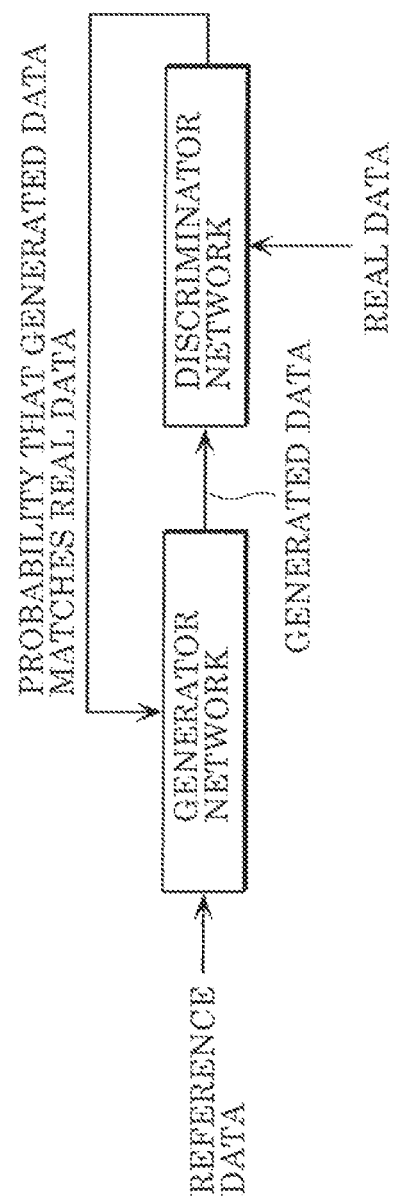
FIG. 11 is a block diagram illustrating a configuration of a generative adversarial network (GAN)

FIG. 11 is a block diagram illustrating a configuration of a GAN.

The GAN includes a generator network and a discriminator network.

The generator network is a neural network that outputs generated data, based on the input of reference data.

The discriminator network is a neural network that feeds back, to the generator network, a probability that the generated data matches real data, based on the input of the generated data output from the generator network and the real data.

Here, the generator network and the discriminator network are each updated each time input and output of data are repeated. Thus, the networks are each trained.

Specifically, the generator network is updated to further increase the probability, upon the probability being fed back from the discriminator network. As a result, the generator network is updated to output, based on reference data, generated data more similar to real data. Stated differently, the generator network is trained to cause the discriminator network to identify the generated data output based on the input of reference data as being real data.

On the other hand, the discriminator network is updated to maximize a probability of correctly labeling generated data output from the generator network. As a result, the discriminator network is updated to more appropriately identify whether the generated data is real data. In other words, the discriminator network is trained to appropriately discriminate if the generated data is real data.

Such networks used for the GAN are applied to the encoder and the decoder, thus raising a possibility of improving encoding efficiency, a possibility of reducing a processing burden, and a possibility of simplifying a configuration, for instance.

For example, it is conceivable to apply the networks of the GAN to generate predicted images in the encoder and the decoder.

Figure 12:
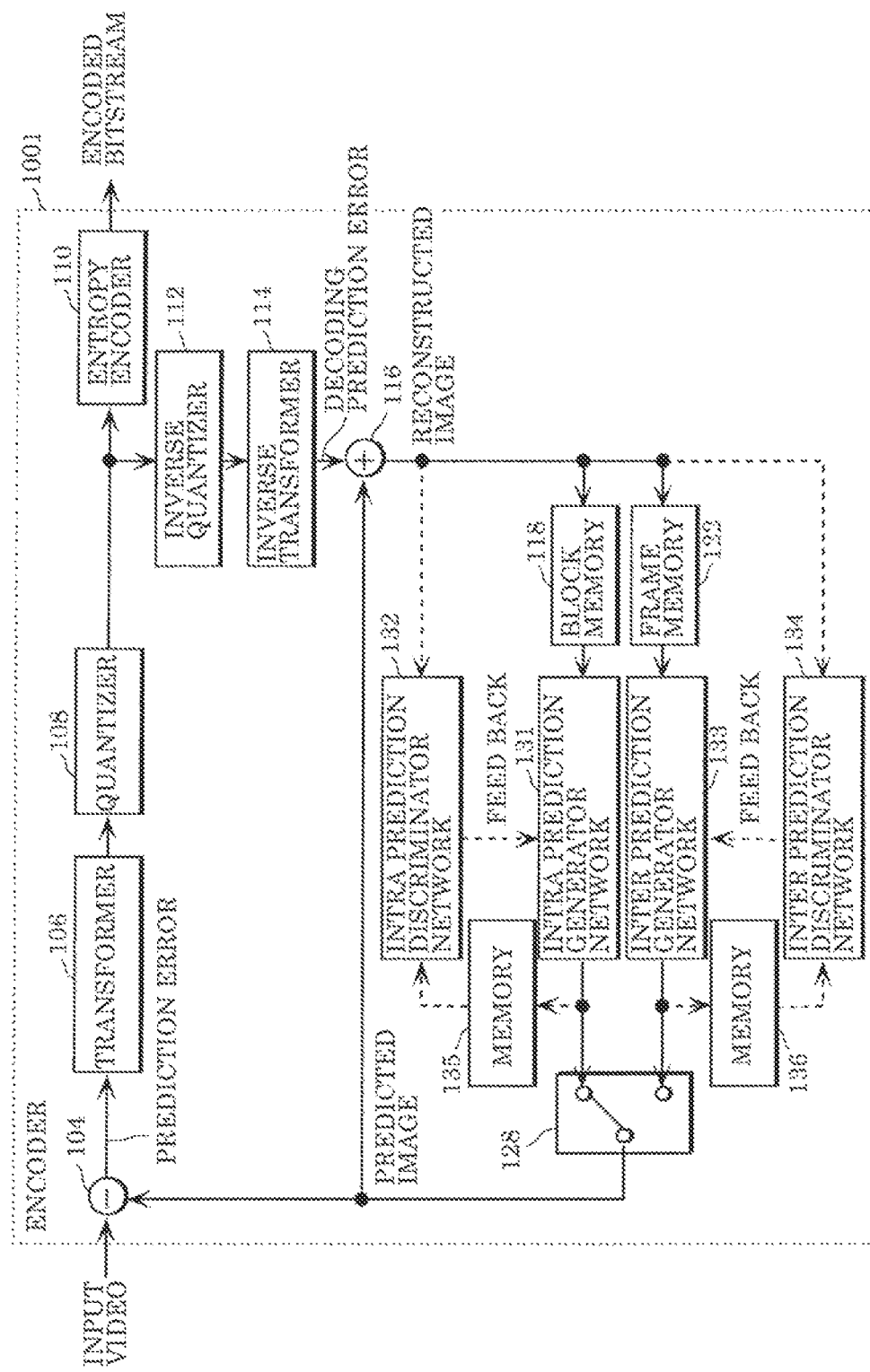
FIG. 12 is a block diagram illustrating a configuration of an encoder according to Embodiment 2.

FIG. 12 is a block diagram illustrating a configuration of the encoder according to the present embodiment.

Encoder 1001 according to the present embodiment is a device that predicts an image while training the networks of the GAN with the decoder, that is, a device that predicts an image while performing on-line training with the decoder.

Such encoder 1001 includes a prediction functional configuration to which the GAN is applied, instead of a prediction functional configuration constituted by intra predictor 124 and inter predictor 126 of encoder 100 in Embodiment 1. The prediction functional configuration to which the GAN is applied includes intra prediction generator network 131, intra prediction discriminator network 132, inter prediction generator network 133, inter prediction discriminator network 134, memory 135, and memory 136. Note that encoder 1001 illustrated in FIG. 12 does not include elements such as splitter 102 and loop filter 120, but may include such elements.

Intra prediction generator network 131 and intra prediction discriminator network 132 constitute a GAN.

Intra prediction generator network 131 outputs an intra-predicted image (also referred to as an intra prediction signal) as generated data, based on the input of reference data that is an image of a reconstructed block stored in block memory 118. Thus, an intra-predicted image is generated. Note that the image of a reconstructed block is also referred to as a reference image.

Memory 135 temporarily stores the intra-predicted image generated by intra prediction generator network 131.

An intra-predicted image generated by intra prediction generator network 131 and stored in memory 135 is input to intra prediction discriminator network 132. Furthermore, a reconstructed image (also referred to as a reconstructed block) output from adder 116 is input to intra prediction discriminator network 132. Then, intra prediction discriminator network 132 feeds back, to intra prediction generator network 131, a probability that the intra-predicted image matches the reconstructed image, based on the input of the images. Note that an intra-predicted image and a reconstructed image correspond to a current block to be encoded in a picture. Further, a reconstructed image corresponds to real data in the GAN.

Similarly, inter prediction generator network 133 and inter prediction discriminator network 134 constitute a GAN.

Inter prediction generator network 133 outputs an inter-predicted image (also referred to as an inter prediction signal) as generated data, based on the input of reference data that is the entirety or a portion of a reconstructed picture stored in frame memory 122. Thus, an inter-predicted image is generated. Note that the entirety or a portion of a reconstructed picture is also referred to as a reference image.

Memory 136 temporarily stores an inter-predicted image generated by inter prediction generator network 133.

An inter-predicted image generated by inter prediction generator network 133 and stored in memory 136 is input to inter prediction discriminator network 134. Further, a reconstructed image (also referred to as a reconstructed block) output from adder 116 is input to inter prediction discriminator network 134. Then, inter prediction discriminator network 134 feeds back, to inter prediction generator network 133, a probability that the inter-predicted image matches the reconstructed image, based on the input of the images. Note that an inter-predicted image and a reconstructed image correspond to a current block to be encoded in a picture. A reconstructed image corresponds to real data in the GAN.

Such encoder 1001 trains the networks to reduce the difference between a predicted image and a reconstructed image. Accordingly, this yields reduction in a prediction error.

Figure 13:
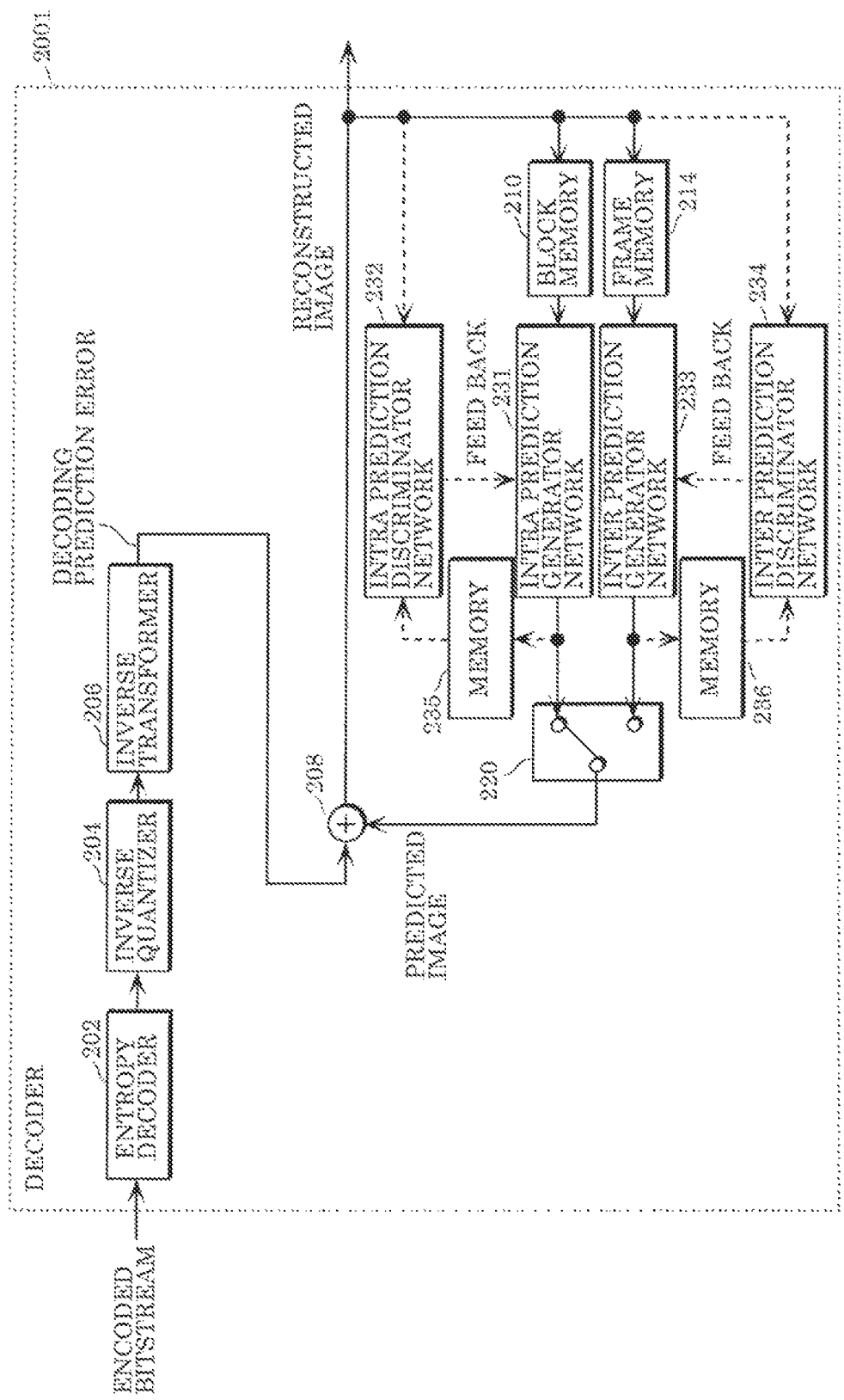
FIG. 13 is a block diagram illustrating a configuration of a decoder according to Embodiment 2.

FIG. 13 is a block diagram illustrating a configuration of a decoder according to the present embodiment.

Decoder 2001 according to the present embodiment includes a prediction functional configuration to which a GAN is applied, instead of a prediction functional configuration constituted by intra predictor 216 and inter predictor 218 of decoder 200 according to Embodiment 1. The prediction functional configuration to which the GAN is applied includes intra prediction generator network 231, intra prediction discriminator network 232, inter prediction generator network 233, inter prediction discriminator network 234, memory 235, and memory 236. Note that decoder 2001 illustrated in FIG. 13 does not include loop filter 212, but may include loop filter 212.

Intra prediction generator network 231 and intra prediction discriminator network 232 constitute a GAN.

Intra prediction generator network 231 outputs an intra-predicted image (also, referred to as an intra prediction signal) as generated data, based on the input of reference data that is an image of a reconstructed block stored in block memory 210. Thus, an intra-predicted image is generated. Note that an image of a reconstructed block is a decoded image, and is also referred to as a reference image.

Memory 235 temporarily stores an intra-predicted image generated by intra prediction generator network 231.

An intra-predicted image generated by intra prediction generator network 231 and stored in memory 235 is input to intra prediction discriminator network 232. Furthermore, a reconstructed image (also referred to as a reconstructed block) output from adder 208 is input to intra prediction discriminator network 232. Intra prediction discriminator network 232 feeds back, to intra prediction generator network 231, a probability that the intra-predicted image matches the reconstructed image, based on the input of the images. Note that an intra-predicted image and a reconstructed image correspond to a current block to be decoded in a picture. A reconstructed image corresponds to real data in the GAN.

Similarly, inter prediction generator network 233 and inter prediction discriminator network 234 constitute a GAN.

Inter prediction generator network 233 generates an inter-predicted image (also referred to as an inter prediction signal) as generated data, based on the input of reference data that is the entirety or a portion of a reconstructed picture stored in frame memory 214. Specifically, an inter-predicted image is generated. Note that the entirety or a portion of a reconstructed picture is also referred to as a reference image.

Memory 236 temporarily stores an inter-predicted image generated by inter prediction generator network 233.

An inter-predicted image generated by inter prediction generator network 233 and stored in memory 236 is input to inter prediction discriminator network 234. Furthermore, a reconstructed image (also referred to as a reconstructed block) output from adder 208 is input to inter prediction discriminator network 134. Then, inter prediction discriminator network 234 feeds back, to inter prediction generator network 233, a probability that an inter-predicted image matches a reconstructed image, based on the input of the images. Note that an inter-predicted image and a reconstructed image correspond to a current block to be decoded in a picture. A reconstructed image corresponds to real data in the GAN.

Such decoder 2001 trains the networks to reduce the difference between a predicted image and a reconstructed image in the same manner as encoder 1001. Thus, the networks in encoder 1001 and decoder 2001 in the present embodiment are trained in a similar manner to reduce the difference between a predicted image and a reconstructed image in encoder 1001 and decoder 2001.

The networks in encoder 1001 and decoder 2001 according to the present embodiment may be updated before encoding a leading picture or frame or before encoding a picture or a frame at a random access point. When encoder 1001 and decoder 2001 can both use off-line training parameters, the parameters may be used for updating the networks. The off-line training parameters may be, for example, parameters such as weights obtained for the networks by off-line training in Embodiment 3 as described below or may be other parameters.

Here, encoder 1001 illustrated in FIG. 12 and decoder 2001 illustrated in FIG. 13 each perform prediction using networks, but may switch between such prediction performed using the networks and prediction performed without using the networks. The prediction performed without using the networks is, for example, intra prediction or inter prediction specified in the image encoding standard.

Figure 14:
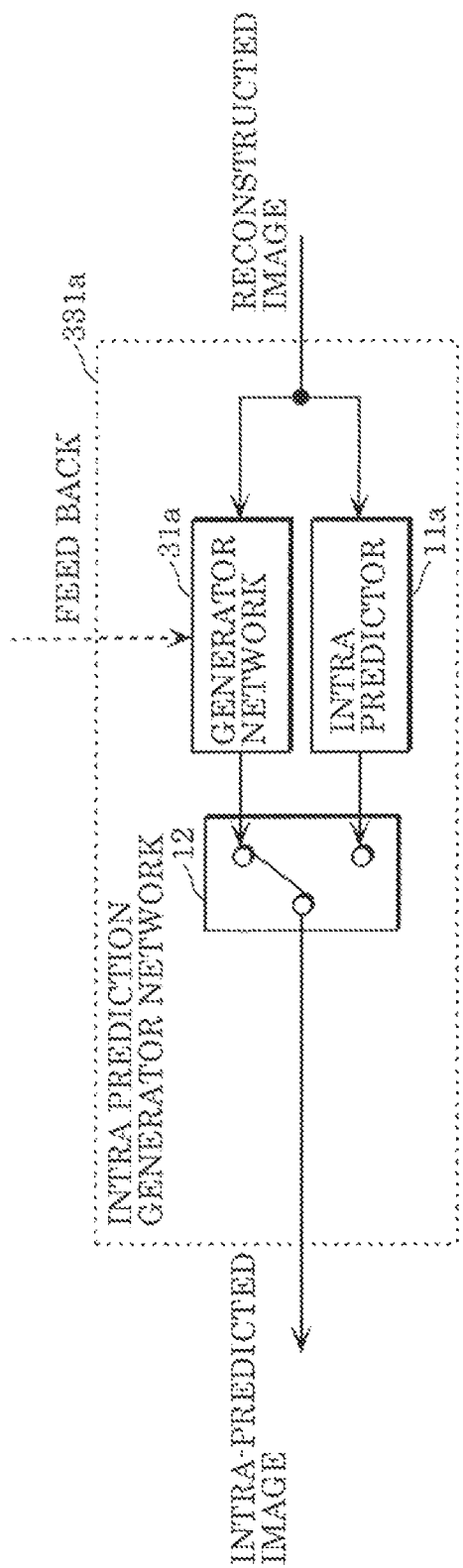
FIG. 14 illustrates another example of an intra prediction generator network in Embodiment 2.

FIG. 14 illustrates another example of the intra prediction generator network.

Intra prediction generator network 331*a* illustrated in FIG. 14 switches prediction to obtain an intra-predicted image between prediction performed using a network and prediction performed without using the network (that is, intra prediction).

Intra prediction generator network 331*a* includes generator network 31*a*, intra predictor 11*a*, and switch 12.

Generator network 31*a* has the same function and the same configuration as those of one of intra prediction generator networks 131 and 231 illustrated in FIG. 12 and FIG. 13, respectively. Specifically, generator network 31*a* directly generates an intra-predicted image by the prediction using the network.

Intra predictor 11*a* has the same function and the same configuration as those of one of intra predictors 124 and 216 illustrated in FIG. 1 and FIG. 10, respectively. Specifically, intra predictor 11a generates an intra-predicted image by the intra prediction without using the network.

Switch 12 switches an intra-predicted image output from intra prediction generator network 331a between an intra-predicted image generated by generator network 31a and an intra-predicted image generated by intra predictor 11a.

Accordingly, generation of an intra-predicted image by generator network 31a, that is, the prediction performed using the network can be used as a new mode added to conventional intra prediction modes.

Figure 15:
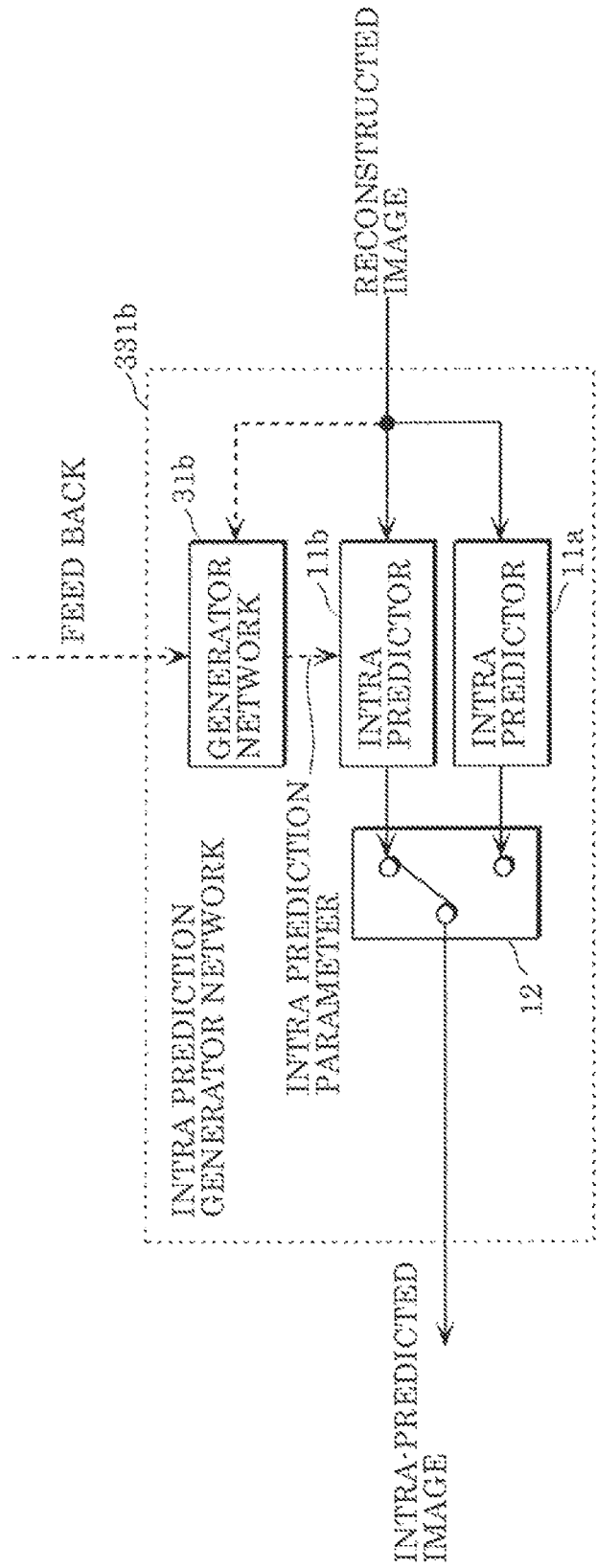
FIG. 15 illustrates yet another example of the intra prediction generator network in Embodiment 2.

FIG. 15 illustrates yet another example of the intra prediction generator network.

Intra prediction generator network 331b illustrated in FIG. 15 switches prediction to obtain an intra-predicted image between prediction performed using the network and prediction performed without using the network (that is, intra prediction). Such intra prediction generator network 331b uses not only a network but also an intra prediction method even when performing prediction using the network, unlike intra prediction generator network 331a illustrated in FIG. 14.

Intra prediction generator network 331b includes generator network 31b, intra predictors 11a and 11b, and switch 12.

Generator network 31b generates intra prediction parameters as generated data. The intra prediction parameters include at least one of the size of a current block to be predicted, the shape of the current block, the type of a reference sample filter, or an intra prediction mode, for example. Note that a reference sample filter is applied to pixels that neighbor the current block to be predicted, for example.

Intra predictor 11b generates an intra-predicted image by intra prediction using the intra prediction parameters generated by generator network 31b. Specifically, generator network 31b and intra predictor 11b generate an intra-predicted image by intra prediction using the network indirectly.

Intra predictor 11a has the same function and the same configuration as those of one of intra predictors 124 and 216 illustrated in FIG. 1 and FIG. 10, respectively, as described above.

Switch 12 switches an intra-predicted image output from intra prediction generator network 331b between an intra-predicted image generated by intra predictor 11a and an intra-predicted image generated by intra predictor 11b.

Figure 16:
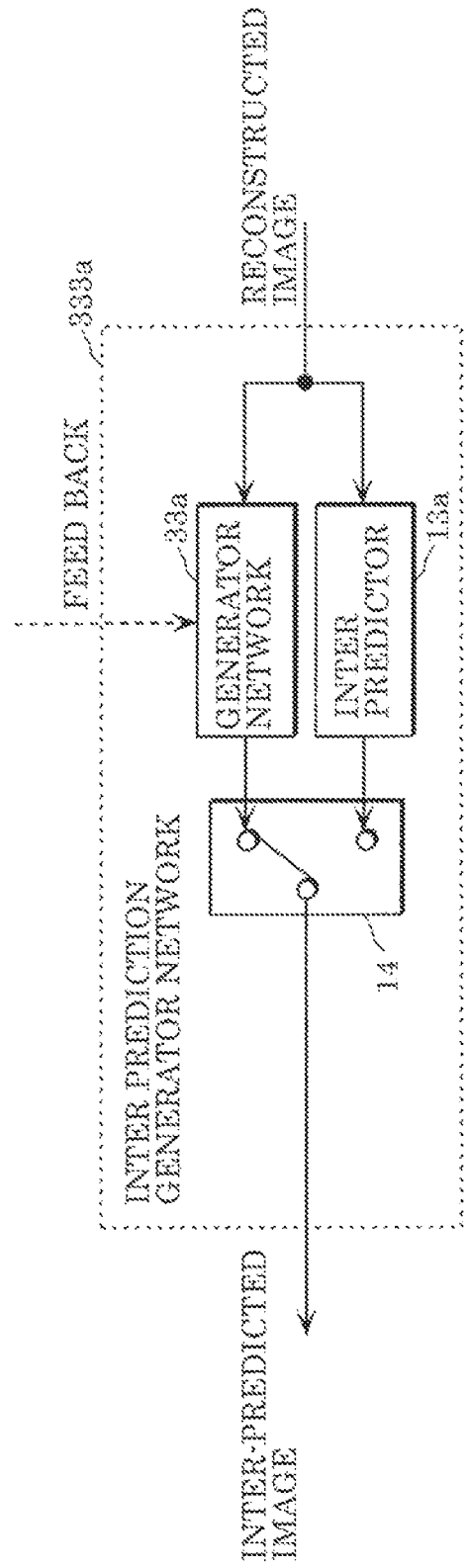
FIG. 16 illustrates another example of an inter prediction generator network in Embodiment 2.

FIG. 16 illustrates another example of the inter prediction generator network.

Inter prediction generator network 333a illustrated in FIG. 16 switches prediction to obtain an inter-predicted image between prediction performed using a network and prediction performed without using the network (namely, inter prediction).

Inter prediction generator network 333a includes generator network 33a, inter predictor 13a, and switch 14.

Generator network 33a has the same function and the same configuration as those of one of inter prediction generator networks 133 and 233 illustrated in FIG. 12 and FIG. 13, respectively. Specifically, generator network 33a directly generates an inter-predicted image by prediction using the network.

Inter predictor 13a has the same function and the same configuration as those of one of inter predictors 126 and 218 illustrated in FIG. 1 and FIG. 10, respectively. Specifically, inter predictor 13a generates an inter-predicted image by inter prediction without using the network.

Switch 14 switches an inter-predicted image output from inter prediction generator network 333a between an inter-predicted image generated by generator network 33a and an inter-predicted image generated by inter predictor 13a.

Accordingly, generation of an inter-predicted image by generator network 33a, namely, prediction using a network can be used as a new mode added to conventional inter prediction modes.

Figure 17:
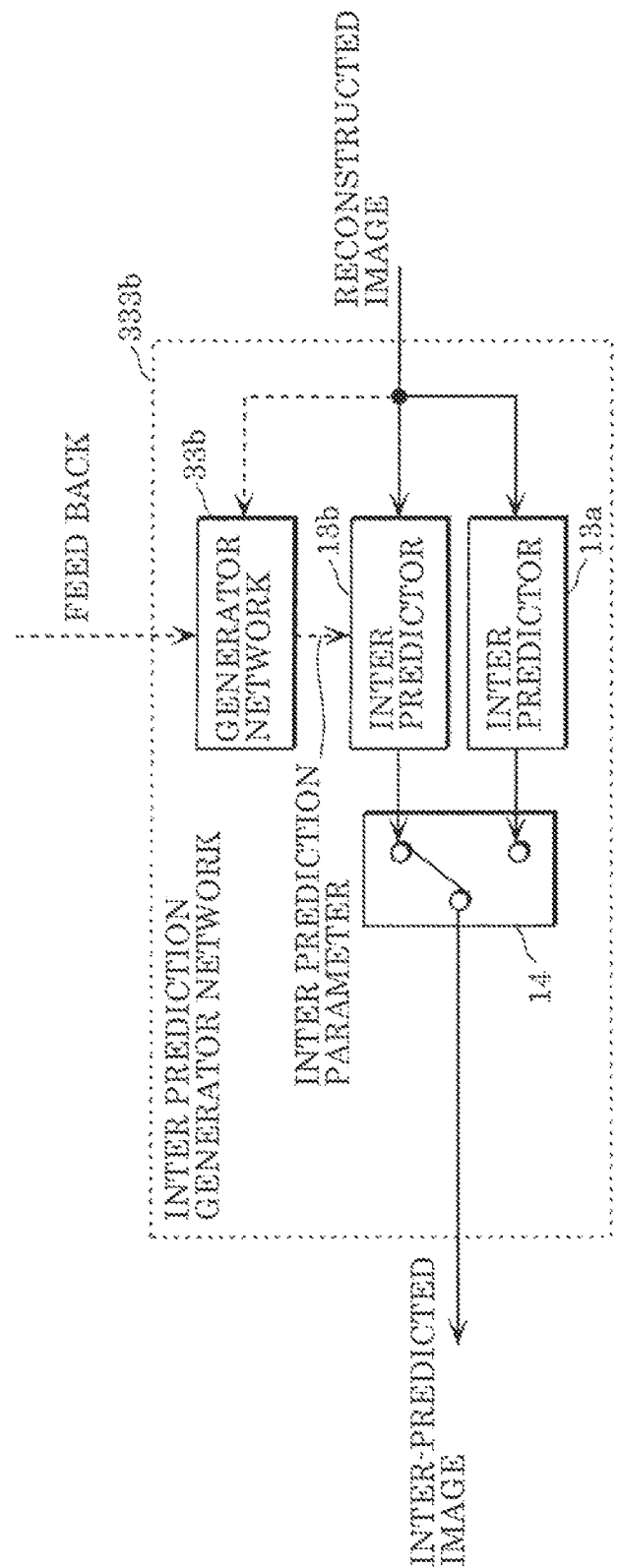
FIG. 17 illustrates yet another example of the inter prediction generator network in Embodiment 2.

FIG. 17 illustrates yet another example of an inter prediction generator network.

Inter prediction generator network 333b illustrated in FIG. 17 switches prediction to obtain an inter-predicted image between prediction performed using a network and prediction performed without using the network (namely, inter prediction). Such inter prediction generator network 333b uses not only a network but also an inter prediction method even when performing prediction using the network, unlike inter prediction generator network 333a illustrated in FIG. 16.

Inter prediction generator network 333b includes generator network 33b, inter predictors 13a and 13b, and switch 14.

Generator network 33b generates inter prediction parameters as generated data. The inter prediction parameters include at least one of, for example, the size of a current block to be predicted, the shape of the current block, a reference picture index, or an inter prediction mode. Note that the inter prediction mode includes the L0 prediction and the L1 prediction in each of which one picture is referred to, and bi-prediction in which two pictures are referred to.

Inter predictor 13b generates an inter-predicted image by inter prediction using the inter prediction parameters generated by generator network 33b. Specifically, generator network 33b and inter predictor 13b generate an inter-predicted image by inter prediction using the network indirectly.

Inter predictor 13a has the same function and the same configuration as those of one of inter predictors 126 and 218 illustrated in FIG. 1 and FIG. 10, respectively, as described above.

Switch 14 switches an inter-predicted image output from inter prediction generator network 333b between an inter-predicted image generated by inter predictor 13a and an inter-predicted image generated by inter predictor 13b.

Embodiment 3

Encoder 1001 and decoder 2001 according to Embodiment 2 each predict an image while training the networks, that is, each predict an image while performing on-line training. On the other hand, an encoder according to the present embodiment first constructs networks of a GAN by training. Then, the encoder and the decoder each predict an image using the networks constructed by the training. Specifically, the encoder and the decoder according to the present embodiment use the networks of the GAN constructed by off-line training.

Figure 18:
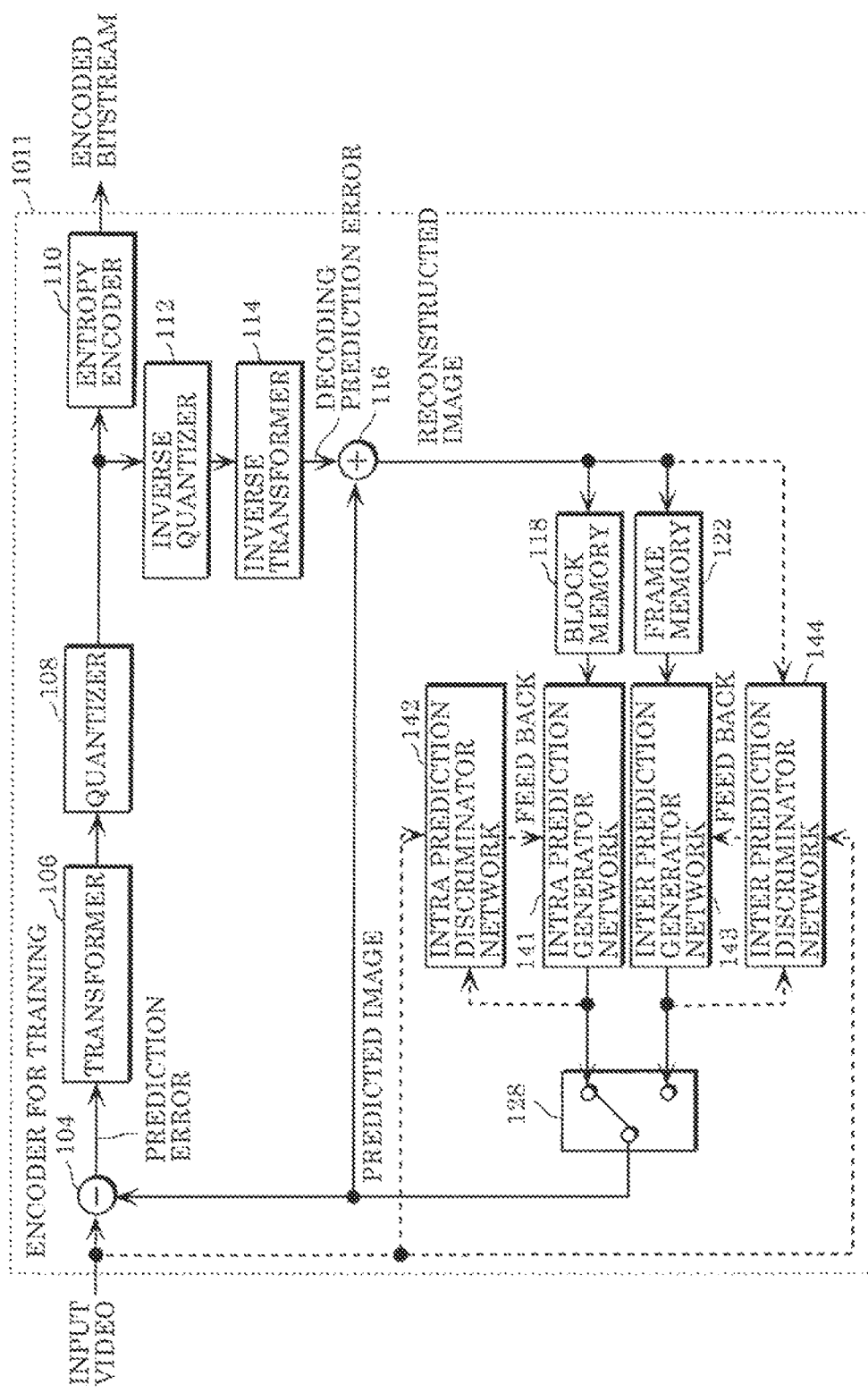
FIG. 18 is a block diagram illustrating a configuration of an encoder for training according to Embodiment 3.

FIG. 18 is a block diagram illustrating a configuration of an encoder for training according to the present embodiment.

Encoder 1011 is for training prediction. Such encoder 1011 includes intra prediction generator network 141, intra prediction discriminator network 142, inter prediction generator network 143, and inter prediction discriminator network 144 as a prediction functional configuration. Note that the configuration of encoder 1011 other than the above prediction functional configuration is the same as the configurations described in Embodiments 1 and 2.

Intra prediction generator network 141 and intra prediction discriminator network 142 constitute a GAN.

Intra prediction generator network 141 outputs an intra-predicted image (also referred to as an intra prediction signal) as generated data, based on the input of reference data that is an image of a reconstructed block stored in block memory 118. Thus, the intra-predicted image is generated. Note that the image of a reconstructed block is also referred to as a reference image.

The intra-predicted image generated by intra prediction generator network 141 is input to intra prediction discriminator network 142. Furthermore, an image of a block included in an input video (hereinafter, an input image) is input to intra prediction discriminator network 142. Intra prediction discriminator network 142 feeds back, to intra prediction generator network 141, a probability that the intra-predicted image matches the input image, based on the input of the images. Note that the intra-predicted image and the input image correspond to a current block to be encoded in a picture. The input image corresponds to real data in a GAN.

Similarly, inter prediction generator network 143 and inter prediction discriminator network 144 constitute a GAN.

Inter prediction generator network 143 generates an inter-predicted image (also referred to as an inter prediction signal) as generated data, based on the input of reference data that is the entirety or a portion of a reconstructed picture stored in frame memory 122. Thus, an inter-predicted image is generated. Note that the entirety or a portion of a reconstructed picture is also referred to as a reference image.

The inter-predicted image generated by inter prediction generator network 143 is input to inter prediction discriminator network 144. Furthermore, an input image is input to inter prediction discriminator network 144. Inter prediction discriminator network 144 feeds back, to inter prediction generator network 143, a probability that the inter-predicted image matches the input image. Note that an inter-predicted image and an input image correspond to a current block to be encoded in a picture. The input image corresponds to real data in the GAN.

In such encoder 1011, the networks are trained to reduce the difference between a predicted image and an input image.

Figure 19:
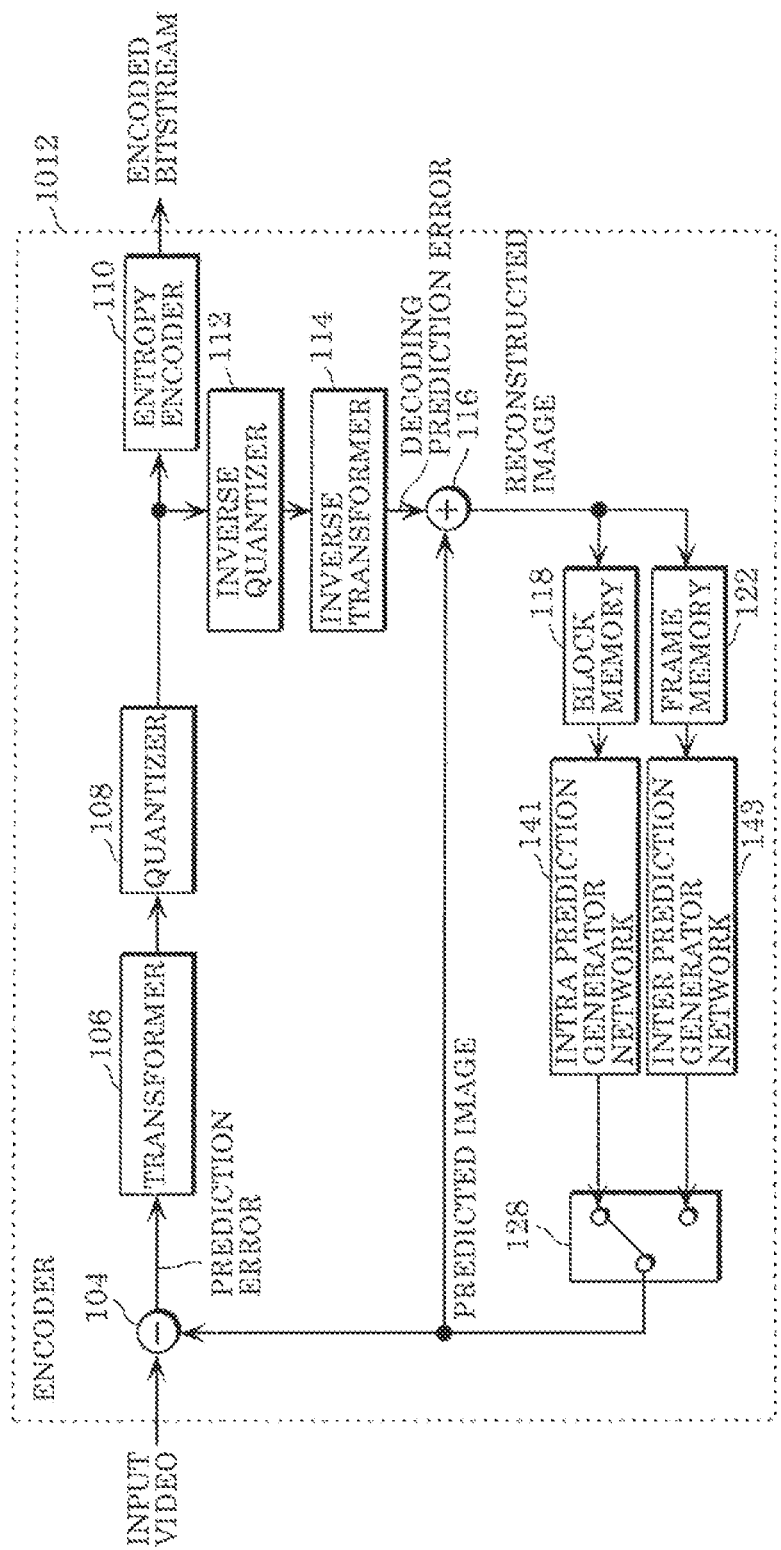
FIG. 19 is a block diagram illustrating a configuration of a trained encoder according to Embodiment 3.

FIG. 19 is a block diagram illustrating a configuration of a trained encoder according to the present embodiment.

Encoder 1012 is a trained encoder from which intra prediction discriminator network 142 and inter prediction discriminator network 144 are excluded among the elements included in encoder 1011 for training illustrated in FIG. 18.

Intra prediction generator network 141 and inter prediction generator network 143 that are included in encoder 1012 are constructed by training in encoder 1011 for training.

Specifically, encoder 1012 according to the present embodiment includes processing circuitry and memory. Using the memory, the processing circuitry first generates a predicted image of an input image that is a current image to be encoded, based on generated data output from a generator network that is a neural network in response to a reference image being input to the generator network. Then, the processing circuitry calculates a prediction error by subtracting the predicted image from the input image, and generates an encoded image by at least transforming the prediction error. The processing circuitry includes a CPU, for example, and functions as elements other than block memory 118, frame memory 122, intra prediction generator network 141, and inter prediction generator network 143 that are illustrated in FIG. 19. The generator network described above is at least one of intra prediction generator network 141 or inter prediction generator network 143. Such a generator network may be stored in the memory.

Accordingly, a predicted image is generated based on generated data output from the generator network, and thus a predicted image similar to an input image according to the configuration of a generator network, that is, a neural network, can be generated, and as a result, encoding efficiency can be improved. It is not necessary to perform complicated intra prediction or inter prediction to generate a predicted image, and thus processing burden can be reduced and/or the configuration can be simplified, for instance.

Encoder 1011 according to the present embodiment includes the elements included in encoder 1012, and also includes intra prediction discriminator network 142 and inter prediction discriminator network 144. Specifically, in encoder 1011, the processing circuitry further: feeds back, to the generator network, a probability that the predicted image matches the input image by inputting the input image and the predicted image to a discriminator network, the discriminator network being a neural network and constituting a generative adversarial network (GAN) with the generator network. The processing circuitry updates the generator network and the discriminator network to reduce difference between the input image and the predicted image and increase accuracy of discriminating between the input image and the predicted image. Note that the above discriminator network is at least one of intra prediction discriminator network 142 or inter prediction discriminator network 144.

Accordingly, generated data for generating a predicted image more similar to an input image can be obtained from the generator network by being trained by the GAN through machine learning. As a result, encoding efficiency can be further improved.

In encoders 1011 and 1012 according to the present embodiment, the reference image is a processed image included in a picture, the picture including the input image. Stated differently, the reference image is a reconstructed image included in the picture. In generating the predicted image, the processing circuitry generates a first intra-predicted image as the predicted image, based on the generated data. Thus, intra prediction generator network 141 generates an intra-predicted image. Accordingly, an intra-predicted image similar to an input image can be generated.

In encoders 1011 and 1012 according to the present embodiment, the reference image is included in a processed picture different from a picture that includes the input image. Thus, the reference image is included in a reconstructed picture different from the picture that includes the input image. In generating the predicted image, the processing circuitry generates a first inter-predicted image as the predicted image, based on the generated data. Stated differently, inter prediction generator network 143 generates an inter-predicted image. Accordingly, an inter-predicted image similar to an input image can be generated.

Note that the generator network and the discriminator network in the present embodiment are hierarchical networks each including an input layer, a hidden layer, and an output layer.

Figure 20:
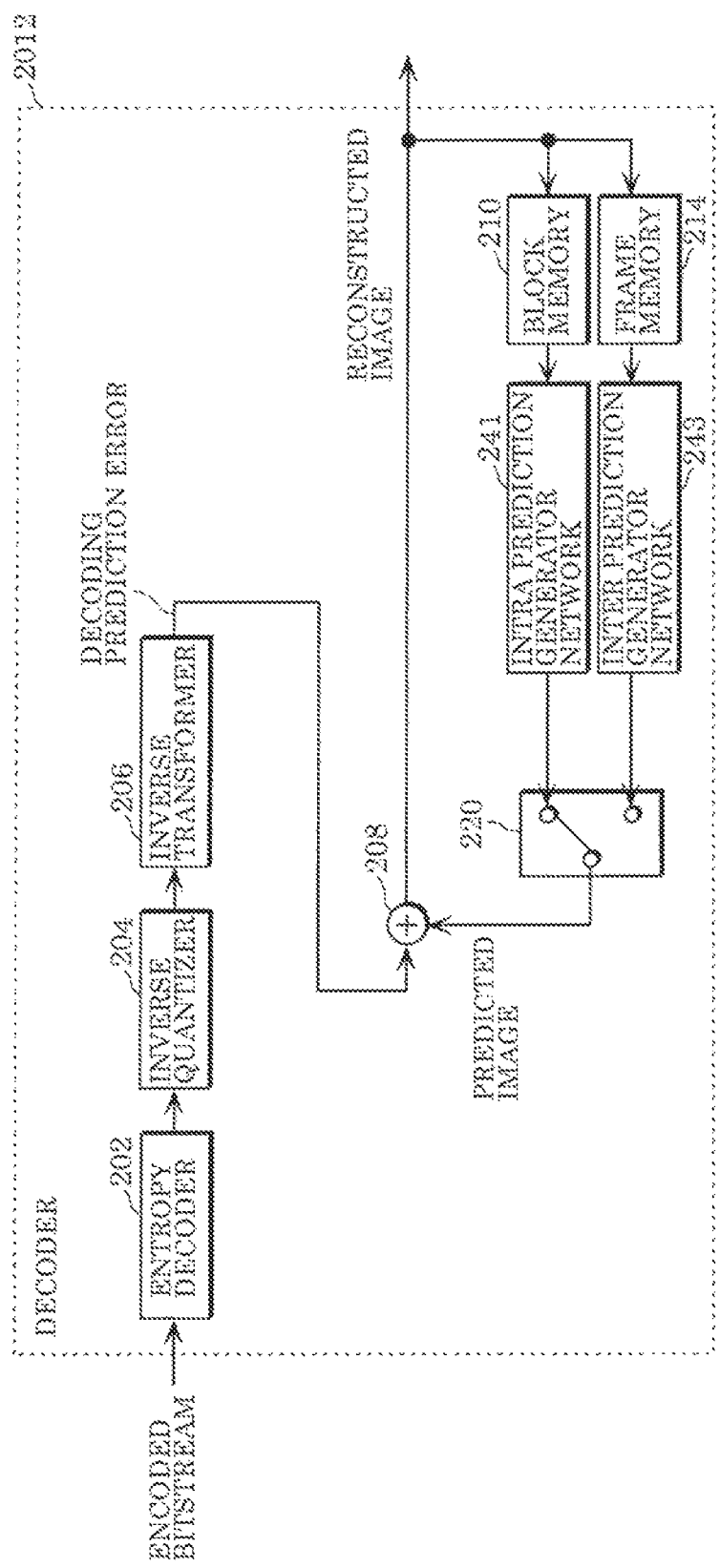
FIG. 20 is a block diagram illustrating a configuration of a decoder according to Embodiment 3.

FIG. 20 is a block diagram illustrating a configuration of a decoder according to the present embodiment.

Decoder 2012 includes a prediction functional configuration to which the networks of the GAN are applied, instead of the prediction functional configuration that includes intra predictor 216 and inter predictor 218 of decoder 200 according to Embodiment 1. The prediction functional configuration to which the networks of the GAN are applied includes intra prediction generator network 241 and inter prediction generator network 243. Note that decoder 2012 illustrated in FIG. 20 does not include loop filter 212, but may include loop filter 212.

Intra prediction generator network 241 and inter prediction generator network 243 are the same as intra prediction generator network 141 and inter prediction generator network 143, respectively, which are constructed through training in encoder 1011 for training illustrated in FIG. 18.

Specifically, decoder 2012 according to the present embodiment includes processing circuitry, and memory. Using the memory, the processing circuitry first generates a decoding prediction error by performing at least inverse transform on an encoded image that is a current image to be decoded. Them the processing circuitry generates a predicted image of the encoded image, based on generated data output from a generator network in response to a reference image being input to the generator network, the generator network being a neural network. Furthermore, the processing circuitry generates a decoded image by adding the decoding prediction error to the predicted image. The processing circuitry includes a CPU, for example, and functions as the elements except block memory 210, frame memory 214, intra prediction generator network 241, and inter prediction generator network 243 that are illustrated in FIG. 20. The above generator network is at least one of intra prediction generator network 241 or inter prediction generator network 243. Such a generator network may be stored in memory. An encoded image is, for example, an image of an encoded block included in an encoded bitstream, and a reference image is, for example, an already reconstructed image (that is, a reconstructed image or a decoded image) stored in block memory 210 or frame memory 214. Furthermore, the generator network that is a neural network may be stored in memory.

Accordingly, a predicted image is generated based on generated data output from the generator network, and thus a predicted image similar to an original image can be generated according to a configuration of the generator network, that is, a neural network, and as a result, encoding efficiency can be improved. Specifically, the amount of data of the decoding prediction error can be decreased. Note that the original image is an input image included in an input video used by encoder 1012 to generate an encoded image, for example. In the present embodiment, it is not necessary to perform complicated intra prediction or inter prediction to generate a predicted image, and thus a processing burden can be reduced and/or the configuration can be simplified, for instance.

The above generator network is a network trained by a GAN. Accordingly, training through machine learning by the GAN allows generated data for generating a predicted image more similar to an original image to be obtained from the generator network.

In decoder 2012 according to the present embodiment, the reference image is a processed image included in a picture, the picture including the encoded image. Thus, the reference picture is a reconstructed image included in the picture that includes an encoded block. In generating the predicted image, the processing circuitry generates a first intra-predicted image as the predicted image, based on the generated data. Stated differently, intra prediction generator network 241 generates an intra-predicted image. Accordingly, an intra-predicted image similar to an original image can be generated.

In decoder 2012 according to the present embodiment, the reference image is included in a processed picture different from a picture that includes the encoded image. Thus, the reference picture is an image included in a reconstructed picture different from the picture that includes the encoded block. Then, in generating the predicted image, the processing circuitry generates a first inter-predicted image as the predicted image, based on the generated data. Stated differently, inter prediction generator network 243 generates an inter-predicted image. Accordingly, an inter-predicted image similar to an original image can be generated.

Here, encoder 1012 illustrated in FIG. 19 and decoder 2012 illustrated in FIG. 20 each perform prediction using the networks, but may switch between such prediction performed using the networks and prediction performed without using the networks. Prediction performed without using the networks is, for example, intra prediction or inter prediction specified in the image coding standard.

Figure 21:
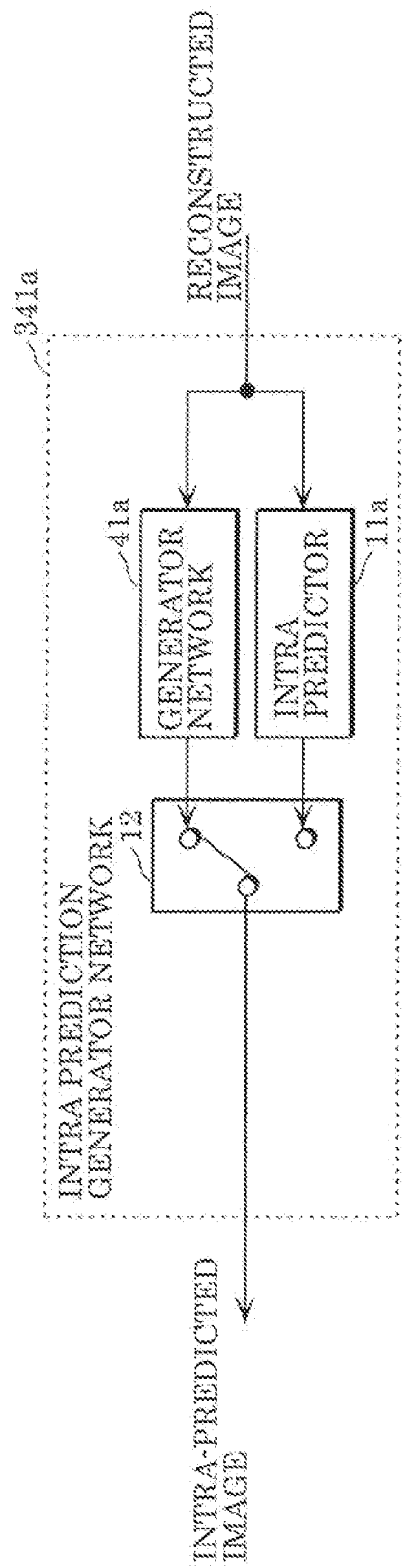
FIG. 21 illustrates another example of an intra prediction generator network according to Embodiment 3.

FIG. 21 illustrates another example of the intra prediction generator network.

Intra prediction generator network 341a illustrated in FIG. 21 switches prediction to obtain an intra-predicted image between prediction performed using a network and prediction performed without using the network (that is, intra prediction).

Intra prediction generator network 341a includes generator network 41a, intra predictor 11a, and switch 12.

Generator network 41a has the same function and the same configuration as those of one of intra prediction generator networks 141 and 241 illustrated in FIG. 19 and FIG. 20, respectively.

Intra predictor 11a has the same function and the same configuration as those of one of intra predictors 124 and 216 illustrated in FIG. 1 and FIG. 10, respectively, as described above. Thus, intra predictor 11a generates an intra-predicted image by intra prediction without using the network.

Switch 12 switches an intra-predicted image output from intra prediction generator network 341a between an intra-predicted image generated by generator network 41a and an intra-predicted image generated by intra predictor 11a.

Accordingly, generation of an intra-predicted image by generator network 41a, or in other words, intra prediction performed using the network can be used as a new mode added to conventional intra prediction modes.

Specifically, in encoders 1011 and 1012 according to the present embodiment, the processing circuitry generates a second intra-predicted image of the input image by intra prediction based on the reference image. Specifically, intra predictor 11a generates an intra-predicted image. The processing circuitry selects an image from among the first intra-predicted image and the second intra-predicted image, and when the processing circuitry selects the second intra-predicted image in selecting the image, calculates the prediction error by subtracting the second intra-predicted image from the input image.

Accordingly, the first intra-predicted image based on the output of generator network 41a or the second intra-predicted image based on the intra prediction is selected, and the selected image is used to calculate a prediction error. Thus, if an image with which a smaller prediction error is calculated is selected from among the first intra-predicted image and the second intra-predicted image, a possibility that encoding efficiency increases can be further enhanced.

In encoders 1011 and 1012 in the present embodiment, in generating the predicted image, the processing circuitry generates, as the first intra-predicted image, the generated data output from generator network 41a in response to the reference image (that is, a reconstructed image) being input to generator network 41a. Accordingly, an intra-predicted image similar to an input image can be generated directly from the output of generator network 41a.

In decoder 2012 according to the present embodiment, the processing circuitry further generates a second intra-predicted image of the encoded image by intra prediction based on the reference image. Specifically, intra predictor 11a generates an intra-predicted image. Furthermore, the processing circuitry selects an image from among the first intra-predicted image and the second intra-predicted image, and when the processing circuitry selects the second intra-predicted image in selecting the image, generates the decoded image by adding the decoding prediction error to the second intra-predicted image.

Accordingly, a first intra-predicted image based on the output of generator network 41a or a second intra-predicted image based on the intra prediction is selected, and the selected image is used to generate a decoded image. Thus, if an image used to generate an encoded image is selected from among the first intra-predicted image and the second intra-predicted image, the encoded image can be decoded appropriately. Note that encoder 1011 or 1012 may include, in an encoded bitstream, information for identifying an image used to generate an encoded image.

In decoder 2012 according to the present embodiment, in generating the predicted image, the processing circuitry generates, as the first intra-predicted image, the generated data output from generator network 41a in response to the reference image being input to generator network 41a. Accordingly, an intra-predicted image similar to an original image can be generated directly from the output of generator network 41a.

Figure 22:
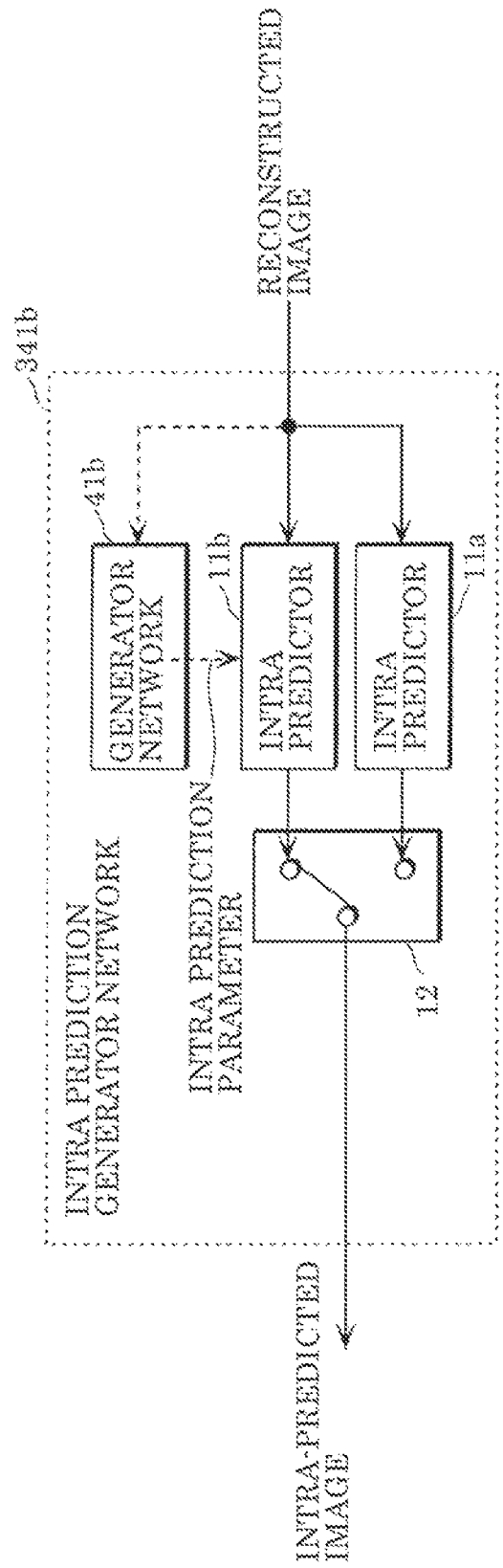
FIG. 22 illustrates yet another example of the intra prediction generator network in Embodiment 3.

FIG. 22 illustrates yet another example of the intra prediction generator network.

Intra prediction generator network 341b illustrated in FIG. 22 switches prediction to obtain an intra-predicted image between prediction performed using a network and prediction performed without using the network (that is, intra prediction). Such intra prediction generator network 341b uses not only a network but also an intra prediction method even when performing prediction using the network, unlike intra prediction generator network 341a illustrated in FIG. 21.

Intra prediction generator network 341b includes generator network 41b, intra predictors 11a and 11b, and switch 12.

Generator network 41b generates intra prediction parameters as generated data. The intra prediction parameters include at least one of the size of a current block to be predicted, the shape of the current block, the type of a reference sample filter, and an intra prediction mode, for example.

Intra predictor 11b generates an intra-predicted image by intra prediction using the intra prediction parameters generated by generator network 41b. Specifically, generator network 41b and intra predictor 11b generate an intra-predicted image by intra prediction performed using the network indirectly.

Intra predictor 11a has the same function and the same configuration as those of one of intra predictors 124 and 216 illustrated in FIG. 1 and FIG. 10, respectively, as described above.

Switch 12 switches an intra-predicted image output from intra prediction generator network 341b between an intra-predicted image generated by intra predictor 11a and an intra-predicted image generated by intra predictor 11b.

Specifically, in encoders 1011 and 1012 according to the present embodiment, in generating the predicted image, the processing circuitry obtains, as an intra prediction parameter, the generated data output from generator network 41b in response to the reference image being input to generator network 41b. Then, the processing circuitry generates the first intra-predicted image by intra prediction based on the reference image and the intra prediction parameter. Accordingly, an intra-predicted image similar to the input image can be indirectly generated from the output of generator network 41b.

Also in decoder 2012 in the present embodiment, similarly to encoders 1011 and 1012, in generating the predicted image, the processing circuitry obtains, as an intra prediction parameter, the generated data output from generator network 41b in response to the reference image being input to generator network 41b. Then, the processing circuitry generates the first intra-predicted image by intra prediction based on the reference image and the intra prediction parameter. Accordingly, an intra-predicted image similar to an original image can be indirectly generated from the output of generator network 41b.

Figure 23:
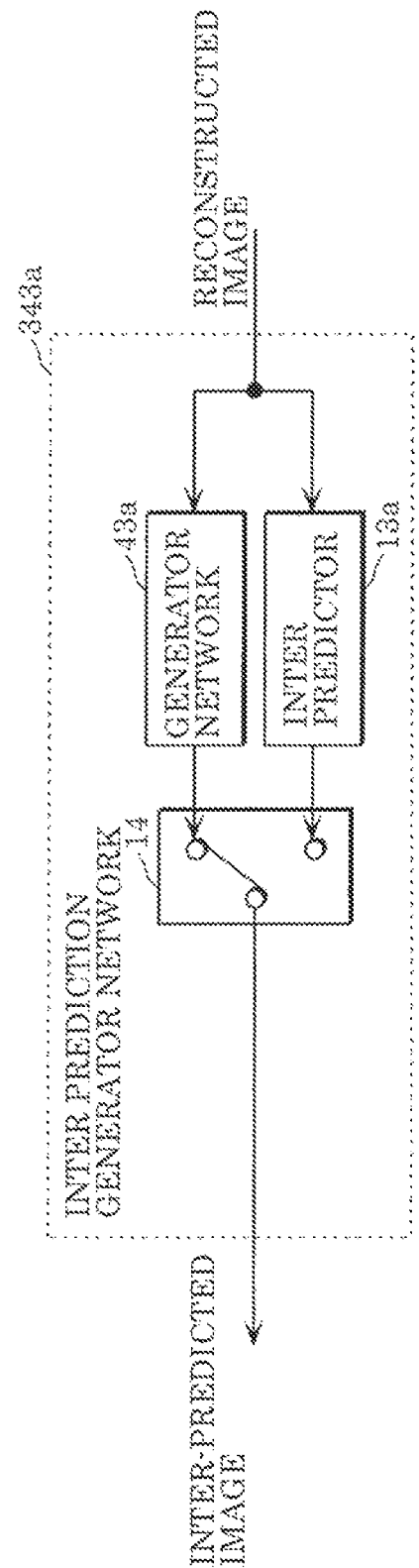
FIG. 23 illustrates another example of an inter prediction generator network in Embodiment 3.

FIG. 23 illustrates another example of the inter prediction generator network.

Inter prediction generator network 343a illustrated in FIG. 23 switches prediction to obtain an inter-predicted image between prediction performed using a network and prediction performed without using the network (namely, inter prediction).

Inter prediction generator network 343a includes generator network 43a, inter predictor 13a, and switch 14.

Generator network 43a has the same function and the same configuration as those of one of inter prediction generator networks 143 and 243 illustrated in FIG. 19 and FIG. 20, respectively.

Inter predictor 13a has the same function and the same configuration as those of one of inter predictors 126 and 218 illustrated in FIG. 1 and FIG. 10, respectively, as described above.

Switch 14 switches an inter-predicted image output from inter prediction generator network 343a between an inter-predicted image generated by generator network 43a and an inter-predicted image generated by inter predictor 13a.

Specifically, in encoders 1011 and 1012 according to the present embodiment, the processing circuitry further generates a second inter-predicted image of the input image by inter prediction based on the reference image. Specifically, inter predictor 13a generates an inter-predicted image. Then, the processing circuitry selects an image from among the first inter-predicted image and the second inter-predicted image, and when the processing circuitry selects the second inter-predicted image in selecting the image, calculates the prediction error by subtracting the second inter-predicted image from the input image.

Accordingly, the first inter-predicted image based on the output of generator network 43a or the second inter-predicted image based on inter prediction is selected, and the selected image is used to calculate a prediction error. Thus, if an image with which a smaller prediction error is calculated is selected from among the first inter-predicted image and the second inter-predicted image, a possibility that encoding efficiency increases can be further enhanced.

In encoders 1011 and 1012 according to the present embodiment, in generating the predicted image, the processing circuitry generates, as the first inter-predicted image, the generated data output from generator network 43a in response to the reference image (namely, reconstructed image) being input to generator network 43a. Accordingly, an inter-predicted image similar to an input image can be generated directly from the output of generator network 43a.

In decoder 2012 according to the present embodiment, the processing circuitry further generates a second inter-predicted image of the encoded image by inter prediction based on the reference image. Thus, inter predictor 13a generates an inter-predicted image. The processing circuitry further selects an image from among the first inter-predicted image and the second inter-predicted image, and when the processing circuitry selects the second inter-predicted image in selecting the image, generates the decoded image by adding the decoding prediction error to the second inter-predicted image.

Accordingly, the first inter-predicted image based on the output of generator network 43a or the second inter-predicted image based on inter prediction is selected, and the selected image is used to generate a decoded image. Accordingly, if an image used to generate an encoded image is selected from among the first inter-predicted image and the second inter-predicted image, the encoded image can be decoded appropriately.

In decoder 2012 according to the present embodiment, in generating the predicted image, the processing circuitry generates, as the first inter-predicted image, the generated data output from generator network 43a in response to the reference image being input to generator network 43a. Accordingly, an inter-predicted image similar to an original image can be generated directly from the output of generator network 43a.

Figure 24:
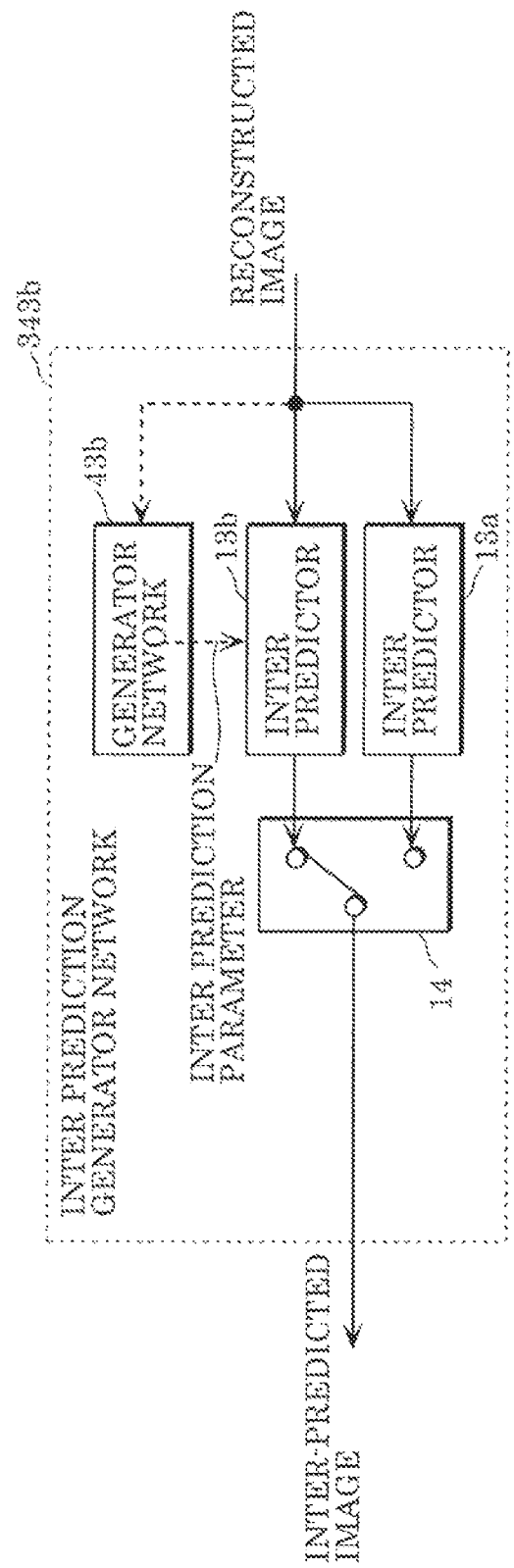
FIG. 24 illustrates yet another example of the inter prediction generator network in Embodiment 3.

FIG. 24 illustrates yet another example of the inter prediction generator network.

Inter prediction generator network 343b illustrated in FIG. 24 switches prediction to obtain an inter-predicted image between prediction performed using a network and prediction performed without using the network (namely, inter prediction). Such inter prediction generator network 343b uses not only a network but also an inter prediction method even when performing prediction using the network, unlike inter prediction generator network 343a illustrated in FIG. 23.

Inter prediction generator network 343b includes generator network 43b, inter predictors 13a and 13b, and switch 14.

Generator network 43b generates inter prediction parameters as generated data.

Inter predictor 13b generates an inter-predicted image by inter prediction using the inter prediction parameters generated by generator network 43b. Stated differently, generator network 43b and inter predictor 13b generate an inter-predicted image by inter prediction using the network indirectly.

Inter predictor 13a has the same function and the same configuration as those of one of inter predictors 126 and 218 illustrated in FIG. 1 and FIG. 10, respectively, as described above.

Switch 14 switches an inter-predicted image output from inter prediction generator network 343b between an inter-predicted image generated by inter predictor 13a and an inter-predicted image generated by inter predictor 13b.

Specifically, in encoders 1011 and 1012 according to the present embodiment, in generating the predicted image, the processing circuitry obtains, as an inter prediction parameter, the generated data output from generator network 43b in response to the reference image being input to generator network 43b. Then, the processing circuitry generates the first inter-predicted image by inter prediction based on the reference image and the inter prediction parameter. Accordingly, an inter-predicted image similar to an input image can be generated indirectly from the output of generator network 43b.

Also, in decoder 2012 according to the present embodiment, similarly to encoders 1011 and 1012, in generating the predicted image, the processing circuitry obtains, as an inter prediction parameter, the generated data output from generator network 43b in response to the reference image being input to generator network 43b. Then, the processing circuitry generates the first inter-predicted image by inter prediction based on the reference image and the inter prediction parameter. Accordingly, an inter-predicted image similar to an original image can be generated indirectly from the output of generator network 43b.

Embodiment 4

An encoder and a decoder according to the present embodiment do not use a network to generate a predicted image as with Embodiment 1, but uses a network to select a predicted image from among an intra-predicted image and an inter-predicted image. The encoder according to the present embodiment performs off-line training similarly to Embodiment 3. Specifically, the encoder and the decoder according to the present embodiment select a predicted image (or in other words, select a prediction mode) using a network trained by off-line training.

Figure 25:
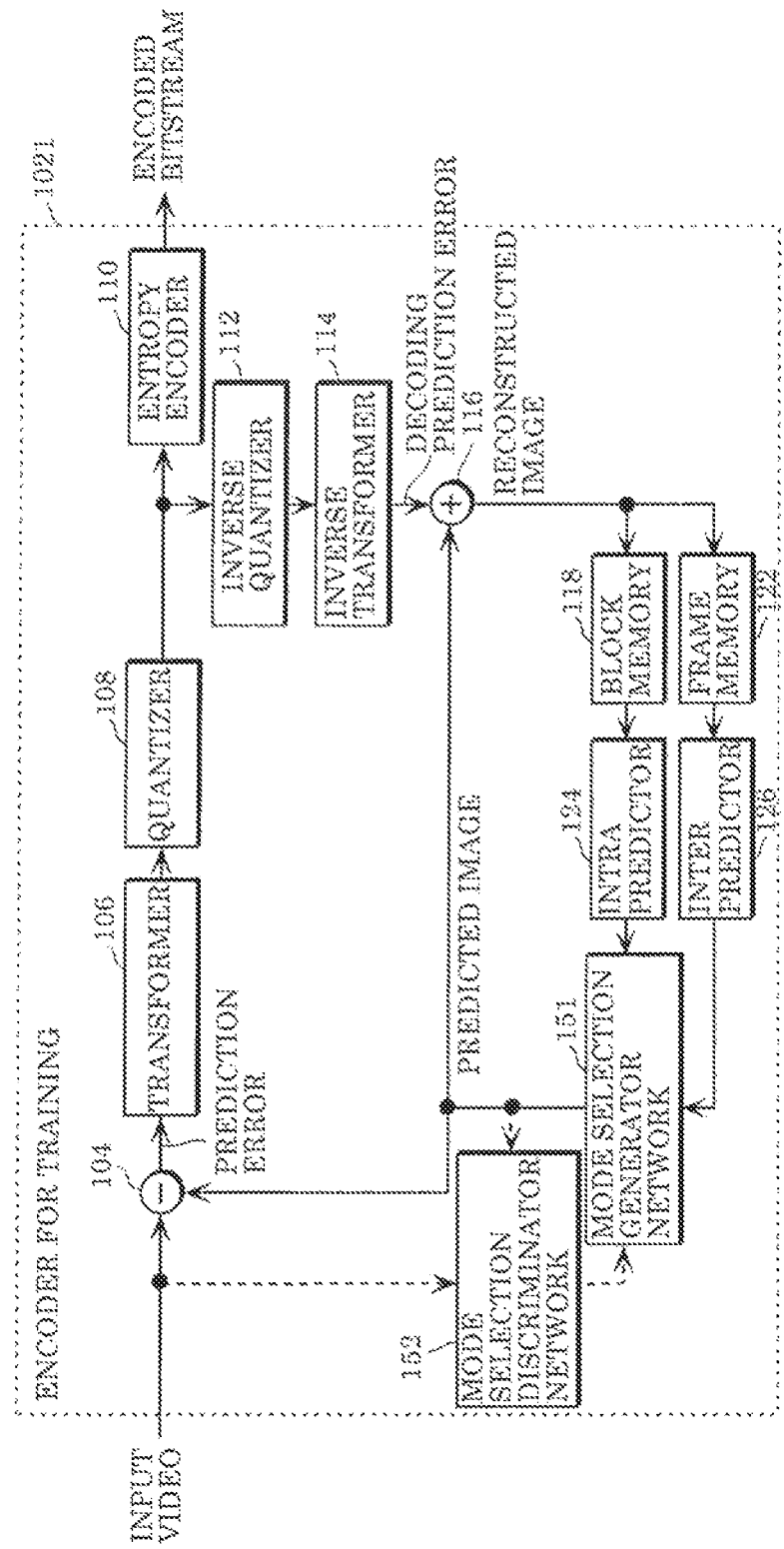
FIG. 25 is a block diagram illustrating a configuration of an encoder for training according to Embodiment 4.

FIG. 25 is a block diagram illustrating a configuration of an encoder for training according to the present embodiment.

Encoder 1021 is for training selection of a prediction mode. Such encoder 1021 includes elements other than prediction controller 128 among the elements included in encoder 100 according to Embodiment 1. Specifically, encoder 1021 includes intra predictor 124 and inter predictor 126 similarly to Embodiment 1, as a prediction functional configuration. Encoder 1021 includes mode selection generator network 151 and mode selection discriminator network 152, instead of prediction controller 128 in Embodiment 1.

Mode selection generator network 151 and mode selection discriminator network 152 constitute a GAN.

An intra-predicted image and an inter-predicted image generated by intra predictor 124 and inter predictor 126, respectively, are input to mode selection generator network 151 as reference data. Then, mode selection generator network 151 outputs one of the intra-predicted image and the inter-predicted image as generated data, based on the input of the reference data. Specifically, mode selection generator network 151 generates a selected predicted image as generated data, by selecting a predicted image (also referred to as a prediction signal) from among the intra-predicted image and the inter-predicted image.

The predicted image generated by mode selection generator network 151 is input to mode selection discriminator network 152. Furthermore, an image of a block included in an input video (hereinafter an input image) is input to mode selection discriminator network 152. Mode selection discriminator network 152 feeds back a probability that a predicted image matches an input image to mode selection generator network 151, based on the inputs. Note that the predicted image and the input image are images corresponding to a current block to be encoded in a picture.

In such encoder 1021, the networks are trained to reduce the difference between a predicted image and an input video. Such training is performed by the GAN.

Note that the networks may further receive additional input data. For example, the input data may be signals for notifying candidates of a prediction mode or a quantization step size for rate-distortion (RD) optimization, for instance.

Figure 26:
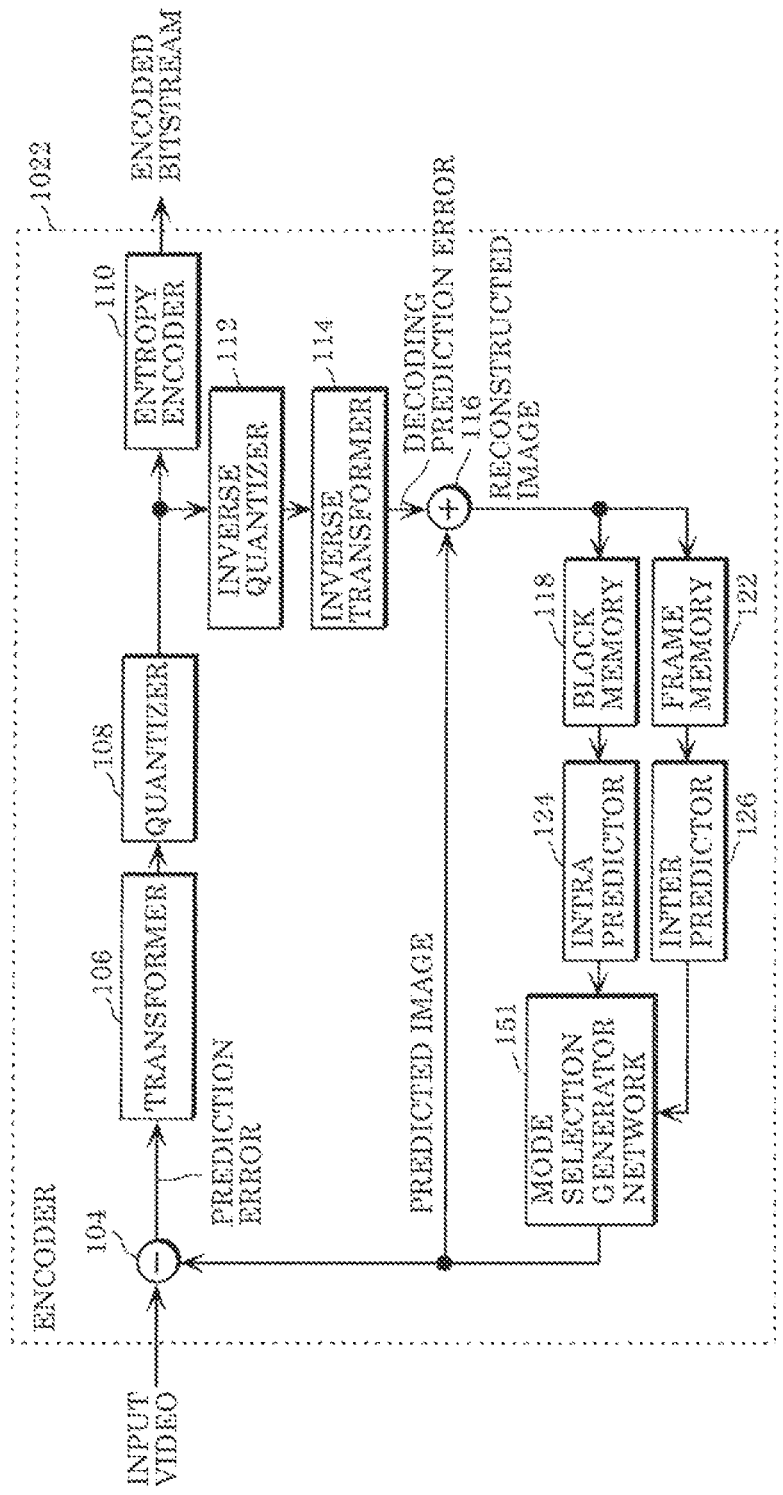
FIG. 26 is a block diagram illustrating a configuration of a trained encoder according to Embodiment 4.

FIG. 26 is a block diagram illustrating a configuration of a trained encoder in the present embodiment.

Encoder 1022 is a trained encoder from which mode selection discriminator network 152 is excluded among the elements included in encoder 1021 for training illustrated in FIG. 25.

Mode selection generator network 151 included in encoder 1022 is a network constructed through training in encoder 1021 for training.

Figure 27:
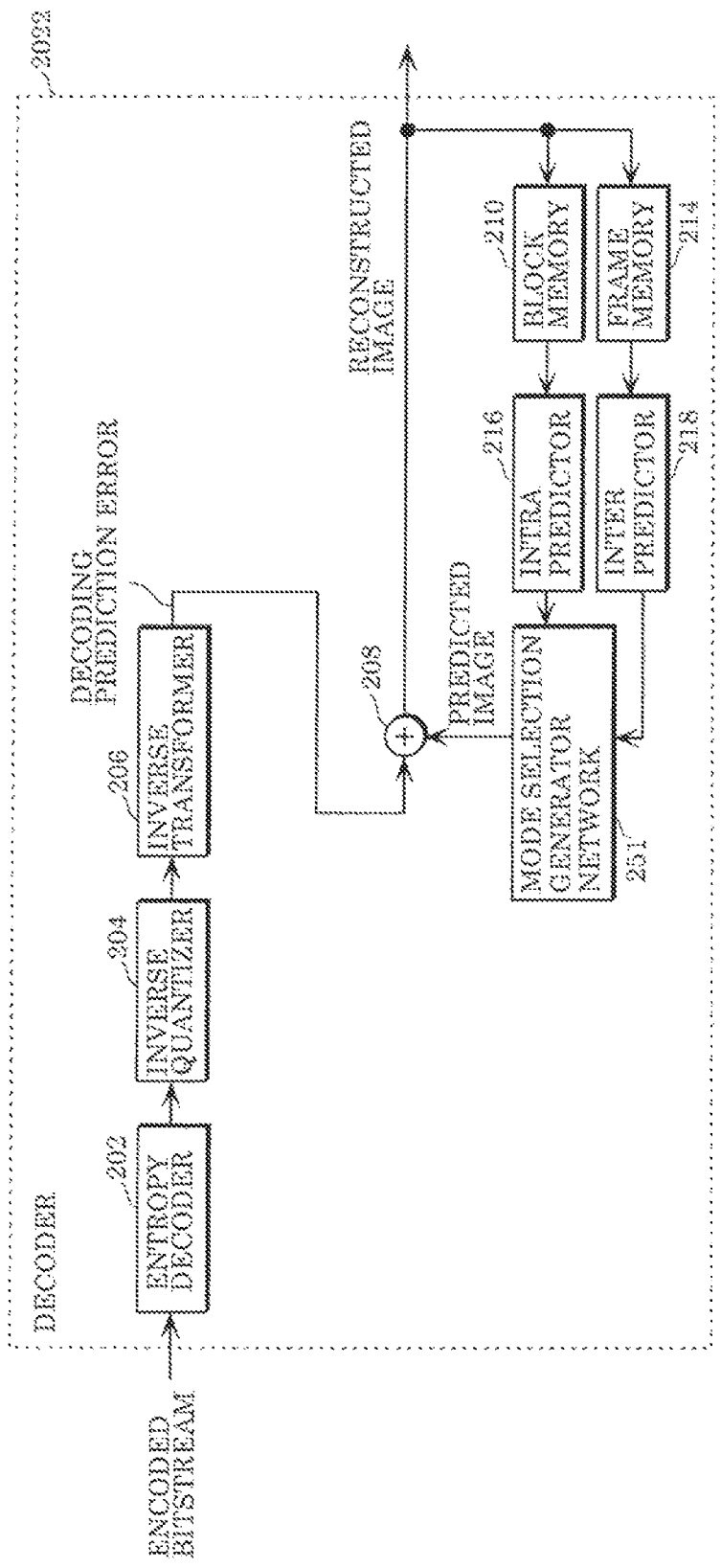
FIG. 27 is a block diagram illustrating a configuration of a decoder according to Embodiment 4.

FIG. 27 is a block diagram illustrating a configuration of the decoder according to the present embodiment.

Decoder 2022 includes, among the elements included in decoder 200 according to Embodiment 1, elements other than prediction controller 220, and includes mode selection generator network 251 instead of prediction controller 220.

Mode selection generator network 251 is the same network as mode selection generator network 151 constructed through training in encoder 1021 for training illustrated in FIG. 25.

Embodiment 5

The encoder and the decoder according to the present embodiment have all or some of the functions of an auto encoder.

FIG. 28A is a block diagram illustrating a configuration of an encoder for training according to the present embodiment.

Encoder 1031 according to the present embodiment is a device that encodes an image while training, that is, a device that encodes an image by off-line training. Such encoder 1031 includes encoder part 161 of an auto encoder, quantizer 108*a*, entropy encoder 110, inverse quantizer 112*a*, and decoder part 162 of an auto encoder.

Encoder part 161 of the auto encoder is a portion of the auto encoder and compresses a dimension. Such encoder part 161 of the auto encoder obtains an input video for each block, and generates compressed data by compressing (or reducing) the dimension of input data that is the block, and outputs the compressed data to quantizer 108*a*.

Quantizer 108*a* performs quantization similarly to quantizer 108 in Embodiment 1. Specifically, quantizer 108*a* obtains compressed data output from encoder part 161 of the auto encoder, and quantizes the compressed data, thus generating quantized compressed data.

Specifically, quantizer 108*a* performs, for instance, rounding, flooring, ceiling or k-nearest neighbor, or assignment for the quantizer based on a vector, as a function of quantization.

Entropy encoder 110 performs entropy encoding on quantized compressed data. Entropy encoder 110 includes, in an encoded bitstream, encoded data generated by the entropy encoding, and outputs the bitstream.

Inverse quantizer 112*a* performs inverse quantization similarly to inverse quantizer 112 in Embodiment 1. Specifically, inverse quantizer 112*a* obtains quantized compressed data, and performs inverse quantization on the quantized compressed data. Thus, inverse quantizer 112*a* generates inverse quantized compressed data.

Decoder part 162 of the auto encoder is a portion of an auto encoder, and restores a compressed dimension. Such decoder part 162 of the auto encoder obtains inverse quantized compressed data from inverse quantizer 112*a*, and further obtains an image of a block included in an input video (namely, an input image). Decoder part 162 of the auto encoder generates a reconstructed image by restoring the dimension of inverse quantized compressed data. Next, decoder part 162 of the auto encoder outputs, to inverse quantizer 112*a*, error information that is information on an error between the reconstructed image and an input image.

Inverse quantizer 112*a* and quantizer 108*a* apply processing that is to be performed for back propagation to the error information, and outputs the processed error information to encoder part 161 of the auto encoder. Note that the processing that is to be performed for back propagation is hereinafter referred to as back propagation processing. Specifically, inverse quantizer 112*a* and quantizer 108*a* transform the gradient indicated by the error information into a differentiable approximation value. Accordingly, inverse quantizer 112*a* and quantizer 108*a* use an identity function or straight through estimation (STE), for example. Inverse quantizer 112*a* and quantizer 108*a* may use stochastic smoothing and sampling approaches. For example, such approaches include stochastic rounding, noise adding, population sampling, and smoothing, for instance. Accordingly, estimation of differentiable distribution, that is, approximately smoothed estimation can be performed.

As a result, encoder part 161 of the auto encoder and decoder part 162 of the auto encoder are trained according to back propagation. Through such training, encoder part 161 of the auto encoder and decoder part 162 of the auto encoder are constructed to reduce the difference between a reconstructed image and an input video.

Note that in the example illustrated in FIG. 28A, quantizer 108*a* and inverse quantizer 112*a* perform not only quantization and inverse quantization, respectively, but also both perform back propagation processing. However, encoder 1031 may include a dedicated element that performs only back propagation processing.

Figure 28B:
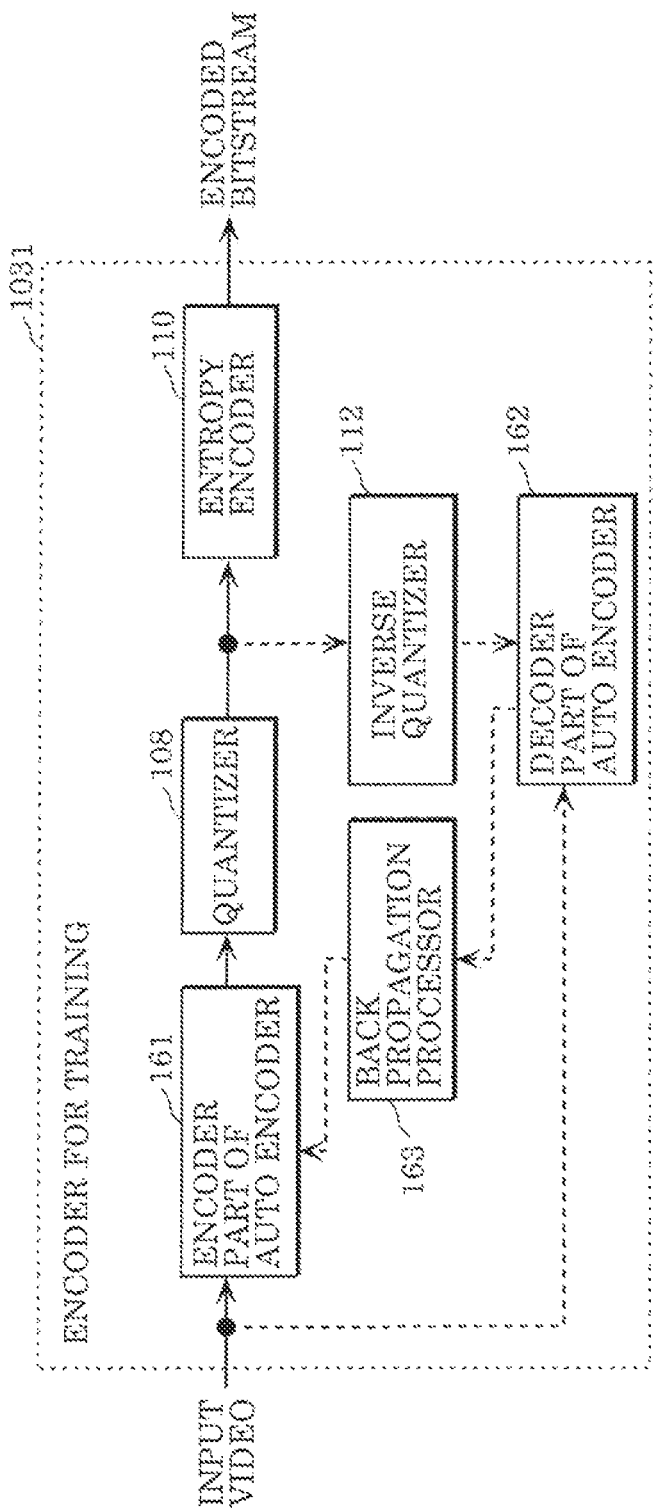
FIG. 28B is a block diagram illustrating another configuration of the encoder for training according to Embodiment 5.

FIG. 28B is a block diagram illustrating another configuration of an encoder for training according to the present embodiment.

Encoder 1031 according to the present embodiment includes quantizer 108 and inverse quantizer 112 instead of quantizer 108*a* and inverse quantizer 112*a*, and further includes back propagation processor 163, as illustrated in FIG. 28B, for example.

Quantizer 108 and inverse quantizer 112 perform quantization on compressed data and inverse quantization on quantized compressed data, respectively.

Back propagation processor 163 obtains error information from decoder part 162 of the auto encoder, performs the above back propagation processing on the error information, and outputs the processed error information to encoder part 161 of the auto encoder.

Figure 29:
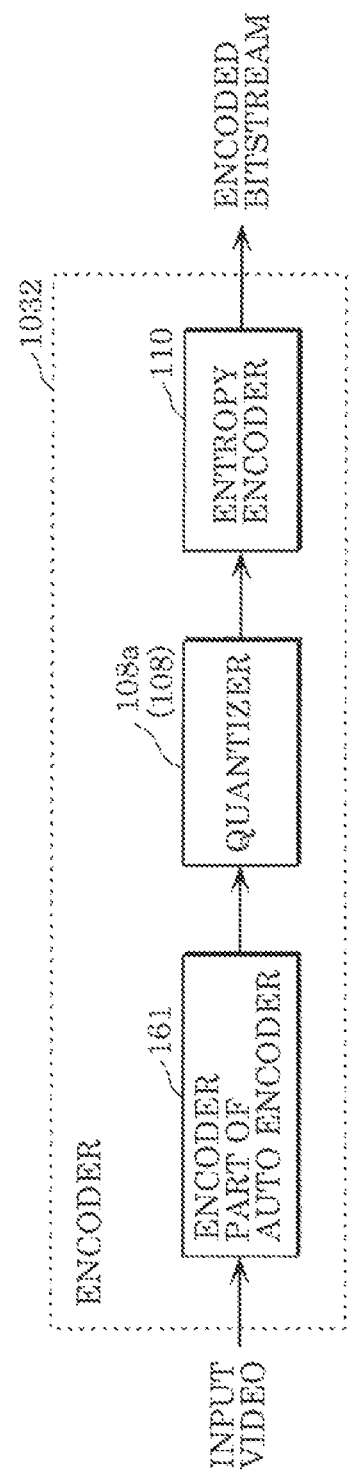
FIG. 29 is a block diagram illustrating a configuration of a trained encoder according to Embodiment 5.

FIG. 29 is a block diagram illustrating a configuration of a trained encoder according to the present embodiment.

Encoder 1032 is a trained encoder, and includes only encoder part 161 of the auto encoder, quantizer 108*a* or 108, and entropy encoder 110, among the elements included in encoder 1031 for training illustrated in FIG. 28A or FIG. 28B.

Figure 30:
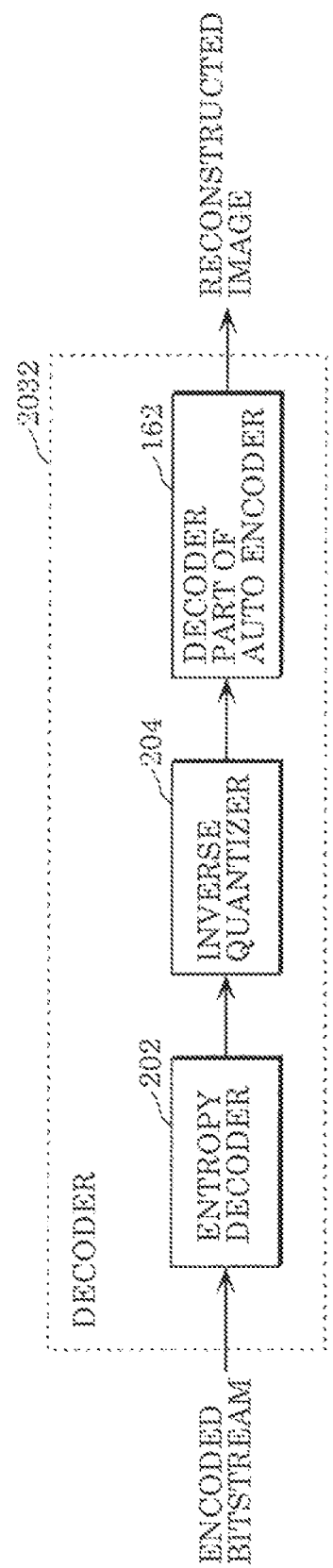
FIG. 30 is a block diagram illustrating a configuration of a decoder according to Embodiment 5.

FIG. 30 is a block diagram illustrating a configuration of the decoder according to the present embodiment.

Decoder 2032 according to the present embodiment includes entropy decoder 202, inverse quantizer 204, and decoder part 162 of the auto encoder.

Decoder part 162 of the auto encoder is the same network as decoder part 162 of the auto encoder constructed through training in encoder 1031 for training illustrated in FIG. 28A or FIG. 28B.

In the above example, the entirety or a portion of the auto encoder in each of the encoder and the decoder compresses or restores the dimension of an input video, but may compress or restore the dimension of a prediction error.

Figure 31:
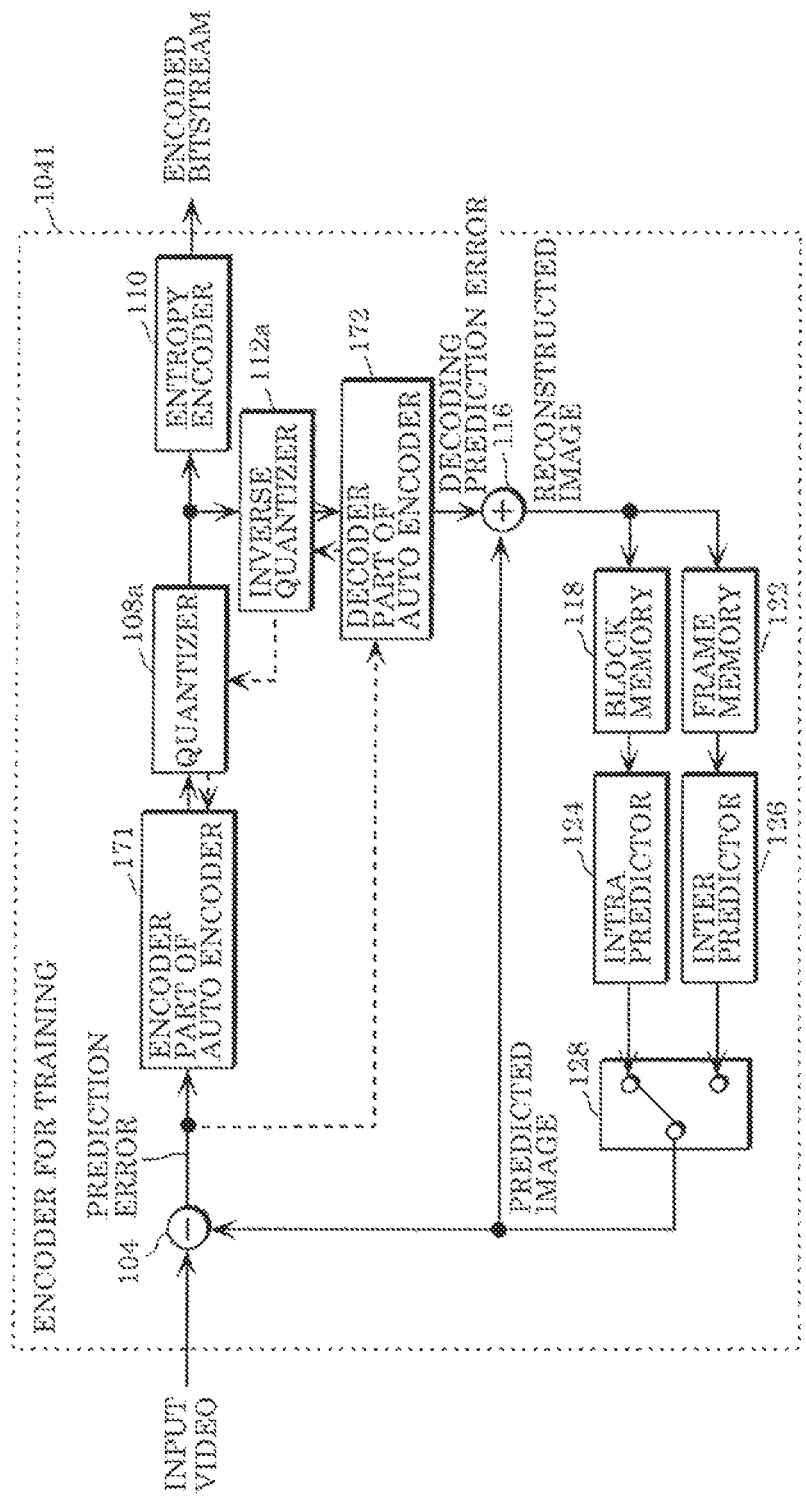
FIG. 31 is a block diagram illustrating another example of the encoder for training according to Embodiment 5.

FIG. 31 is a block diagram illustrating another example of an encoder for training according to the present embodiment.

Encoder 1041 for training compresses and restores the dimension of a prediction error using the auto encoders, and furthermore predicts an image similarly to encoder 100 according to Embodiment 1. Such encoder 1041 includes elements other than transformer 106, quantizer 108, inverse quantizer 112, and inverse transformer 114, among the elements included in encoder 100 according to Embodiment. Encoder 1041 includes encoder part 171 of an auto encoder, quantizer 108*a*, inverse quantizer 112*a*, and decoder part 172 of an auto encoder, instead of transformer 106, quantizer 108, inverse quantizer 112, and inverse transformer 114.

Encoder part 171 of the auto encoder has a similar function to that of encoder part 161 of the auto encoder described above, yet obtains a prediction error, instead of obtaining an input video for each block. Encoder part 171 of the auto encoder compresses (or reduces) the dimension of input data that is a prediction error to generate compressed data, and outputs the compressed data to quantizer 108*a*.

Decoder part 172 of the auto encoder has a similar function to that of decoder part 162 of the auto encoder described above, but obtains a prediction error instead of obtaining an input image. Then, decoder part 172 of the auto encoder generates a decoding prediction error by restoring the dimension of inverse quantized compressed data. Next, decoder part 172 of the auto encoder outputs error information that is information on the error between the decoding prediction error and prediction error to inverse quantizer 112*a*.

Inverse quantizer 112*a* and quantizer 108*a* apply back propagation processing to error information as described above, and output the processed error information to encoder part 171 of the auto encoder. As a result, encoder part 171 of the auto encoder and decoder part 172 of the auto encoder are trained according to back propagation.

Note that in the example illustrated in FIG. 31, quantizer 108*a* and inverse quantizer 112*a* perform not only quantization and inverse quantization, respectively, but also both perform back propagation processing. However, encoder 1041 may include a dedicated element that performs only back propagation processing as in the example illustrated in FIG. 28B.

In such encoder 1041 for training, the auto encoders are trained to reduce the difference between a decoding prediction error and a prediction error.

Figure 32:
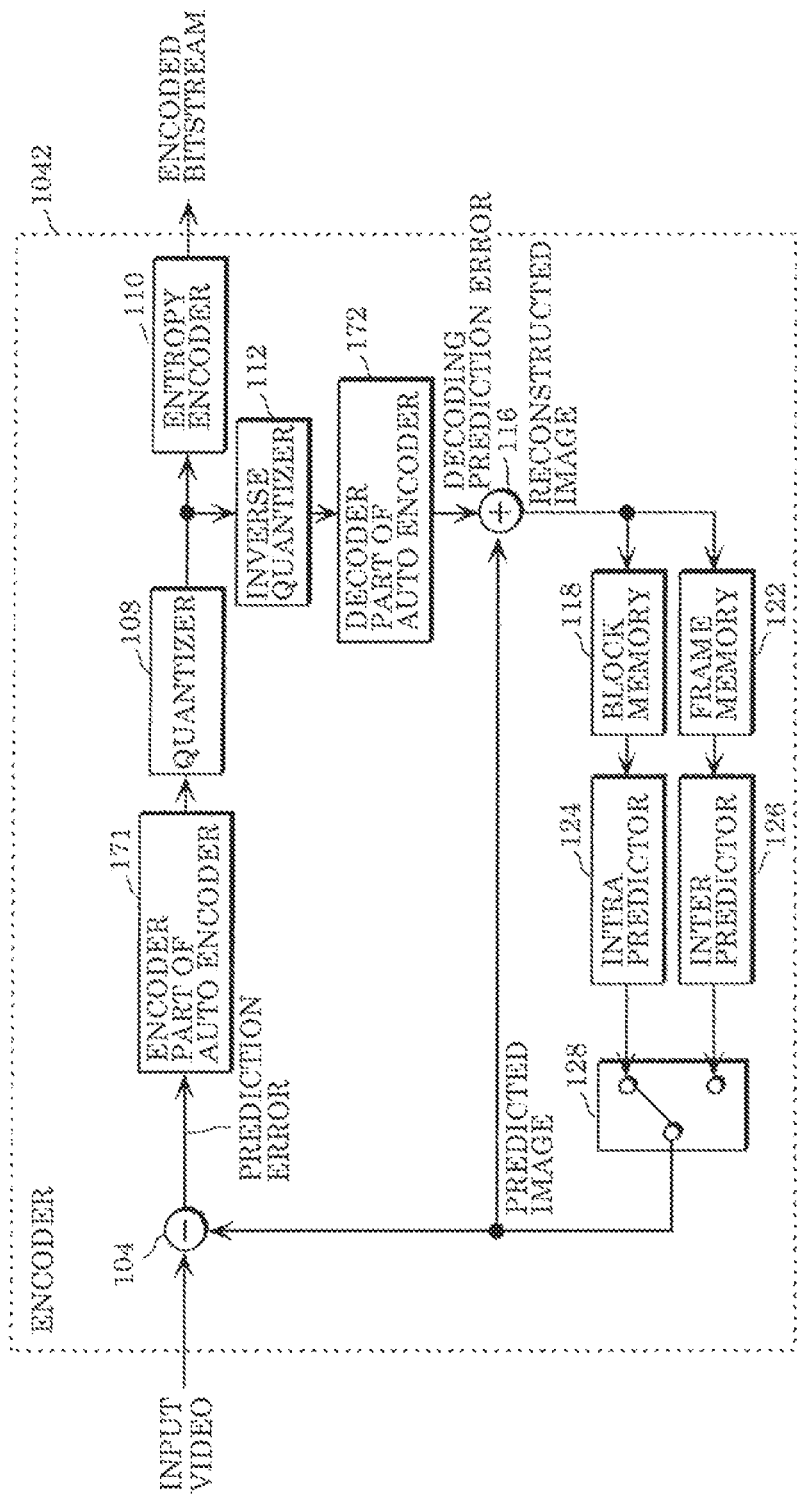
FIG. 32 is a block diagram illustrating another example of the trained encoder according to Embodiment 5.

FIG. 32 is a block diagram illustrating another example of a trained encoder according to the present embodiment.

Encoder 1042 is a trained encoder, and includes quantizer 108 and inverse quantizer 112, instead of quantizer 108*a* and inverse quantizer 112*a*, among the elements included in encoder 1041 for training illustrated in FIG. 31. Specifically, encoder 1042 does not have a function of performing back propagation processing.

Figure 33:
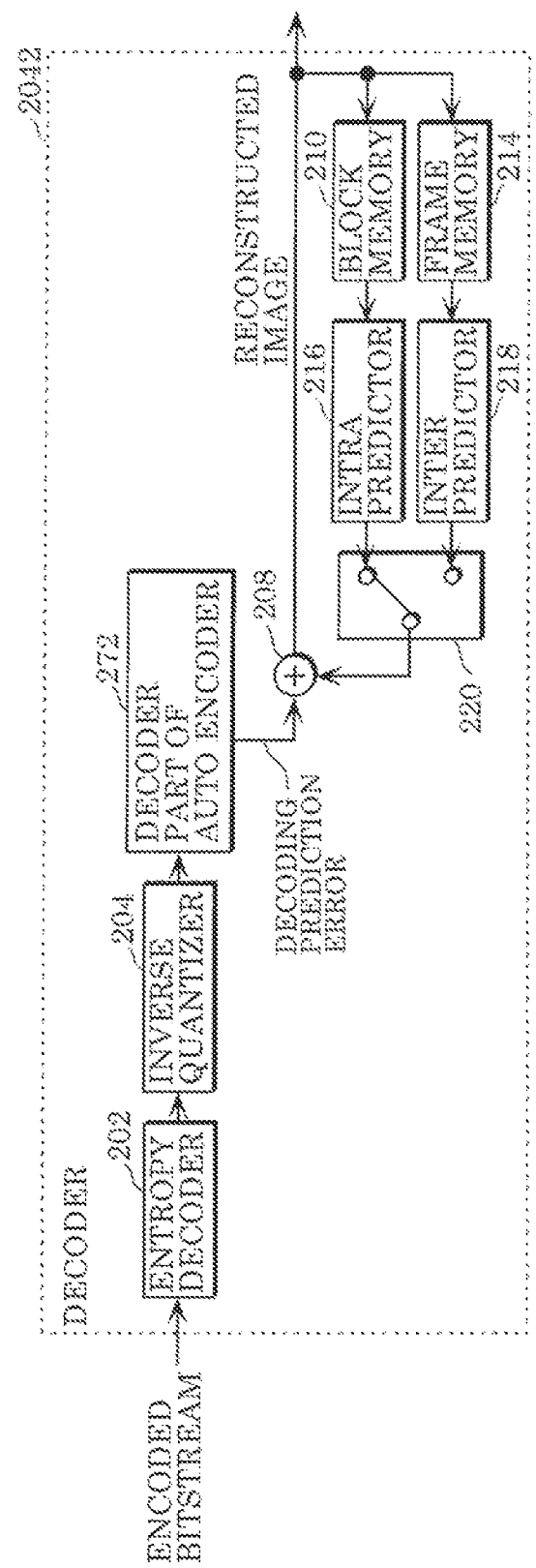
FIG. 33 is a block diagram illustrating another example of the decoder according to Embodiment 5.

FIG. 33 is a block diagram illustrating another example of a decoder according to the present embodiment.

Decoder 2042 according to the present embodiment includes elements other than inverse transformer 206 among the elements included in decoder 200 according to Embodiment 1. Decoder 2032 includes decoder part 272 of an auto encoder instead of inverse transformer 206.

Decoder part 272 of the auto encoder is the same network as decoder part 172 of the auto encoder constructed through training in encoder 1041 for training illustrated in FIG. 31.

Note that other parameters may be used to train the networks and the auto encoders in Embodiments 2 to 5. The other parameters may be, for example, temporal or spatial resolution of an input video, the number of partitions of a block, a reference picture index, a type of frequency transform, a block size for frequency transform, a block shape for frequency transform, a size of a quantization step, a prediction mode, a size of a prediction block, and a shape of a prediction block, for instance. The networks and the auto encoders in Embodiments 2 to 5, for instance, may be applied to filtering such as ALF.

In inter prediction, not only reconstructed pixels (or a reconstructed image) of an already encoded frame or picture, but also reconstructed pixels (or a reconstructed image) included in a current frame or picture to be encoded or decoded may be referred to.

[Example of Implementation]

Figure 34A:
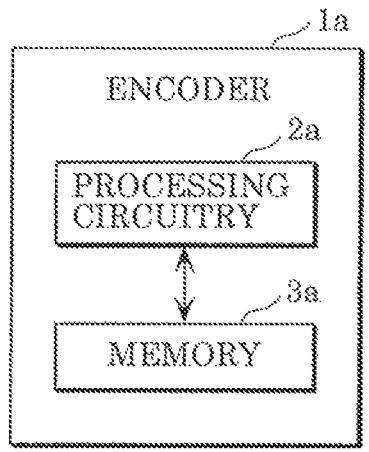
FIG. 34A is a block diagram illustrating an example of implementation of an encoder according to each embodiment.

FIG. 34A is a block diagram illustrating an example of implementation of the encoders according to the above embodiments. Encoder 1*a* includes processing circuitry 2*a* and memory 3*a*. For example, the elements of the encoders illustrated in FIG. 1, FIG. 12, FIG. 18, FIG. 19, FIG. 25, FIG. 26, FIG. 28A to FIG. 29, FIG. 31, and FIG. 32 are implemented by processing circuitry 2*a* and memory 3*a* illustrated in FIG. 34A.

Processing circuitry 2*a* processes information, and is accessible to memory 3*a*. For example, processing circuitry 2*a* is a dedicated or general-purpose electronic circuit that encodes videos. Processing circuitry 2*a* may be a processor like a CPU. Processing circuitry 2*a* may be an aggregate of electronic circuits. For example, processing circuitry 2*a* may play the role of elements among the elements of the encoders illustrated in the above drawings other than the elements for storing information.

Memory 3*a* is a general-purpose or dedicated memory that stores information for processing circuitry 2*a* to encode videos. Memory 3*a* may be an electronic circuit and connected to processing circuitry 2*a*. Memory 3*a* may be included in processing circuitry 2*a*. Memory 3*a* may be an aggregate of a plurality of electronic circuits. Memory 3*a* may be, for instance, a magnetic disk or an optical disc, and may be, for instance, expressed as storage or a recording medium. Further, memory 3*a* may be nonvolatile memory or volatile memory.

For example, memory 3*a* may store a video to be encoded or a bit string corresponding to an encoded video. Furthermore, memory 3*a* may store a program for processing circuitry 2*a* to encode a video.

For example, memory 3*a* may play the roles of the elements for storing information among the elements of the encoders illustrated in the above drawings. Specifically, memory 3*a* may play the roles of block memory 118 and frame memory 122 illustrated in the above drawings. More specifically, memory 3*a* may store a processed subblock, a processed block, and a processed picture, for instance.

Note that the encoders may not include all the elements illustrated in the drawings or may not perform all the processes described above. Another device may include one or more of the elements illustrated in each of the drawings, or may perform one or more of the processes described above.

Figure 34B:
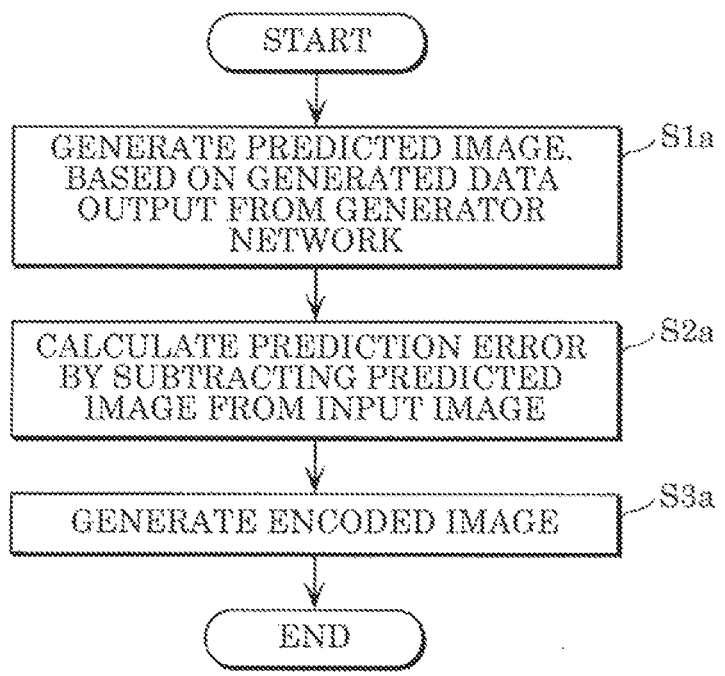
FIG. 34B is a flowchart illustrating processing operation of an encoder that includes processing circuitry and memory.

FIG. 34B is a flowchart illustrating processing operation of encoder 1*a* that includes processing circuitry 2*a* and memory 3*a*.

Similarly to Embodiment 3, processing circuitry 2*a* first generates, using memory 3*a*, a predicted image of an input image that is a current image to be encoded, based on generated data output from a generator network that is a neural network in response to a reference image being input to the generator network (step S1a). Next, processing circuitry 2a calculates a prediction error by subtracting the predicted image from the input image (step S2a). Next, processing circuitry 2a generates an encoded image by at least transforming the prediction error (step S3a).

Accordingly, as illustrated in Embodiment 3, a predicted image is generated based on generated data output from the generator network, and thus a predicted image similar to an input image can be generated according to a configuration of the generator network, that is, a neural network, and as a result, encoding efficiency can be improved. It is not necessary to perform complicated intra prediction or inter prediction to generate a predicted image, and thus a processing burden can be reduced and/or the configuration can be simplified, for instance.

Figure 34C:
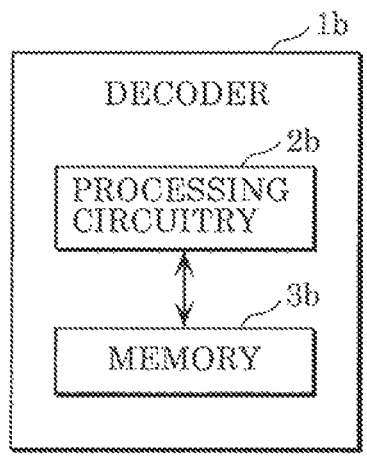
FIG. 34C is a block diagram illustrating an example of implementation of a decoder according to each embodiment.

FIG. 34C is a block diagram illustrating an example of implementation of the decoders according to the above embodiments. Decoder 1b includes processing circuitry 2b and memory 3b. For example, the elements of the decoders illustrated in FIG. 10, FIG. 13, FIG. 20, FIG. 27, FIG. 30, and FIG. 33 are implemented by processing circuitry 2b and memory 3b illustrated in FIG. 34C.

Processing circuitry 2b processes information, and is accessible to memory 3b. For example, processing circuitry 2b is a general-purpose or dedicated electronic circuit that decodes videos. Processing circuitry 2b may be a processor like a CPU. Processing circuitry 2b may be an aggregate of a plurality of electronic circuits. For example, processing circuitry 2b may play the roles of elements other than the elements for storing information among the elements of the decoders illustrated in the above drawings.

Memory 3b is a general-purpose or dedicated memory that stores information for processing circuitry 2b to decode videos. Memory 3b may be an electronic circuit, and connected to processing circuitry 2b. Memory 3b may be included in processing circuitry 2b. Memory 3b may be an aggregate of a plurality of electronic circuits. Memory 3b may be, for instance, a magnetic disk or an optical disc, and may be expressed as, for instance, storage or a recording medium. Memory 3b may be nonvolatile memory or volatile memory.

For example, memory 3b may store a bit string corresponding to an encoded video or a video corresponding to the decoded bit string. Furthermore, memory 3b may store a program for processing circuitry 2b to decode a video.

For example, memory 3b may play the roles of the elements for storing information among the elements of the decoders illustrated in the above drawings. Specifically, memory 3b may play the roles of block memory 210 and frame memory 214 illustrated in the above drawings. More specifically, memory 3b may store a processed subblock, a processed block, and a processed picture, for instance.

Note that the decoders may not include all the elements illustrated in the above drawings, and may not perform all the processes described above. Another device may include one or more of the elements illustrated in each of the above drawings, and may perform one or more of the processes described above.

Figure 34D:
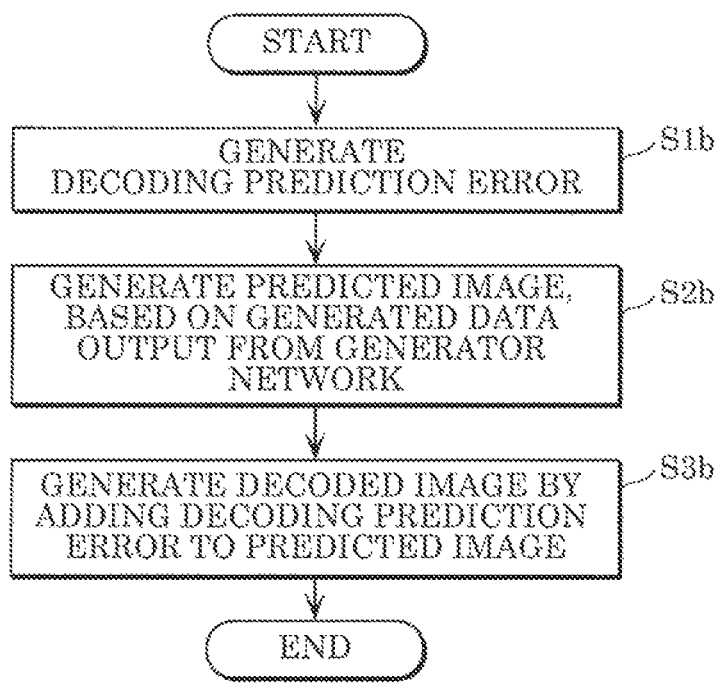
FIG. 34D is a flowchart illustrating processing operation of a decoder that includes processing circuitry and memory.

FIG. 34D is a flowchart illustrating processing operation of decoder 1b that includes processing circuitry 2b and memory 3b.

Similarly to Embodiment 3, processing circuitry 2b first generates a decoding prediction error by performing at least inverse transform on an encoded image that is a current image to be decoded (step S1b). Next, processing circuitry 2b generates a predicted image of the encoded image, based on generated data output from a generator network that is a neural network in response to a reference image being input to the generator network (step SW. Processing circuitry 2b generates a decoded image by adding the decoding prediction error to the predicted image (step S3b).

Accordingly, a predicted image is generated based on generated data output from the generator network, and thus a predicted image similar to an original image can be generated according to a configuration of the generator network, that is, a neural network, and as a result, encoding efficiency can be improved. Specifically, the amount of data of a decoding prediction error can be decreased. It is not necessary to perform complicated intra prediction or inter prediction to generate a predicted image, and thus a processing burden can be reduced and/or the configuration can be simplified, for instance.

[Supplement]

The encoders and the decoders according to the above embodiments may be used as image encoders and image decoders, or may be used as video encoders and video decoders, respectively.

In the above embodiments, each of the elements may be constituted by dedicated hardware, or may be obtained by executing a software program suitable for the element. Each element may be obtained by a program executor such as a CPU or a processor reading and executing a software program stored in a recording medium such as a hard disk or semiconductor memory.

Specifically, the encoders and the decoders may each include processing circuitry and storage electrically connected to the processing circuitry and accessible from the processing circuitry.

The processing circuitry includes at least one of dedicated hardware and a program executor, and performs processing using the storage. When the processing circuitry includes the program executor, the storage stores a software program executed by the program executor.

Here, the software that implements the encoders and the decoders according to the above embodiments, for instance, is the program as follows.

Specifically, the program causes a computer to perform the processing following the flowchart illustrated in one of FIG. 5B, FIG. 5D, FIG. 34B, and FIG. 34D.

The elements may be each a circuit as described above. These circuits may constitute one circuit as a whole, or may be separate circuits. The elements may be each implemented by a widely used circuit or a dedicated circuit.

A process performed by a specific element may be performed by a different element. In addition, the order of performing processes may be changed or the plurality of processes may be performed in parallel. An encoder/decoder may include an encoder and a decoder.

The ordinal numbers such as first and second used for the description may be changed as appropriate. An ordinal number may be newly given to an element or may be removed therefrom.

The above has given a description of aspects of the encoders and the decoders based on the embodiments, but the aspects are not limited to the embodiments. The aspects of the encoders and the decoders may also encompass various modifications that may be conceived by those skilled in the art to the embodiments, and embodiments achieved by combining elements in different embodiments, without departing from the scope of the present disclosure.

Embodiment 6

As described in each of the above embodiments, each functional block can typically be realized as an MPU and memory, for example. Moreover, processes performed by each of the functional blocks are typically realized by a program execution unit, such as a processor, reading and executing software (a program) recorded on a recording medium such as ROM. The software may be distributed via, for example, downloading, and may be recorded on a recording medium such as semiconductor memory and distributed. Note that each functional block can, of course, also be realized as hardware (dedicated circuit).

Moreover, the processing described in each of the embodiments may be realized via integrated processing using a single apparatus (system), and, alternatively, may be realized via decentralized processing using a plurality of apparatuses. Moreover, the processor that executes the above-described program may be a single processor or a plurality of processors. In other words, integrated processing may be performed, and, alternatively, decentralized processing may be performed.

Embodiments of the present disclosure are not limited to the above exemplary embodiments; various modifications may be made to the exemplary embodiments, the results of which are also included within the scope of the embodiments of the present disclosure.

Next, application examples of the moving picture encoding method (image encoding method) and the moving picture decoding method (image decoding method) described in each of the above embodiments and a system that employs the same will be described. The system is characterized as including an image encoder that employs the image encoding method, an image decoder that employs the image decoding method, and an image encoder/decoder that includes both the image encoder and the image decoder. Other configurations included in the system may be modified on a case-by-case basis.

[Usage Examples]

FIG. 35 illustrates an overall configuration of content providing system ex100 for implementing a content distribution service. The area in which the communication service is provided is divided into cells of desired sizes, and base stations ex106, ex107, ex108, ex109, and ex110, which are fixed wireless stations, are located in respective cells.

In content providing system ex100, devices including computer ex111, gaming device ex112, camera ex113, home appliance ex114, and smartphone ex115 are connected to internet ex101 via internet service provider ex102 or communications network ex104 and base stations ex106 through ex110. Content providing system ex100 may combine and connect any combination of the above elements. The devices may be directly or indirectly connected together via a telephone network or near field communication rather than via base stations ex106 through ex110, which are fixed wireless stations. Moreover, streaming server ex103 is connected to devices including computer ex111, gaming device ex112, camera ex113, home appliance ex114, and smartphone ex115 via, for example, internet ex101. Streaming server ex103 is also connected to, for example, a terminal in a hotspot in airplane ex117 via satellite ex116.

Note that instead of base stations ex106 through ex110, wireless access points or hotspots may be used. Streaming server ex103 may be connected to communications network ex104 directly instead of via internet ex101 or internet service provider ex102, and may be connected to airplane ex117 directly instead of via satellite ex116.

Camera ex113 is a device capable of capturing still images and video, such as a digital camera. Smartphone ex115 is a smartphone device, cellular phone, or personal handyphone system (PHS) phone that can operate under the mobile communications system standards of the typical 2G, 3G, 3.9G, and 4G systems, as well as the next-generation 5G system.

Home appliance ex118 is, for example, a refrigerator or a device included in a home fuel cell cogeneration system.

In content providing system ex100, a terminal including an image and/or video capturing function is capable of, for example, live streaming by connecting to streaming server ex103 via, for example, base station ex106. When live streaming, a terminal (e.g., computer ex111, gaming device ex112, camera ex113, home appliance ex114, smartphone ex115, or airplane ex117) performs the encoding processing described in the above embodiments on still-image or video content captured by a user via the terminal, multiplexes video data obtained via the encoding and audio data obtained by encoding audio corresponding to the video, and transmits the obtained data to streaming server ex103. In other words, the terminal functions as the image encoder according to one aspect of the present disclosure.

Streaming server ex103 streams transmitted content data to clients that request the stream. Client examples include computer ex111, gaming device ex112, camera ex113, home appliance ex114, smartphone ex115, and terminals inside airplane ex117, which are capable of decoding the above-described encoded data. Devices that receive the streamed data decode and reproduce the received data. In other words, the devices each function as the image decoder according to one aspect of the present disclosure.

[Decentralized Processing]

Streaming server ex103 may be realized as a plurality of servers or computers between which tasks such as the processing, recording, and streaming of data are divided. For example, streaming server ex103 may be realized as a content delivery network (CDN) that streams content via a network connecting multiple edge servers located throughout the world. In a CDN, an edge server physically near the client is dynamically assigned to the client. Content is cached and streamed to the edge server to reduce load times. In the event of, for example, some kind of an error or a change in connectivity due to, for example, a spike in traffic, it is possible to stream data stably at high speeds since it is possible to avoid affected parts of the network by, for example, dividing the processing between a plurality of edge servers or switching the streaming duties to a different edge server, and continuing streaming.

Decentralization is not limited to just the division of processing for streaming; the encoding of the captured data may be divided between and performed by the terminals, on the server side, or both. In one example, in typical encoding, the processing is performed in two loops. The first loop is for detecting how complicated the image is on a frame-by-frame or scene-by-scene basis, or detecting the encoding load. The second loop is for processing that maintains image quality and improves encoding efficiency. For example, it is possible to reduce the processing load of the terminals and improve the quality and encoding efficiency of the content by having the terminals perform the first loop of the encoding and having the server side that received the content perform the second loop of the encoding. In such a case, upon receipt of a decoding request, it is possible for the encoded data resulting from the first loop performed by one terminal to be received and reproduced on another terminal in approximately real time. This makes it possible to realize smooth, real-time streaming.

In another example, camera ex113 or the like extracts a feature amount from an image, compresses data related to the feature amount as metadata, and transmits the compressed metadata to a server. For example, the server determines the significance of an object based on the feature amount and changes the quantization accuracy accordingly to perform compression suitable for the meaning of the image. Feature amount data is particularly effective in improving the precision and efficiency of motion vector prediction during the second compression pass performed by the server. Moreover, encoding that has a relatively low processing load, such as variable length coding (VLC), may be handled by the terminal, and encoding that has a relatively high processing load, such as context-adaptive binary arithmetic coding (CABAC), may be handled by the server.

In yet another example, there are instances in which a plurality of videos of approximately the same scene are captured by a plurality of terminals in, for example, a stadium, shopping mall, or factory. In such a case, for example, the encoding may be decentralized by dividing processing tasks between the plurality of terminals that captured the videos and, if necessary, other terminals that did not capture the videos and the server, on a per-unit basis. The units may be, for example, groups of pictures (GOP), pictures, or tiles resulting from dividing a picture. This makes it possible to reduce load times and achieve streaming that is closer to real-time.

Moreover, since the videos are of approximately the same scene, management and/or instruction may be carried out by the server so that the videos captured by the terminals can be cross-referenced. Moreover, the server may receive encoded data from the terminals, change reference relationship between items of data or correct or replace pictures themselves, and then perform the encoding. This makes it possible to generate a stream with increased quality and efficiency for the individual items of data.

Moreover, the server may stream video data after performing transcoding to convert the encoding format of the video data. For example, the server may convert the encoding format from MPEG to VP, and may convert H.264 to H.265.

In this way, encoding can be performed by a terminal or one or more servers. Accordingly, although the device that performs the encoding is referred to as a "server" or "terminal" in the following description, some or all of the processes performed by the server may be performed by the terminal, and likewise some or all of the processes performed by the terminal may be performed by the server. This also applies to decoding processes.

[3D, Multi-Angle]

In recent years, usage of images or videos combined from images or videos of different scenes concurrently captured or the same scene captured from different angles by a plurality of terminals such as camera ex113 and/or smartphone ex115 has increased. Videos captured by the terminals are combined based on, for example, the separately-obtained relative positional relationship between the terminals, or regions in a video having matching feature points.

In addition to the encoding of two-dimensional moving pictures, the server may encode a still image based on scene analysis of a moving picture either automatically or at a point in time specified by the user, and transmit the encoded still image to a reception terminal. Furthermore, when the server can obtain the relative positional relationship between the video capturing terminals, in addition to two-dimensional moving pictures, the server can generate three-dimensional geometry of a scene based on video of the same scene captured from different angles. Note that the server may separately encode three-dimensional data generated from, for example, a point cloud, and may, based on a result of recognizing or tracking a person or object using three-dimensional data, select or reconstruct and generate a video to be transmitted to a reception terminal from videos captured by a plurality of terminals.

This allows the user to enjoy a scene by freely selecting videos corresponding to the video capturing terminals, and allows the user to enjoy the content obtained by extracting, from three-dimensional data reconstructed from a plurality of images or videos, a video from a selected viewpoint. Furthermore, similar to with video, sound may be recorded from relatively different angles, and the server may multiplex, with the video, audio from a specific angle or space in accordance with the video, and transmit the result.

In recent years, content that is a composite of the real world and a virtual world, such as virtual reality (VR) and augmented reality (AR) content, has also become popular. In the case of VR images, the server may create images from the viewpoints of both the left and right eyes and perform encoding that tolerates reference between the two viewpoint images, such as multi-view coding (MVC), and, alternatively, may encode the images as separate streams without referencing. When the images are decoded as separate streams, the streams may be synchronized when reproduced so as to recreate a virtual three-dimensional space in accordance with the viewpoint of the user.

In the case of AR images, the server superimposes virtual object information existing in a virtual space onto camera information representing a real-world space, based on a three-dimensional position or movement from the perspective of the user. The decoder may obtain or store virtual object information and three-dimensional data, generate two-dimensional images based on movement from the perspective of the user, and then generate superimposed data by seamlessly connecting the images. Alternatively, the decoder may transmit, to the server, motion from the perspective of the user in addition to a request for virtual object information, and the server may generate superimposed data based on three-dimensional data stored in the server in accordance with the received motion, and encode and stream the generated superimposed data to the decoder. Note that superimposed data includes, in addition to RGB values, an a value indicating transparency, and the server sets the a value for sections other than the object generated from three-dimensional data to, for example, 0, and may perform the encoding while those sections are transparent. Alternatively, the server may set the background to a predetermined RGB value, such as a chroma key, and generate data in which areas other than the object are set as the background.

Decoding of similarly streamed data may be performed by the client (i.e., the terminals), on the server side, or divided therebetween. In one example, one terminal may transmit a reception request to a server, the requested content may be received and decoded by another terminal, and a decoded signal may be transmitted to a device having a display. It is possible to reproduce high image quality data by decentralizing processing and appropriately selecting content regardless of the processing ability of the communications terminal itself. In yet another example, while a TV, for example, is receiving image data that is large in size, a region of a picture, such as a tile obtained by dividing the picture, may be decoded and displayed on a personal terminal or terminals of a viewer or viewers of the TV. This makes it possible for the viewers to share a big-picture view as well as for each viewer to check his or her assigned area or inspect a region in further detail up close.

In the future, both indoors and outdoors, in situations in which a plurality of wireless connections are possible over near, mid, and far distances, it is expected to be able to seamlessly receive content even when switching to data appropriate for the current connection, using a streaming system standard such as MPEG-DASH. With this, the user can switch between data in real time while freely selecting a decoder or display apparatus including not only his or her own terminal, but also, for example, displays disposed indoors or outdoors. Moreover, based on, for example, information on the position of the user, decoding can be performed while switching which terminal handles decoding and which terminal handles the displaying of content. This makes it possible to, while in route to a destination, display, on the wall of a nearby building in which a device capable of displaying content is embedded or on part of the ground, map information while on the move. Moreover, it is also possible to switch the bit rate of the received data based on the accessibility to the encoded data on a network, such as when encoded data is cached on a server quickly accessible from the reception terminal or when encoded data is copied to an edge server in a content delivery service.

[Scalable Encoding]

Figure 36:
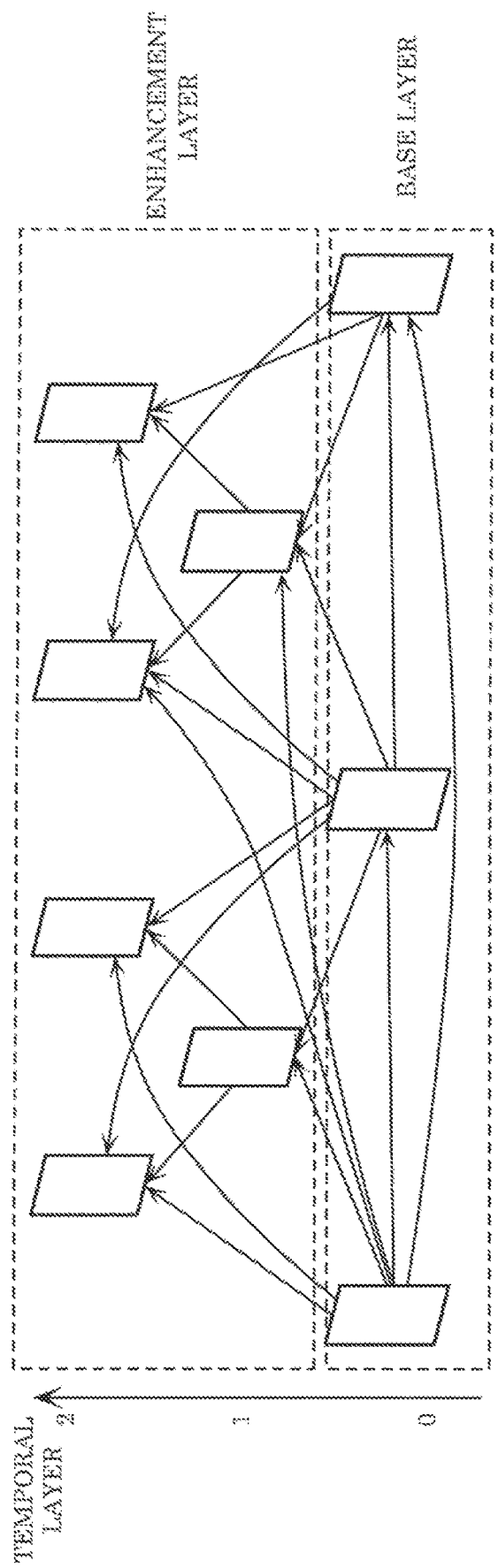
FIG. 36 illustrates one example of an encoding structure in scalable encoding.

The switching of content will be described with reference to a scalable stream, illustrated in FIG. 36, that is compression coded via implementation of the moving picture encoding method described in the above embodiments. The server may have a configuration in which content is switched while making use of the temporal and/or spatial scalability of a stream, which is achieved by division into and encoding of layers, as illustrated in FIG. 36. Note that there may be a plurality of individual streams that are of the same content but different quality. In other words, by determining which layer to decode up to based on internal factors, such as the processing ability on the decoder side, and external factors, such as communication bandwidth, the decoder side can freely switch between low resolution content and high resolution content while decoding. For example, in a case in which the user wants to continue watching, at home on a device such as a TV connected to the internet, a video that he or she had been previously watching on smartphone ex115 while on the move, the device can simply decode the same stream up to a different layer, which reduces server side load.

Furthermore, in addition to the configuration described above in which scalability is achieved as a result of the pictures being encoded per layer and the enhancement layer is above the base layer, the enhancement layer may include metadata based on, for example, statistical information on the image, and the decoder side may generate high image quality content by performing super-resolution imaging on a picture in the base layer based on the metadata. Super-resolution imaging may be improving the SN ratio while maintaining resolution and/or increasing resolution. Metadata includes information for identifying a linear or a non-linear filter coefficient used in super-resolution processing, or information identifying a parameter value in filter processing, machine learning, or least squares method used in super-resolution processing.

Figure 37:
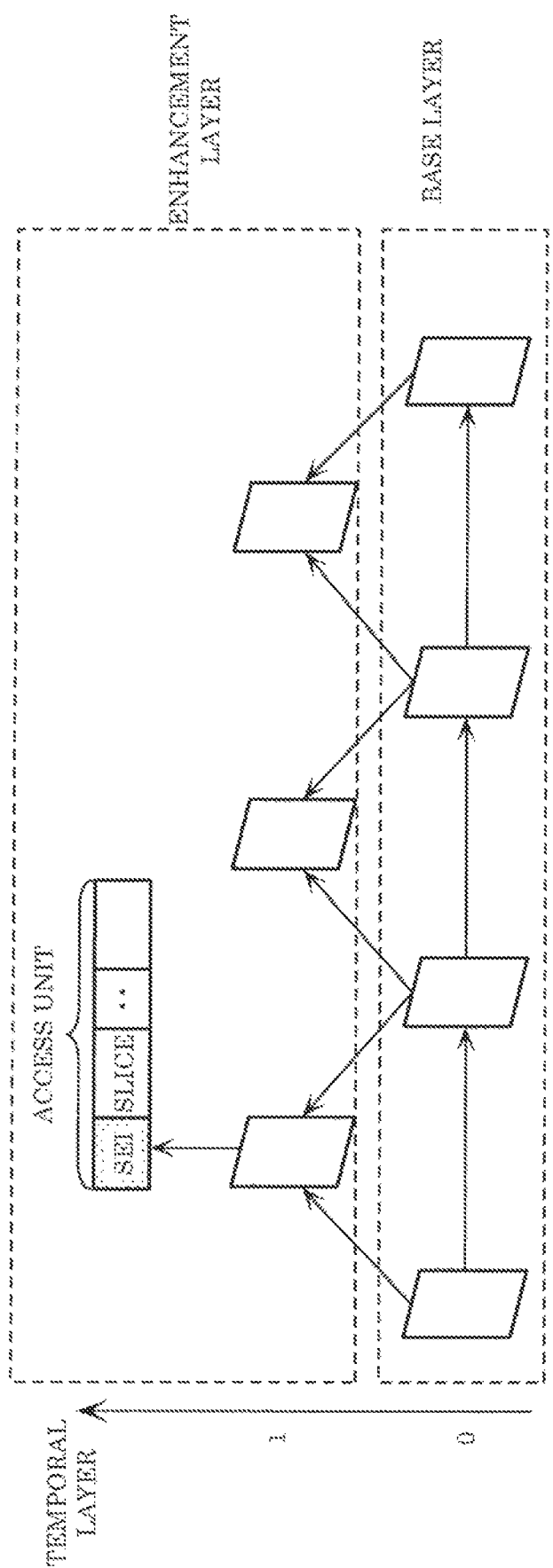
FIG. 37 illustrates one example of an encoding structure in scalable encoding.

Alternatively, a configuration in which a picture is divided into, for example, tiles in accordance with the meaning of, for example, an object in the image, and on the decoder side, only a partial region is decoded by selecting a tile to decode, is also acceptable. Moreover, by storing an attribute about the object (person, car, ball, etc.) and a position of the object in the video (coordinates in identical images) as metadata, the decoder side can identify the position of a desired object based on the metadata and determine which tile or tiles include that object. For example, as illustrated in FIG. 37, metadata is stored using a data storage structure different from pixel data such as an SEI message in HEVC. This metadata indicates, for example, the position, size, or color of the main object.

Moreover, metadata may be stored in units of a plurality of pictures, such as stream, sequence, or random access units. With this, the decoder side can obtain, for example, the time at which a specific person appears in the video, and by fitting that with picture unit information, can identify a picture in which the object is present and the position of the object in the picture.

[Web Page Optimization]

Figure 38:
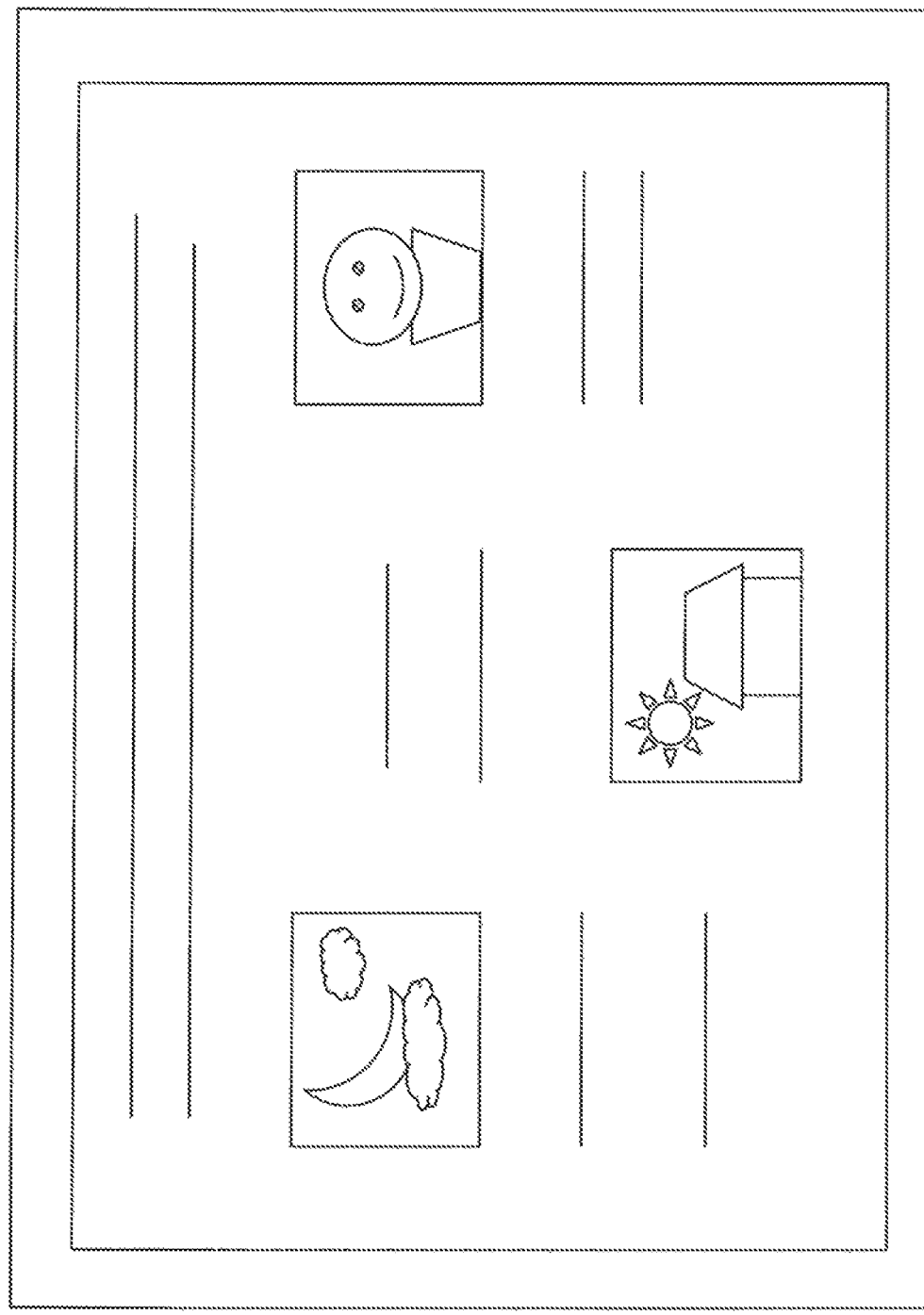
FIG. 38 illustrates an example of a display screen of a web page.
Figure 39:
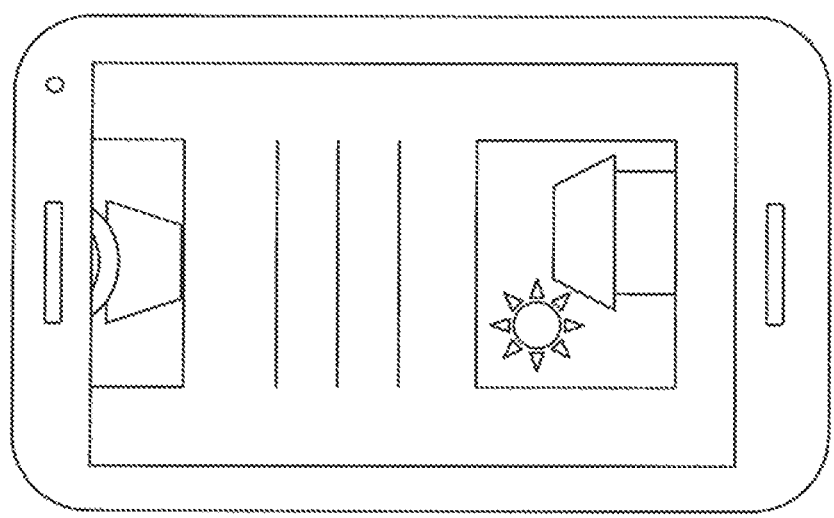
FIG. 39 illustrates an example of a display screen of a web page.

FIG. 38 illustrates an example of a display screen of a web page on, for example, computer ex111. FIG. 39 illustrates an example of a display screen of a web page on, for example, smartphone ex115. As illustrated in FIG. 38 and FIG. 39, a web page may include a plurality of image links which are links to image content, and the appearance of the web page differs depending on the device used to view the web page. When a plurality of image links are viewable on the screen, until the user explicitly selects an image link, or until the image link is in the approximate center of the screen or the entire image link fits in the screen, the display apparatus (decoder) displays, as the image links, still images included in the content or I pictures, displays video such as an animated gif using a plurality of still images or I pictures, for example, or receives only the base layer and decodes and displays the video.

When an image link is selected by the user, the display apparatus decodes giving the highest priority to the base layer. Note that if there is information in the HTML code of the web page indicating that the content is scalable, the display apparatus may decode up to the enhancement layer. Moreover, in order to guarantee real time reproduction, before a selection is made or when the bandwidth is severely limited, the display apparatus can reduce delay between the point in time at which the leading picture is decoded and the point in time at which the decoded picture is displayed (that is, the delay between the start of the decoding of the content to the displaying of the content) by decoding and displaying only forward reference pictures (I picture, P picture, forward reference B picture). Moreover, the display apparatus may purposely ignore the reference relationship between pictures and coarsely decode all B and P pictures as forward reference pictures, and then perform normal decoding as the number of pictures received over time increases.

[Autonomous Driving]

When transmitting and receiving still image or video data such two- or three-dimensional map information for autonomous driving or assisted driving of an automobile, the reception terminal may receive, in addition to image data belonging to one or more layers, information on, for example, the weather or road construction as metadata, and associate the metadata with the image data upon decoding. Note that metadata may be assigned per layer and, alternatively, may simply be multiplexed with the image data.

In such a case, since the automobile, drone, airplane, etc., including the reception terminal is mobile, the reception terminal can seamlessly receive and decode while switching between base stations among base stations ex106 through ex110 by transmitting information indicating the position of the reception terminal upon reception request. Moreover, in accordance with the selection made by the user, the situation of the user, or the bandwidth of the connection, the reception terminal can dynamically select to what extent the metadata is received or to what extent the map information, for example, is updated.

With this, in content providing system ex100, the client can receive, decode, and reproduce, in real time, encoded information transmitted by the user.

[Streaming of Individual Content]

In content providing system ex100, in addition to high image quality, long content distributed by a video distribution entity, unicast or multicast streaming of low image quality, short content from an individual is also possible. Moreover, such content from individuals is likely to further increase in popularity. The server may first perform editing processing on the content before the encoding processing in order to refine the individual content. This may be achieved with, for example, the following configuration.

In real-time while capturing video or image content or after the content has been captured and accumulated, the server performs recognition processing based on the raw or encoded data, such as capture error processing, scene search processing, meaning analysis, and/or object detection processing. Then, based on the result of the recognition processing, the server—either when prompted or automatically—edits the content, examples of which include: correction such as focus and/or motion blur correction; removing low-priority scenes such as scenes that are low in brightness compared to other pictures or out of focus; object edge adjustment; and color tone adjustment. The server encodes the edited data based on the result of the editing. It is known that excessively long videos tend to receive fewer views. Accordingly, in order to keep the content within a specific length that scales with the length of the original video, the server may, in addition to the low-priority scenes described above, automatically clip out scenes with low movement based on an image processing result. Alternatively, the server may generate and encode a video digest based on a result of an analysis of the meaning of a scene.

Note that there are instances in which individual content may include content that infringes a copyright, moral right, portrait rights, etc. Such an instance may lead to an unfavorable situation for the creator, such as when content is shared beyond the scope intended by the creator. Accordingly, before encoding, the server may, for example, edit images so as to blur faces of people in the periphery of the screen or blur the inside of a house, for example. Moreover, the server may be configured to recognize the faces of people other than a registered person in images to be encoded, and when such faces appear in an image, for example, apply a mosaic filter to the face of the person. Alternatively, as pre- or post-processing for encoding, the user may specify, for copyright reasons, a region of an image including a person or a region of the background be processed, and the server may process the specified region by, for example, replacing the region with a different image or blurring the region. If the region includes a person, the person may be tracked in the moving picture, and the head region may be replaced with another image as the person moves.

Moreover, since there is a demand for real-time viewing of content produced by individuals, which tends to be small in data size, the decoder first receives the base layer as the highest priority and performs decoding and reproduction, although this may differ depending on bandwidth. When the content is reproduced two or more times, such as when the decoder receives the enhancement layer during decoding and reproduction of the base layer and loops the reproduction, the decoder may reproduce a high image quality video including the enhancement layer. If the stream is encoded using such scalable encoding, the video may be low quality when in an unselected state or at the start of the video, but it can offer an experience in which the image quality of the stream progressively increases in an intelligent manner. This is not limited to just scalable encoding; the same experience can be offered by configuring a single stream from a low quality stream reproduced for the first time and a second stream encoded using the first stream as a reference.

[Other Usage Examples]

The encoding and decoding may be performed by LSI ex500, which is typically included in each terminal. LSI ex500 may be configured of a single chip or a plurality of chips. Software for encoding and decoding moving pictures may be integrated into some type of a recording medium (such as a CD-ROM, a flexible disk, or a hard disk) that is readable by, for example, computer ex111, and the encoding and decoding may be performed using the software. Furthermore, when smartphone ex115 is equipped with a camera, the video data obtained by the camera may be transmitted. In this case, the video data is coded by LSI ex500 included in smartphone ex115.

Note that LSI ex500 may be configured to download and activate an application. In such a case, the terminal first determines whether it is compatible with the scheme used to encode the content or whether it is capable of executing a specific service. When the terminal is not compatible with the encoding scheme of the content or when the terminal is not capable of executing a specific service, the terminal first downloads a codec or application software then obtains and reproduces the content.

Aside from the example of content providing system ex100 that uses internet ex101, at least the moving picture encoder (image encoder) or the moving picture decoder (image decoder) described in the above embodiments may be implemented in a digital broadcasting system. The same encoding processing and decoding processing may be applied to transmit and receive broadcast radio waves superimposed with multiplexed audio and video data using, for example, a satellite, even though this is geared toward multicast whereas unicast is easier with content providing system ex100.

[Hardware Configuration]

Figure 40:
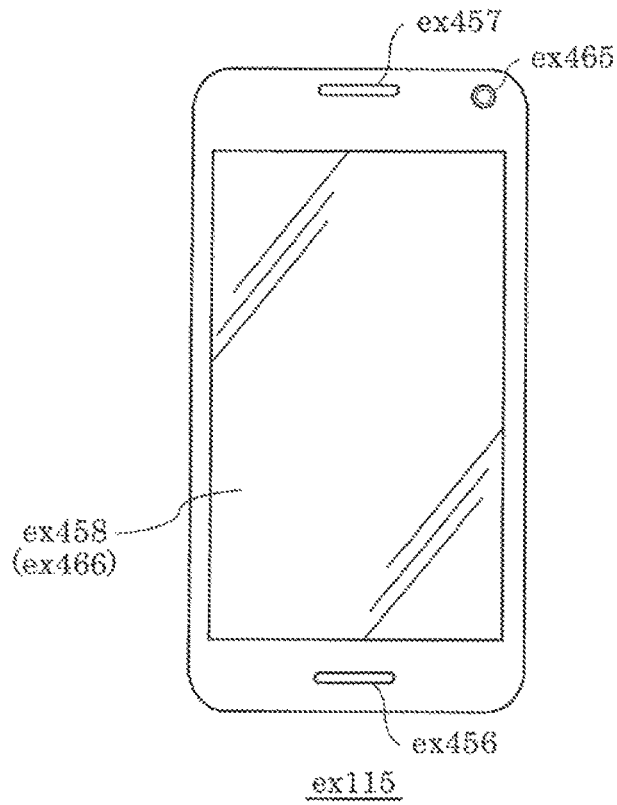
FIG. 40 illustrates one example of a smartphone.
Figure 41:
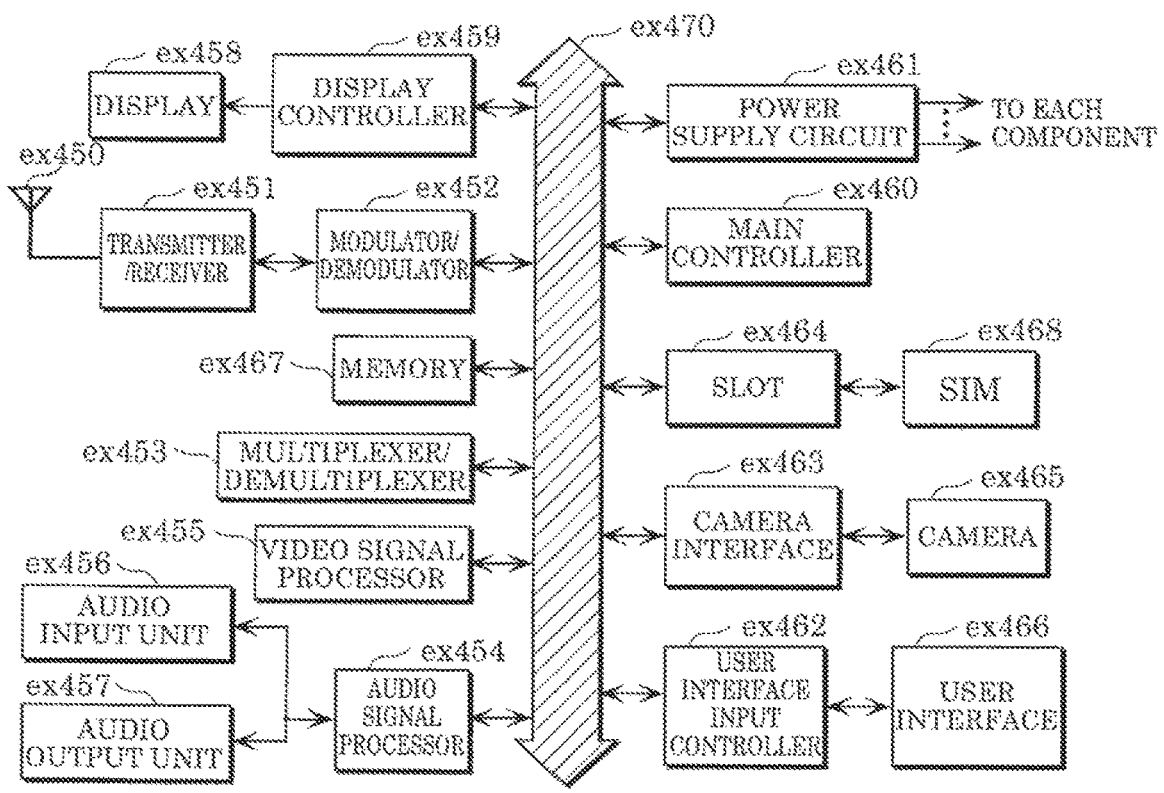
FIG. 41 is a block diagram illustrating a configuration example of a smartphone.

FIG. 40 illustrates smartphone ex115. FIG. 41 illustrates a configuration example of smartphone ex115. Smartphone ex115 includes antenna ex450 for transmitting and receiving radio waves to and from base station ex110, camera ex465 capable of capturing video and still images, and display ex458 that displays decoded data, such as video captured by camera ex465 and video received by antenna ex450. Smartphone ex115 further includes user interface ex466 such as a touch panel, audio output unit ex457 such as a speaker for outputting speech or other audio, audio input unit ex456 such as a microphone for audio input, memory ex467 capable of storing decoded data such as captured video or still images, recorded audio, received video or still images, and mail, as well as decoded data, and slot ex464 which is an interface for SIM ex468 for authorizing access to a network and various data. Note that external memory may be used instead of memory ex467.

Moreover, main controller ex460 which comprehensively controls display ex458 and user interface ex466, power supply circuit ex461, user interface input controller ex462, video signal processor ex455, camera interface ex463, display controller ex459, modulator/demodulator ex452, multiplexer/demultiplexer ex453, audio signal processor ex454, slot ex464, and memory ex467 are connected via bus ex470.

When the user turns the power button of power supply circuit ex461 on, smartphone ex115 is powered on into an operable state by each component being supplied with power from a battery pack.

Smartphone ex115 performs processing for, for example, calling and data transmission, based on control performed by main controller ex460, which includes a CPU, ROM, and RAM. When making calls, an audio signal recorded by audio input unit ex456 is converted into a digital audio signal by audio signal processor ex454, and this is applied with spread spectrum processing by modulator/demodulator ex452 and digital-analog conversion and frequency conversion processing by transmitter/receiver ex451, and then transmitted via antenna ex450. The received data is amplified, frequency converted, and analog-digital converted, inverse spread spectrum processed by modulator/demodulator ex452, converted into an analog audio signal by audio signal processor ex454, and then output from audio output unit ex457. In data transmission mode, text, still-image, or video data is transmitted by main controller ex460 via user interface input controller ex462 as a result of operation of, for example, user interface ex466 of the main body, and similar transmission and reception processing is performed. In data transmission mode, when sending a video, still image, or video and audio, video signal processor ex455 compression encodes, via the moving picture encoding method described in the above embodiments, a video signal stored in memory ex467 or a video signal input from camera ex465, and transmits the encoded video data to multiplexer/demultiplexer ex453. Moreover, audio signal processor ex454 encodes an audio signal recorded by audio input unit ex456 while camera ex465 is capturing, for example, a video or still image, and transmits the encoded audio data to multiplexer/demultiplexer ex453. Multiplexer/demultiplexer ex453 multiplexes the encoded video data and encoded audio data using a predetermined scheme, modulates and converts the data using modulator/demodulator (modulator/demodulator circuit) ex452 and transmitter/receiver ex451, and transmits the result via antenna ex450.

When video appended in an email or a chat, or a video linked from a web page, for example, is received, in order to decode the multiplexed data received via antenna ex450, multiplexer/demultiplexer ex453 demultiplexes the multiplexed data to divide the multiplexed data into a bitstream of video data and a bitstream of audio data, supplies the encoded video data to video signal processor ex455 via synchronous bus ex470, and supplies the encoded audio data to audio signal processor ex454 via synchronous bus ex470. Video signal processor ex455 decodes the video signal using a moving picture decoding method corresponding to the moving picture encoding method described in the above embodiments, and video or a still image included in the linked moving picture file is displayed on display ex458 via display controller ex459. Moreover, audio signal processor ex454 decodes the audio signal and outputs audio from audio output unit ex457. Note that since real-time streaming is becoming more and more popular, there are instances in which reproduction of the audio may be socially inappropriate depending on the user's environment. Accordingly, as an initial value, a configuration in which only video data is reproduced, i.e., the audio signal is not reproduced, is preferable. Audio may be synchronized and reproduced only when an input, such as when the user clicks video data, is received.

Although smartphone ex115 was used in the above example, three implementations are conceivable: a transceiver terminal including both an encoder and a decoder; a transmitter terminal including only an encoder; and a receiver terminal including only a decoder. Further, in the description of the digital broadcasting system, an example is given in which multiplexed data obtained as a result of video data being multiplexed with, for example, audio data, is received or transmitted, but the multiplexed data may be video data multiplexed with data other than audio data, such as text data related to the video. Moreover, the video data itself rather than multiplexed data maybe received or transmitted.

Although main controller ex460 including a CPU is described as controlling the encoding or decoding processes, terminals often include GPUs. Accordingly, a configuration is acceptable in which a large area is processed at once by making use of the performance ability of the GPU via memory shared by the CPU and GPU or memory including an address that is managed so as to allow common usage by the CPU and GPU. This makes it possible to shorten encoding time, maintain the real-time nature of the stream, and reduce delay. In particular, processing relating to motion estimation, deblocking filtering, sample adaptive offset (SAO), and transformation/quantization can be effectively carried out by the GPU instead of the CPU in units of, for example pictures, all at once.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The encoder and the decoder according to the present disclosure produce advantageous effects of raising possibility of further improvement, are applicable to, for example, information display devices and imaging devices such as televisions, digital video recorders, car navigation systems, mobile phones, digital cameras, digital video cameras, in-vehicle cameras, and network cameras, and thus have high utility values.

What is claimed is:

1. An encoder, comprising:
    processing circuitry; and
    memory, wherein
    using the memory, the processing circuitry:
        generates a predicted image of an input image that is a current image to be encoded, based on generated data output from a generator network in response to a reference image being input to the generator network, the generator network being a neural network;
        calculates a prediction error by subtracting the predicted image from the input image;
        generates an encoded image by at least transforming the prediction error, wherein in generating the predicted image, the processing circuitry:
        generates a first intra-predicted image by a first intra prediction based on the reference image and an intra prediction parameter, the intra prediction parameter being obtained as the generated data output from the generator network in response to the reference image being input to the generator network;
        generates a second intra-predicted image of the input image by a second intra prediction based on the reference image;

selects, as the predicted image, from among the first intra-predicted image and the second intra-predicted image; and when the processing circuitry selects the second intra-predicted image, calculates the prediction error by subtracting the second intra-predicted image from the input image in calculating the prediction error.

2. A decoder, comprising:
processing circuitry; and
memory, wherein
using the memory, the processing circuitry:
  generates a decoding prediction error by performing at least inverse transform on an encoded image that is a current image to be decoded;
  generates a predicted image of the encoded image, based on generated data output from a generator network in response to a reference image being input to the generator network, the generator network being a neural network;
  generates a decoded image by adding the decoding prediction error to the predicted image; and
in generating the predicted image, the processing circuitry:
  generates a first intra-predicted image by a first intra prediction based on the reference image and an intra prediction parameter, the intra prediction parameter being obtained as the generated data output from the generator network in response to the reference image being input to the generator network;
  generates a second intra-predicted image of the encoded image by a second intra prediction based on the reference image;
  selects, as the predicted image, from among the first intra-predicted image and the second intra-predicted image; and
  when the processing circuitry selects the second intra-predicted image, generates the decoded image by adding the decoding prediction error to the second intra-predicted image in generating the decoded image.

3. An encoding method, comprising:
generating a predicted image of an input image that is a current image to be encoded, based on generated data output from a generator network in response to a reference image being input to the generator network, the generator network being a neural network;
calculating a prediction error by subtracting the predicted image from the input image; and
generating an encoded image by at least transforming the prediction error,
wherein the generating the predicted image includes:
  generating a first intra-predicted image by a first intra prediction based on the reference image and an intra prediction parameter, the intra prediction parameter being obtained as the generated data output from the generator network in response to the reference image being input to the generator network;
  generating a second intra-predicted image of the input image by a second intra prediction based on the reference image;
  selecting, as the predicted image, from among the first intra-predicted image and the second intra-predicted image; and
  when the second intra-predicted image is selected as the predicted image, calculating the prediction error by subtracting the second intra-predicted image from the input image in calculating the prediction error.

4. A decoding method, comprising:
generating a decoding prediction error by performing at least inverse transform on an encoded image that is a current image to be decoded;
generating a predicted image of the encoded image, based on generated data output from a generator network in response to a reference image being input to the generator network, the generator network being a neural network; and
generating a decoded image by adding the decoding prediction error to the predicted image; and
wherein the generating the predicted image includes:
  generating a first intra-predicted image by a first intra prediction based on the reference image and an intra prediction parameter, the intra prediction parameter being obtained as the generated data output from the generator network in response to the reference image being input to the generator network;
  generating a second intra-predicted image of the encoded image by a second intra prediction based on the reference image;
  selecting, as the predicted image, from among the first intra-predicted image and the second intra-predicted image; and
  when the second intra-predicted image is selected as the predicted image, generating the decoded image by adding the decoding prediction error to the second intra-predicted image in generating the decoded image.

* * * * *